United States Statutory Invention Registration [19]

[11] Reg. Number: H830

Deguchi et al. [43] Published: Oct. 2, 1990

[54] SILVER HALIDE COLOR PHOTOGRAPHIC MATERIAL

[76] Inventors: Naoyasu Deguchi; Shinji Ueda; Koki Nakamura, all of c/o Fuji Photo Film Co., Ltd. 210, Nakanuma, Minami Ashigara-shi, Kanagawa, Japan

[21] Appl. No.: 189,071

[22] Filed: May 2, 1988

[30] Foreign Application Priority Data

Apr. 30, 1987 [JP] Japan ..... 62-104495

[51] Int. Cl.[5] ..... G03C 1/08; G03C 7/26; G03C 7/32

[52] U.S. Cl. ..... 430/542; 430/443; 430/505; 430/546; 430/564; 430/600; 430/603; 430/613; 430/955; 430/627

[58] Field of Search ..... 430/505, 443, 493, 542, 430/544, 546, 564, 600, 603, 613, 955, 957, 958, 627

[56] References Cited

U.S. PATENT DOCUMENTS

| | | | |
|---|---|---|---|
| 4,248,962 | 2/1981 | Lau | 430/382 |
| 4,409,323 | 10/1983 | Sato et al. | 430/543 |
| 4,770,990 | 9/1988 | Nakamura et al. | 430/564 |

FOREIGN PATENT DOCUMENTS 0220746 5/1987 European Pat. Off. .

*Primary Examiner*—John F. Terapane
*Assistant Examiner*—Philip Tucker

[57] ABSTRACT

A novel silver halide color photographic material containing a desilvering accelerator releasing compound, which comprises at least one light-sensitive silver halide emulsion layer on a support, wherein at least one of said emulsion layer and a non-light sensitive hydrophilic layer(s) contains at least one compound represented by the formula (I)

$$\mathrm{PWR}\text{-}(\text{-}\mathrm{Time}\text{-})_t\mathrm{BA} \qquad \text{(I)}$$

wherein PWR represents a group which undergoes reduction to release (Time—$_t$BA; BA represents a group which becomes a desilvering accelerator after being released; Time represents a group which releases BA through a reaction after being released from PWR as (Time-)$_t$BA; and t represents an integer of 0 or 1.

13 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOGRAPHIC MATERIAL

FIELD OF THE INVENTION

The present invention relates to a silver halide color photographic material. More particularly, the present invention relates to a silver halide color photographic material excellent in desilvering property.

BACKGROUND OF THE INVENTION

After being color-developed, a color photographic light-sensitive material must be subjected to bleach and fixation to remove developed or undeveloped silver. This process is called desilvering. If the desilvering takes much time, a rapid processing cannot be conducted.

Heretofore, this problem has been addressed by incorporating various desilvering accelerators in the light-sensitive material.

Examples of such desilvering accelerators include compounds containing a mercapto group or a disulfide group as described in U.S. Pat. No. 3,893,858, West German Patent Nos. 1,290,812 (British Patent No. 1,138,842), and 2,059,988 (British Patent No. 1,337,346), Japanese Patent Application (OPI) Nos. 32,736/78, 57,831/78, 37,418/78, 65,732/78, 72,623/78, 95,630/78, 95,631/78, 104,232/78, 124,424/78, 141,623/78, and 28,426/78 (the term "OPI" as used herein means an "unexamined published application"), and Research Disclosure No. 17,129 (July 1978), thiazolidine derivatives as described in Japanese Patent Application (OPI) No. 140,129/75, thiourea derivatives as described in Japanese Patent Publication No. 8,506/70 (British Patent No. 1,150,466), Japanese Patent Application (OPI) Nos. 20,832/77, and 32,735/78, and U.S. Pat. No. 3,706,561, iodides as described in West German Patent No. 1,127,715, and Japanese Patent Application (OPI) No. 16,253/83, polyethylene oxides as described in West German Patent Nos. 966,410, and 2,748,430, polyamine compounds as described in Japanese Patent Publication No. 8,836/70, compounds as described in Japanese Patent Application (OPI) Nos. 42,434/74, 59,644/74, 94,927/78, 35,727/79, 26,506/80, and 163,940/83, and iodine and bromine ions.

However, these compounds are disadvantageous in that stability of these compounds deteriorate upon aging. Particularly, these compounds cause an increase in fog.

SUMMARY OF THE INVENTION

It is therefore an object of the present invention to provide a color photographic light-sensitive material which exhibits an excellent desilvering property without impairing the other photographic properties.

The above and other objects of the present invention will become more apparent from the following detailed description and examples.

These objects of the present invention are accomplished with a silver halide color photographic material comprising at least one light-sensitive silver halide emulsion layer on a support, at least one of said emulsion layer and a non light-sensitive hydrophilic layer(s) contains at least one compound represented by the formula (I):

$$\text{PWR}\text{-}(\text{Time})_t\text{ BA} \qquad \text{(I)}$$

wherein PWR represents a group which undergoes reduction to release-$(\text{Time})_t$BA; BA represents a group which becomes a desilvering accelerator after being released; Times represents a group which releases BA through a reaction after being released from PWR as -$(\text{Time})_t$BA; and t represents an integer of 0 or 1.

DETAILED DESCRIPTION OF THE INVENTION

The present invention will be first described with reference to PWR.

PWR may correspond to the portion containing an electron accepting center and an intramolecular nucleophilic substitution reaction center in a compound which undergoes an intramolecular nucleophilic substitution reaction after being reduced to release a photographic reagent as disclosed in U.S. Pat. Nos. 4,139,389, 4,139,379, and 4,564,577, and Japanese Patent Application (OPI) Nos. 185,333/84, and 84,453/82 or the portion containing an electron-accepting quinoid center and the carbon atom connecting the quinoid center to a photographic reagent in a compound which undergoes an electron imigration reaction after being reduced to release the photographic reagent as disclosed in U.S. Pat. No. 4,232,107, Japanese Patent Application (OPI) Nos. 101,649/84, and 88,257/86, and Research Disclosure No. 24,025 (IV), 1984. Alternatively, PWR may correspond to the portion containing an electron attractive group-substituted aryl group and an atom (sulfur atom, carbon atom, or nitrogen atom) connecting the aryl group to a photographic reagent in a compound which undergoes a single bond cleavage after being reduced to release the photographic reagent as disclosed in Japanese Patent Application (OPI) No. 142,530/81, and U.S. Pat. Nos. 4,343,893 and 4,619,884. Furthermore, PWR may correspond to the portion containing a nitro group and a carbon atom connecting the nitro group to a photographic reagent in a nitro compound which releases the photographic reagent after accepting electrons as disclosed in U.S. Pat. No. 4,450,223. Moreover, PWR may correspond to the portion containing a geminal dinitro portion and a carbon atom connecting the geminal dinitro portion to a photographic reagent in a dinitro compound which undergoes a $\beta$-elimination of the photographic reagent after accepting electrons as disclosed in U.S. Pat. No. 4,609,610. However, in order to further accomplish the objects of the present invention, the compound represented by the formula (I) preferably is a compound represented by the formula (II):

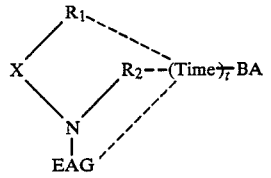

(II)

wherein

-continued

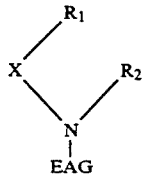

corresponds to PWR in the formula (I). $\text{-}(\text{Time})_t\text{BA}$ is connected to at least one of $R_1$, $R_2$, and EAG.

The portion corresponding to PWR in the formula (II) will be further described hereinafter.

X represents an oxygen atom (—O—), sulfur atom (—S—), or nitrogen-containing group (—N($R_3$)—).

$R_1$, $R_2$ and $R_3$ each represents a group other than hydrogen atom, or a chemical bond.

Examples of groups represented by $R_1$, $R_2$ and $R_3$ include a substituted or unsubstituted alkyl group, a substituted or unsubstituted aralkyl group, and a substituted or unsubstituted cycloalkyl group (e.g. methyl group, trifluoromethyl group, benzyl group, chloromethyl group, dimethylaminomethyl group, ethoxycarbonylmethyl group, aminomethyl group, acetylaminomethyl group, ethyl group, 2-(4-dodecanoylaminophenyl)ethyl group, carboxyethyl group, allyl group, 3,3,3-trichloropropyl group, n-propyl group, iso-propyl group, n-butyl group iso-butyl group, sec-butyl group, t-butyl group, n-pentyl group, sec-pentyl group, t pentyl group, cyclopentyl group, n-hexyl group, sec-hexyl group, t-hexyl group, cyclohexyl group, n-octyl .group, sec-octyl group, t-octyl group, n decyl group, n-undecyl group, n-dodecyl group, n-tetradecyl group, n-pentadecyl group, n-hexadecyl group, sec-hexadecyl group, t hexadecyl group, n octadecyl group, and t octadecyl group); a substituted or unsubstituted alkenyl group and a substituted or unsubstituted cycloalkenyl group (e.g. vinyl group, 2-chlorovinyl group, 1-methylvinyl group, 2-cyanovinyl group, and cyclohexene-1-il group); a substituted or unsubstituted alkynyl group (e.g. ethynyl group, 1-propynyl group, and 2-ethoxycarbonylethynyl group); a substituted or unsubstituted aryl group (e.g. phenyl group, naphthyl group, 3-hydroxyphenyl group, 3-chlorophenyl group, 4-acetylaminophenyl group, 4-hexadecanesulfonylaminophenyl group, 2-methanesulfonyl-4-nitrophenyl group, 3-nitrophenyl group, 4-methoxyphenyl group, 4-acetylaminophenyl group, 4-methanesulfonylphenyl group, 2,4-dimethylphenyl group, and 4-tetradecyloxyphenyl group); a substituted or unsubstituted heterocyclic group (such as a 5, 6 or 7 membered heterocyclic group containing at least one of N, O and S atoms as a hetero atom, and a condensed ring thereof, e.g., 1-imidazolyl group, 2-furyl group, 2-pyridyl group, 5-nitro-2-pyridyl group, 3-pyridyl group, 3,5-dicyano 2-pyridyl group, 5-tetrazolyl group, 5-phenyl-1-tetrazolyl group, 2-benzthiazolyl group 2-benzimidazolyl group, 2-benzoxazolyl group, 2-oxazoline-2-il group, and morpholino group); a substituted or unsubstituted acyl group (e.g. acetyl group, propionyl group, butyloyl group, iso-butyloyl group, 2,2-dimethylpropionyl group, benzoyl group, 3,4-dichlorobenzoyl group, 3-acetylamino-4-methoxybenzoyl group, 4-methylbenzoyl group, and 4-methoxy-3-sulfobenzoyl group); a substituted or unsubstituted alkylsulfonyl group and a substituted or unsubstituted arylsulfonyl group (e.g. methanesulfonyl group, ethanesulfonyl group, chloromethanesulfonyl group, propanesulfonyl group, butanesulfonyl group, n-octanesulfonyl group, n-dodecanesulfonyl group, n-hexadecanesulfonyl group, benzenesulfonyl group, 4-toluenesulfonyl group, and 4-n-dodecyloxybenzenesulfonyl group); a substituted or unsubstituted carbamoyl group (e.g. carbamoyl group, methylcarbamoyl group, dimethylcarbamoyl group, bis-(2-methoxyethyl)carbamoyl group, diethylcarbamoyl group, cyclohexylcarbamoyl group, di-n-octylcarbamoyl group, 3-dodecyloxypropylcarbamoyl group, hexadecylcarbamoyl group, 3-(2,4-di-t-pentylphyenoxy)propylcarbamoyl group, 3-octanesulfonylaminophenylcarbamoyl group, and di-n-octadecylcarbamoyl group); and a substituted or unsubstituted sulfamoyl group (e.g. sulfamoyl group, methylsulfamoyl group, dimethylsulfamoyl group, diethylsulfamoyl group, bis-(2-methoxyethyl)sulfamoyl group, di-n-butylsulfamoyl group, methyl-n-octylsulfamoyl group, n-hexadecylmethylsulfamoyl group, 3-ethoxypropylmethylsulfamoyl group, N-phenyl-N-methylsulfamoyl group, 4-decyloxyphenylsulfamoyl group, and methyloctadecylsulfamoyl group).

Preferred examples of the groups represented by $R_1$ and $R_3$ include a substituted or unsubstituted alkyl group, alkenyl group, alkynyl group, aryl group, heterocyclic group, acyl group, and alkyl and aryl sulfonyl groups. The number of carbon atoms contained in $R_1$ or $R_3$ is preferably 1 to 40.

Preferred examples of the group represented by $R_2$ include a substituted or unsubstituted acyl group, and alkyl and aryl sulfonyl groups. The number of carbon atoms contained in $R_2$ is preferably 1 to 40.

$R_1$, $R_2$, $R_3$ and EAG may be connected to each other to form a 5- to 8-membered ring.

EAG will be described in detail later.

In order to accomplish the objects of the present invention, the compound represented by the general formula [III] may be preferably used among the compounds represented by the formula (II).

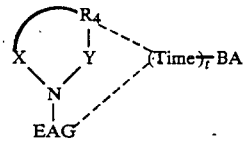

(II)

In the general formula (III),

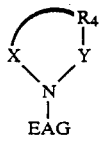

corresponds to PWR defined in the formula [I]. $\text{-}(\text{Time})_t\text{BA}$ is connected to at least one of $R_4$ and EAG.

The portion of the general formula (III) corresponding to PWR will be further described hereinafter.

Y is a divalent connecting group which may be preferably $$-\overset{O}{\overset{\|}{C}}-,\ -\overset{O}{\overset{\|}{S}}-,\ -SO_2-,\ -\overset{|}{C}=N-COR^7,\ -\overset{|}{C}=N-SO_2R^7,\ X$$

has the same meaning as described above.

$R^7$ represents a hydrogen atom, an alkyl group, an aryl group or a heterocyclic group.

$R_4$ represents an atomic group which is connected to X and Y to form a 5- to 8-membered monocyclic or condensed heterocyclic group containing a nitrogen atom as a member.

Preferred examples of such a heterocyclic group will be shown hereinafter, but the present invention should not be construed as being limited thereto.

HE-1

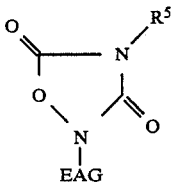

HE-2

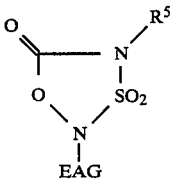

HE-3

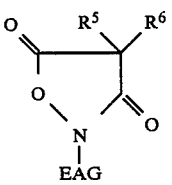

HE-4

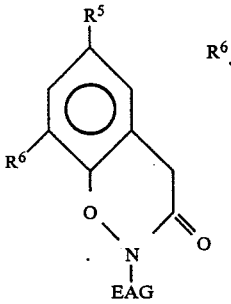

HE-5

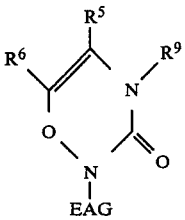

HE-6

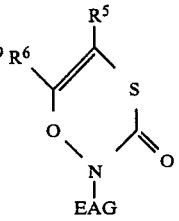

HE-7

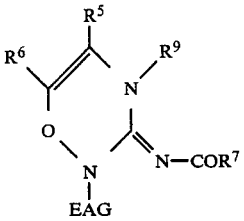

HE-8

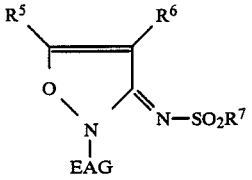

HE-9

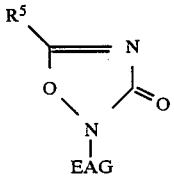

HE-10

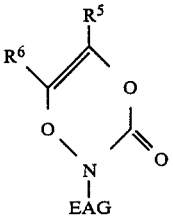

HE-11

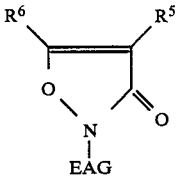

HE-12

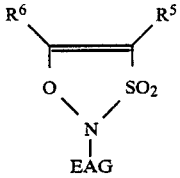

-continued

HE-13

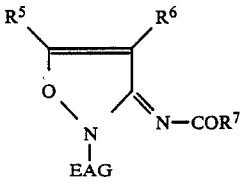

HE-14

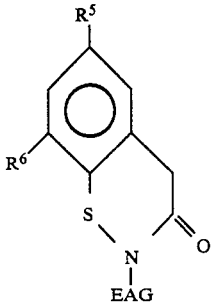

HE-15

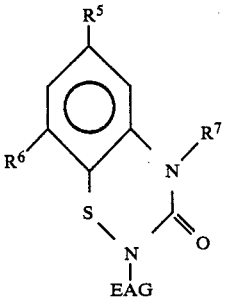

HE-16

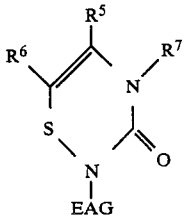

HE-17

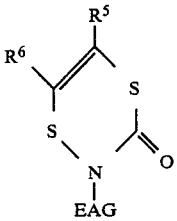

HE-18

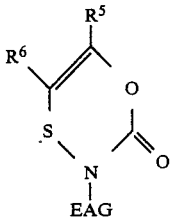

HE-19

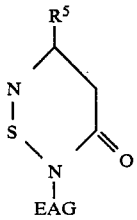

HE-20

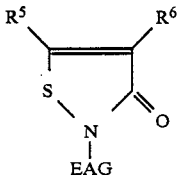

HE-21

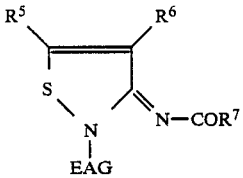

HE-22

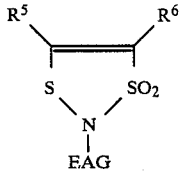

-continued
HE-23
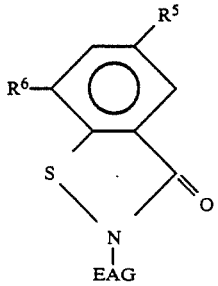
HE-24
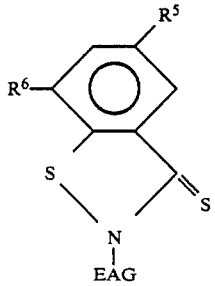
HE-25
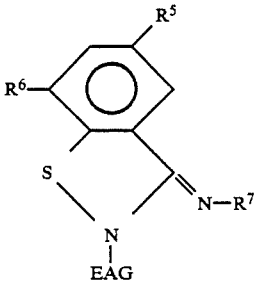
HE-26
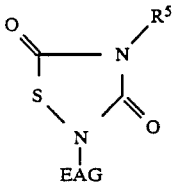
HE-27
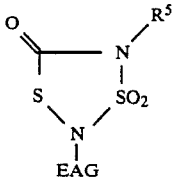
HE-28
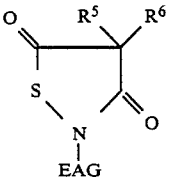
HE-29
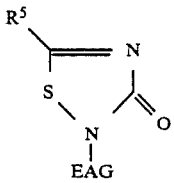
HE-30
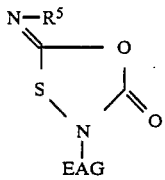
HE-31
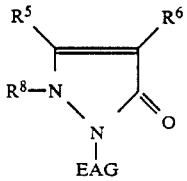
HE-32
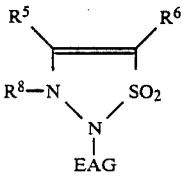
HE-33
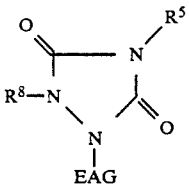
HE-34
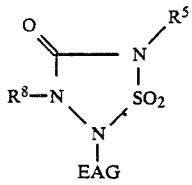
-continued
HE-35
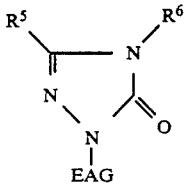
HE-36
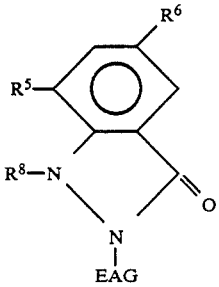
HE-37
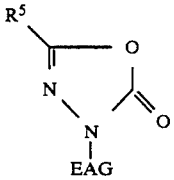
HE-38
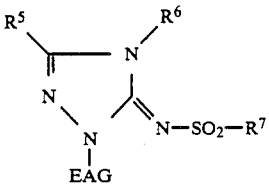
HE-39
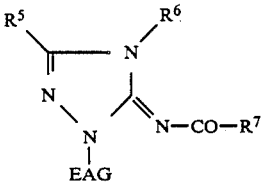
HE-40
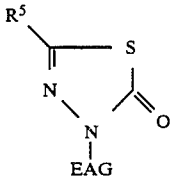
HE-41
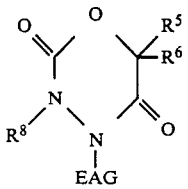
HE-42
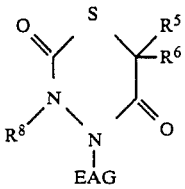
HE-43
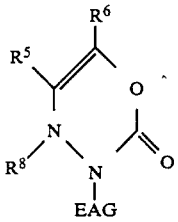
HE-44
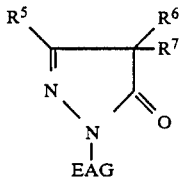
HE-45
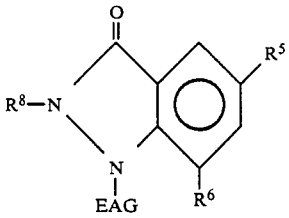
wherein $R^5$, $R^6$, $R^7$ and $R^9$ preferably each represents a hydrogen atom, an alkyl group, an aryl group, or a heterocyclic group; $R^8$ represents an alkyl group, an aryl group, an acyl group, or an alkyl or aryl sulfonyl group; and $-(\text{Time})-_t\text{BA}$ may be connected to $R^5$, $R^6$, $R^7$, $R^8$ and $R^9$. These groups may have carbon atoms and substituents within the same scope as defined for $R_1$, $R_2$ and $R_3$.

EAG represents an aromatic group which accepts electrons from a reducing substance and is connected to a nitrogen atom. A preferred example of the aromatic group represented by EAG is a group represented by the formula (A). wherein $Z_1$ represents (A)

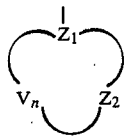

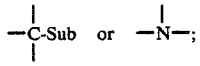

$V_n$ represents an atomic group which forms a 3- to 8-membered aromatic group with $Z_1$ and $Z_2$; and n represents an integer of 3 to 8.

$V_3$, $V_4$, $V_5$, $V_6$, $V_7$, and $V_8$ represents $—Z_3—$, $—Z_3—Z_4—$, $—Z_3—Z_4—Z_5—$, $—Z_3—Z_4—Z_5—Z_6—$, $—Z_3—Z_4—Z_5—Z_6—Z_7—$, and $Z_3—Z_4—Z_5—Z_6—Z_7—Z_8—$, respectively, wherein $Z_2$ to $Z_8$ each represents

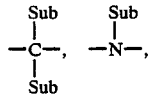

—O—, —S—, or $—SO_2—$ in which Sub represents a chemical bond (II bond), hydrogen atom, or substituent as described layer. These Sub's may be the same or different and may be connected to each other to form a 3- to 8-membered saturated or unsaturated carbon ring or heterocyclic ring.

In the general formula (A), Sub(s) is selected such that the sum of sigma para of Hammett's constants of the substituent is preferably +0.50 or more, more preferably +0.70 or more, particularly +0.85 or more, from the point of view of easiness for electron-accepting EAG will be further described hereinafter.

EAG represents a group which accepts electrons from a reducing substance and is connected to a nitrogen atom. EAG is preferably an aryl group or heterocyclic group which is substituted by at least one electron attractive group. Substituents which are bonded to the aryl group or heterocyclic group represented by EAG can be used to adjust the entire properties of the compound. Examples of the properties which can be adjusted by the substituents include capability of accepting electrons, water-solubility, oil solubility, diffusibility, sublimability, melting point, dispersibility in binder such as gelatin, reactivity with nucleophilic group, and reactivity with an electrophilic group.

Specific examples of EAG will be described hereinafter, but the present invention should not be construed as being limited thereto.

Specific examples of the aryl group which is substituted by at least one electron attractive group include 4-nitrophenyl group, 2-nitrophenyl group, 2-nitro-4-N-methyl-N-n-butylsulfamoylphenyl group, 2-nitro-4-N-methyl-N-n-octylsulfamoylphenyl group, 2-nitro-4-N-methyl-N-n-dodecylsulfamoylphenyl group, 2-nitro-4-N-methyl-N-n-hexadecylsulfamoylphenyl group, 2-nitro-4-N-methyl-N-n-ctadecylsulfamoylphenyl group, 2-nitro 4-N-methyl N-(3-carboxypropyl)sulfamoylphenyl group, 2-nitro-4-N-ethyl-N-( 2-sulfoethyl)sulfamoylphenyl group, 2-nitro-4-N-n-hexadecyl-N (3-sulfopropyl)sulfamoylphenyl group, 2-nitro-4-N-(2-cyanoethyl)-N-{(2-hydroxyethoxy)ethyl}sulfamoylphenyl group, 2-nitro-4-diethylsulfamoylphenyl group, 2-nitro-4-di-n-butylsulfamoylphenyl group, 2-nitro-4-di-n-octylsulfamoylphenyl group, 2-nitro-4-di-n-octadecylsulfamoylphenyl group, 2-nitro-4-methylsulfamoylphenyl group, 2-nitro-4-n-hexadecylsulfamoylphenyl group, 2-nitro-4-N-methyl-N-(4-dodecylsulfonylphenyl)sulfamoylphenyl group, 2-nitro-4-(3-methylsulfamoylphenyl)sulfamoylphenyl group, 4-nitro-2-N-methyl-N-n-butylsulfamoylphenyl group, 4-nitro-2-N-methyl-N-n-octylsulfamoylphenyl group, 4-nitro-2-N-methyl-N-n-dodecylsulfamoylphenyl group, 4-nitro-2-N-methyl-N-n-hexadecylsulfamoylphenyl group, 4-nitro-2-N-methyl-N-n-octadecylsulfamoylphenyl group, 4-nitro-2-N-methyl-N-(3-carboxypropyl)sulfamoylphenyl group, 4-nitro-2-N-ethyl-N-(2-sulfoethyl)sulfamoylphenyl group, 4-nitro-2-N n-hexadecyl-N-(3-sulfopropyl)sulfamoylphenyl group, 4-nitro-2-N-(2-cyanoethyl) N-{(2-hydroxyethoxy)ethyl}-sulfamoylphenyl group, 4-nitro-2-diethylsulfamoylphenyl group, 4-nitro-2-di-n-butylsulfamoylphenyl group, 4-nitro-2-di-n-octylsulfamoylphenyl group, 4-nitro-2-di-n-octadecylsulfamoylphenyl group, 4-nitro-2-methylsulfamoyl phenyl group, 4-nitro-2-n-hexadecylsulfamoylphenyl group, 4-nitro-2-N-methyl N-(4-dodecylsulfonylphenyl)sulfamoyl phenyl group, 4-nitro-2-(3-methylsulfamoylphenyl)sulfamoylphenyl group, 4-nitro-2-chlorophenyl group, 2-nitro-4-chlorophenyl group, 2-nitro-4-N methyl N-n butylcarbamoylphenyl group, 2-nitro-4-N-methyl-N-n-octylcarbamoylphenyl group, 2-nitro-4-N-methyl-N-n dodecylcarbamoylphenyl group, 2- nitro-4-N-methyl-N-n-hexadecylcarbamoylphenyl group, 2-nitro-4-N-methyl-N-n-octadecylcarbamoylphenyl group, 2-nitro-4-N-methyl-N-(3-carboxypropyl)carbamoylphenyl group, 2-nitro-4-N-ethyl-N-(2-sulfoethyl)carbamoylphenyl group, 2-nitro-4-N-n-hexadecyl-N-(3-sulfopropyl)carbamoylphenyl group, 2-nitro-4-N-(2-cyanoethyl)-N-{(2-hydroxyethoxy)ethyl}carbamoylphenyl group, 2-nitro-4-diethylcarbamoylphenyl group, 2-nitro-4-di-n-butylcarbamoylphenyl group, 2-nitro-4-di-n-octylcarbamoylphenyl group, 2-nitro-4-di-n-octadecylcarbamoylphenyl group, nitro-4-methylcarbamoylphenyl group, 2-nitro-4-n-hexadecylcarbamoylphenyl group, 2-nitro-4-N-methyl-N-(4-dodecylsulfonylphenyl)carbamoylphenyl group, 2-nitro-4-(3-methylsulfamoylphenyl)carbamoylphenyl group, 4-nitro-2-N-methyl-N-n-butylcarbamoylphenyl group, 4-nitro-2-N-methyl-N-n-octylcarbamoylphenyl group, 4-nitro-2-N-methyl-N-n-dodecylcarbamoylphenyl group, 4-nitro-2-N-methyl-N-n-hexadecylcarbamoylphenyl group, 4-nitro-2-N-methyl-N-n-octadecylcarbamoylphenyl group, 4-nitro-2-N-methyl-N-(3-carboxypropyl)carbamoylphenyl group, 4-nitro-2-N-ethyl-N (2-sulfoethyl)carbamoylphenyl group, 4-nitro-2-N-n-hexadecyl-N-(3-sulfopropyl)carbamoylphenyl group, 4-nitro-2-N-(2-cyanoethyl)-N-{(2-hydroxyethoxy)ethyl}carbamoylphenyl group, 4-nitro-2-diethylcarbamoylphenyl group, 4-nitro-2-di-n-butylcarbamoylphenyl group, 4-nitro-2-di-n-octylcarbamoylphenyl group, 4-nitro 2-di-n-octadecylcarbamoylphenyl group, 4-nitro-2-methylcarbamoylphenyl group, 4-nitro-2-n-hexadecylcarbamoylphenyl group, 4-nitro-2-N-methyl-N-(4-dodecylsulfonylphenyl)carbamoylphenyl group, 4-nitro-2-(3-methylsulfamoylphenyl)carbamoylphenyl group, 2,4-dimethanesulfonylphenyl group, 2-methanesulfonyl-4-benzenesulfonylphenyl group, 2-n-octanesulfonyl 4-methanesulfonylphenyl group, 2-n-tetra-decanesulfonyl-4-methanesulfonylphenyl group, 2-n-hexadecanesulfonyl-4-methanesulfonylphenyl group, 2,4-di-n-dodecanesulfonylphenyl group, 2,4-didodecanesulfonyl-5-trifluoromethylphenyl group, 2-n-decanesulfonyl-4-cyano-5-trifluoromethylphenyl group, 2-cyano-4-methanesulfonyl phenyl group, 2,4,6-tricyanophenyl group, 2,4-dicyanophenyl group, 2-nitro-4-methanesulfonylphenyl group, 2-nitro-4-n-dodecanesulfonylphenyl group, 2-nitro-4-(2-sulfoethylsulfonyl)phenyl group, 2-nitro-4-carboxymethylsulfonylphenyl group, 2-nitro-4-carboxyphenyl group, nitro-4-ethoxycarbonyl-5-n-butoxyphenyl group, 2-nitro-4-ethoxycarbonyl-5-n-hexadecyloxyphenyl group, 2-nitro-4-diethylcarbamoyl-5-n-hexadecyloxyphenyl group, 2-nitro-4-cyano-5-n-dodecylphenyl group, 2,4-dinitrophenyl group, 2-nitro 4-n-decylthiophenyl group, 3,5-dinitrophenyl group, 2-nitro-3,5-dimethyl-4-n-hexadecanesulfonylphenyl group, 4-methanesulfonyl-2-benzenesulfonylphenyl group, 4-n-octanesulfonyl-2-methanesulfonylphenyl group, 4-n-tetra-decanesulfonyl-2-methanesulfonylphenyl group, 4-n-hexa-decanesulfonyl-2-methanesulfonylphenyl group, 2,5-didodecanesulfonyl-4-trifluoromethylphenyl group, 4-n-decanesulfonyl-2-cyano 5-trifluoromethylphenyl group, 4-cyano 2-methanesulfonylphenyl group, 4-nitro-2-methanesulfonylphenyl group, 4-nitro-2-n-dodecanesulfonylphenyl group, 4-nitro-2-(2-sulfoethylsulfonyl)phenyl group, 4-nitro 2-carboxymethylsulfonylphenyl group, 4-nitro-2-carboxyphenyl group, 4-nitro-2-ethoxycarbonyl-5-n-butoxyphenyl group, 4-nitro-2-ethoxycarbonyl 5-n-hexadecyloxyphenyl group, 4-nitro-2-diethylcarbamoyl-5-n-hexadecyloxyphenyl group, 4-nitro-2-cyano-5-n-dodecylphenyl group, 4-nitro-2-n-decylthiophenyl group, 4-nitro-3,5-dimethyl-2-n-hexadecanesulfonylphenyl group, 4-2-nitronaphthyl group, 2,4-dinitronaphthyl group, 4-nitro-2-n-octadecylcarbamoylnaphthyl group, 4-nitro-2-dioctylcarbamoyl-5-(3-sulfobenzenesulfonylamino)naphthyl group, 2,3,4,5,6-pentafluorophenyl group, 2-nitro-4-benzoylphenyl group, 2,4-diacetylphenyl group, 2-nitro-4-trifluoromethylphenyl group, 4-nitro 2-trifluoromethylphenyl group, 4-nitro-3-trifluoromethylphenyl group, 2,4,5-tricyanophenyl group, 3,4-dicyanophenyl group, 2-chloro-4,5-dicyanophenyl group, 2-bromo-4,5-dicyanophenyl group, 4-methanesulfonylphenyl group, 4-n-hexadecanesulfonylphenyl group, 2-decanesulfonyl-5-trifluoromethylphenyl group, 2-nitro-5-methylphenyl group, 2-nitro 5-n-octanedecyloxyphenyl group, 2-nitro 4-N-(vinylsulfonylethyl)-N-methyl sulfamoylphenyl group, and 2-methyl-6-nitrobenzoxazole-5-il group.

Specific examples of the heterocyclic group include 2-pyridyl group, 3-pyridyl group, 4-pyridyl group, 5-nitro-2-pyridyl group, 5-nitro-N-hexadecylcarbamoyl-2-pyridyl group, 3,5-dicyano-2-pyridyl group, 5-dodecanesulfonyl 2-pyridyl group, 5-cyano-2-pyridyl group, 4-nitrothiophene-2-il group, 5-nitro-1,2-dimethylimidazole 4-il group, 3,5-diacetyl-2-pyridyl group, 1-dodecyl-5-carbamoylpyridydinium-2-il group, 5-nitro-2-furyl group, and 5-nitrobenzthiazole-2-il group.

The group represented by $\text{-(Time)}_t\text{BA}$ will be further described hereinbelow.

Time represents a group which releases BA via a subsequent reaction caused by an electron acception reaction of PWA. In the case of the compound represented by formula (II) Time represents a group which releases BA via a subsequent reaction caused by nitrogen-oxygen cleavage, nitrogen-nitrogen cleavage, or nitrogen-sulfur cleavage.

Examples of the group represented by Time include various known groups as described in Japanese Patent Application (OPI) Nos. 147,244/86 (pp. 5–6), and 236,549/86 (pp. 8–14) (European Patent No. 198,438), and Japanese Patent Application No. 88,625/86 (pp. 36–44) (European Patent No. 220,746).

Preferred examples of the group represented by Time will be shown hereinafter, but the present invention should not be construed as being limited thereto. In the following general formulas, the mark (*) indicates the position at which the group is bonded to PWR or the dotted line side of the formulae (I) to (III), and the mark (*)(*) indicates the position at which the group is bonded to BA.

(1)

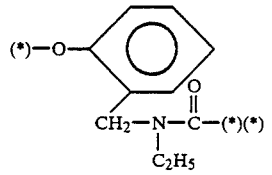

(2)

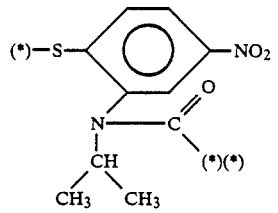

-continued
(3)
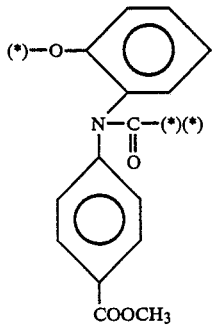
(4)
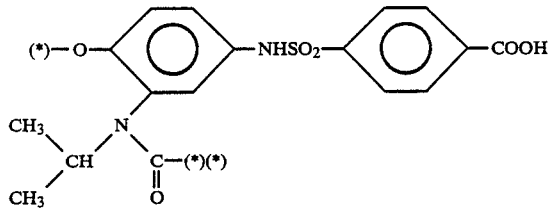
(5)
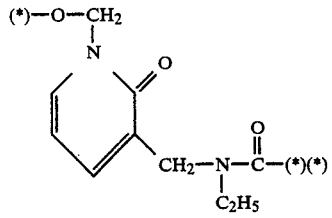
(6)
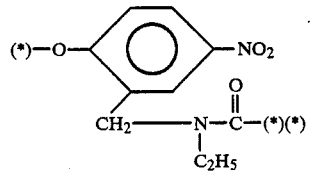
(7)
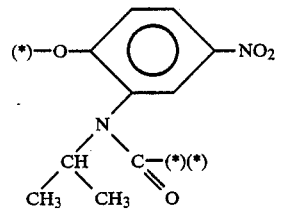
(8)
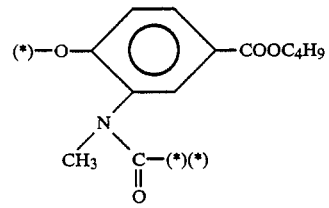
(9)
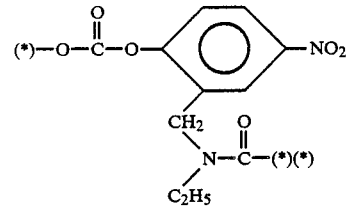

-continued
(10)
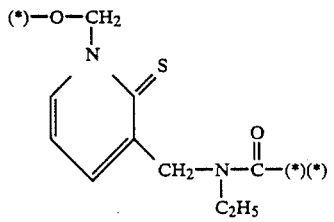
(11)
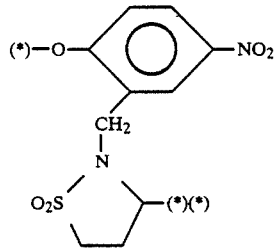
(12)
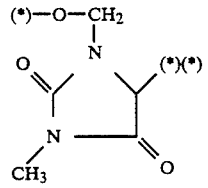
(13)
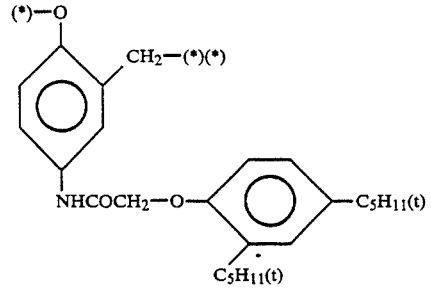
(14)
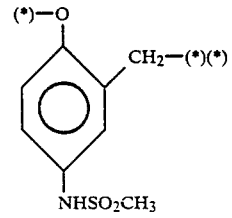
(15)
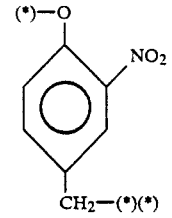

-continued
(16)
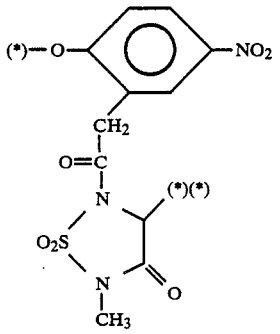
(17)
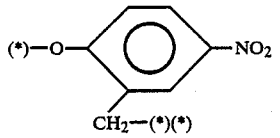
(18)
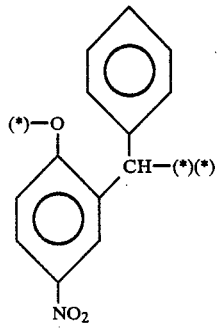
(19)
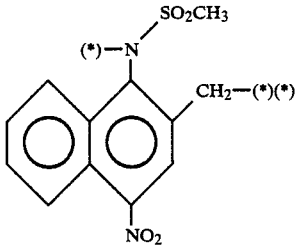
(20)
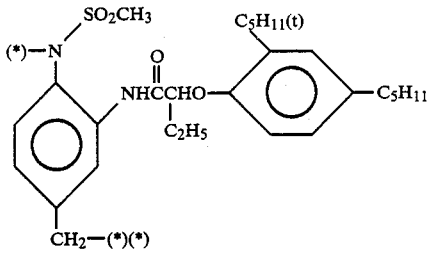

-continued
(21)
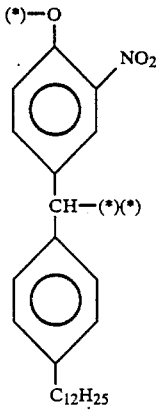
(22)
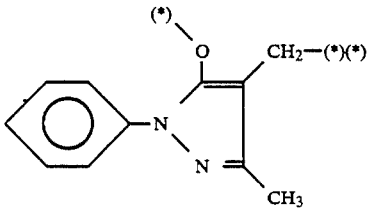
(23)
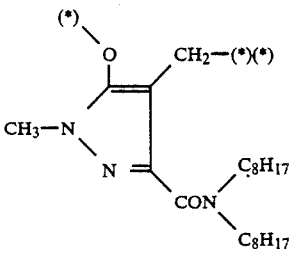
(24)
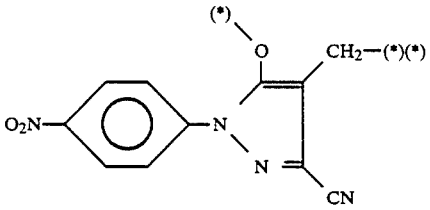
(25)
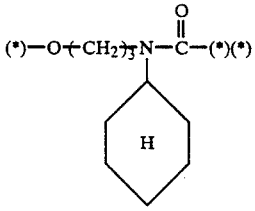
(26)
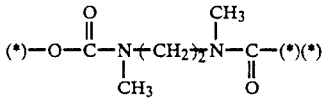
(27)
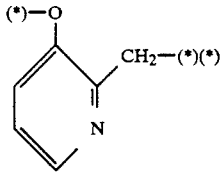

-continued
(28)
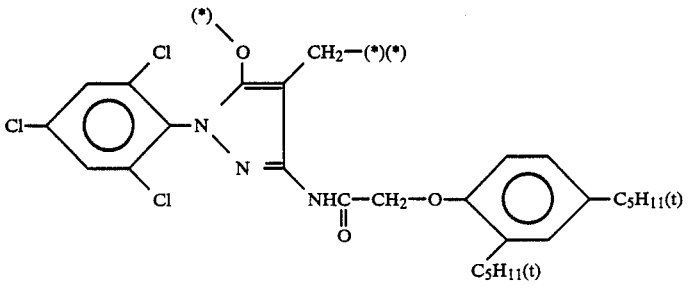
(29)
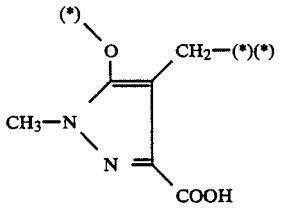
(30)
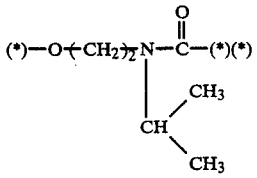
(31)
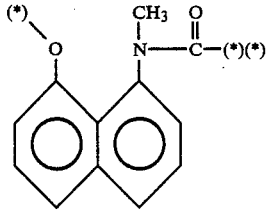
(32)
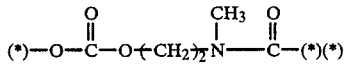
(33)
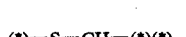
(34)
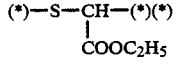
(35)
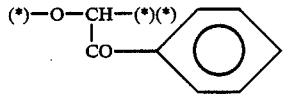
(36)
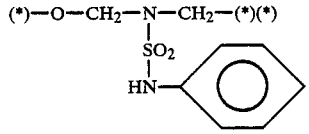
(37)
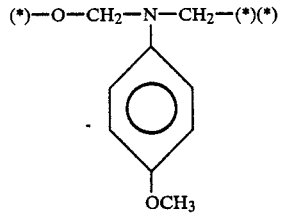

-continued (38)

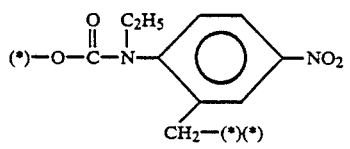

(39)

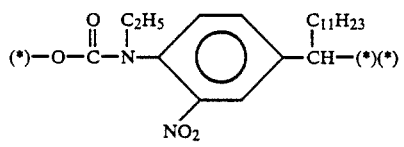

(40)

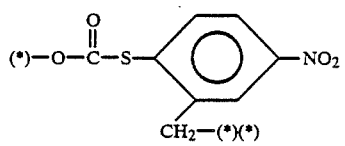

(41)

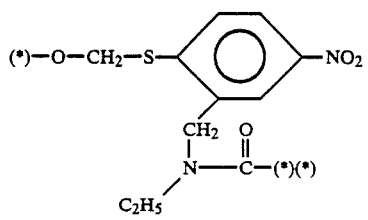

(42)

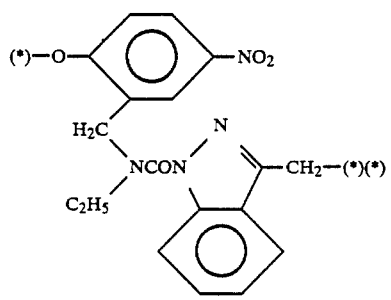

In the present invention, preferred examples of desilvering accelerator to be formed by releasing of BA from the formulae (I) to (III) include those shown hereinafter, but the present invention should not be construed as being limited thereto.

Preferred examples of BA include compounds having a bleach accelerating effect selected from the group consisting of compounds containing mercapto group or disulfide bond, thiazoline derivatives, thiourea derivatives, and isothiourea derivatives. Particularly preferred among these compounds are those represented by the following formulae (a) to (i):

(a)

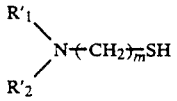

wherein $R'_1$ and $R'_2$ may be the same or different and each represents a hydrogen atom, a substituted or unsubstituted lower alkyl group preferably containing 1 to 5 carbon atoms, such as methyl group, ethyl group, and propyl group, or acyl group preferably containing 1 to 3 carbon atoms, such as acetyl group, and propionyl group; and m represent an integer of 1 to 3.

$R'_1$ and $R'_2$ may be connected to each other to form a ring.

Particularly preferred examples of $R'_1$ and $R'_2$ include a substituted or unsubstituted lower alkyl group.

Examples of substituents contained in $R'_1$ and $R'_2$ include a hydroxyl group, a carboxyl group, a sulfo group, and an amino group.

(b)

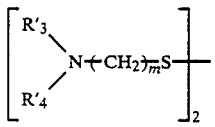

wherein $R'_3$ and $R'_4$ have the same meanings as $R'_1$ and $R'_2$ in the formula (a); and m represents an integer of 1 to 3.

$R'_3$ and $R'_4$ may be connected to each other to form a ring.

Particularly preferred examples of $R'_3$ and $R'_4$ include substituted or unsubstituted lower alkyl group.

Examples of substituents contained in $R'_3$ and $R'_4$ include a hydroxyl group, a carboxyl group, a sulfo group, and an amino group.

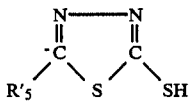

(c)

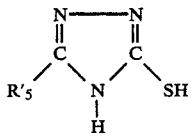

(d)

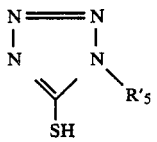

(e)

wherein $R'_5$ represents a hydrogen atom, a halogen atom such as a chlorine atom or a bromine atom, an amino group, a substituted or unsubstituted lower alkyl group preferably containing 1-to 5 carbon atoms, such as methyl group, ethyl group, and propyl group, or an amino group containing mono- or di-alkyl group (the alkyl group preferably has 1 to 5 carbon atoms), such as methylamino group, ethylamino group, dimethylamino group, and diethylamino group.

Examples of the substituents for $R'_5$ include a hydroxyl group, a carboxyl group, sulfo group, and an amino group.

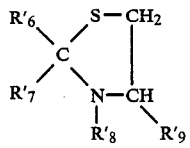

(f)

wherein $R'_6$ and $R'_7$ may be the same or different and each represents a hydrogen atom; a substituted or unsubstituted alkyl group, preferably a lower alkyl group such as those having 1 to 5 carbon atoms (e.g. methyl group, ethyl group, and propyl group); a substituted or unsubstituted phenyl group, a substituted or unsubstituted heterocyclic group, preferably containing at least one hetero atom such as nitrogen, oxygen, and sulfur (e.g. pyridine ring, thiophene ring, thiazoline ring, benzooxazole ring, benzotriazole ring, thiazole ring, and imidazole ring); $R'_8$ represents a hydrogen atom or a substituted or unsubstituted lower alkyl group, preferably containing 1 to 3 carbon atoms, such as methyl group, and ethyl group.

Examples of substituents contained in $R'_6$ to $R'_8$ include a hydroxyl group, a carboxyl group, a sulfo group, an amino group, and a lower alkyl group, preferably having 1 to 5 carbon atoms.

$R'_9$ represents a hydrogen atom or a carboxyl group.

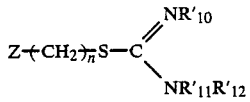

(g)

wherein $R'_{10}$, $R'_{11}$, and $R'_{12}$ may be the same or different and each represents a hydrogen atom or a lower alkyl group preferably containing 1 to 3 carbon atoms, such as methyl group and ethyl group.

$R'_{10}$ and $R'_{11}$ or $R'_{12}$ may be connected to each other to form a ring.

Z represents an unsubstituted amino group, a substituted amino group having a substituent such as a lower alkyl group, having 1 to 5 carbon atoms (e.g. methyl group) and an alkoxyalkyl group, preferably having 1 to 5 carbon atoms (e.g. acetoxymethyl group), a sulfonic acid group, or carboxyl group. The suffix n represents an integer of 1 to 3.

Particularly preferred examples of $R'_{10}$ to $R'_{12}$ include hydrogen atom, methyl group, and ethyl group. Particularly preferred examples of Z are an amino group and a dialkylamino group.

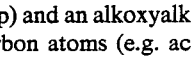

(h)

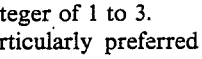

(i)

In formulae (h) and (i) R' represents an alkylene group preferably having 1 to 5 carbon atoms, and M represents a hydrogen atom, an alkali metal atom such as Na, K, and Li, or $NH_4$.

Specific examples of the compounds represented by the general formulae (a) to (i) will be shown hereinafter, but the present invention should not be construed as being limited to those examples.

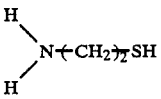

(a)-(1)

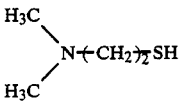

(a)-(2)

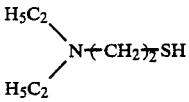

(a)-(3)

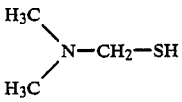

(a)-(4)

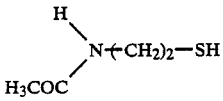

(a)-(5)

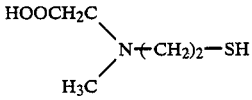

(a)-(6)

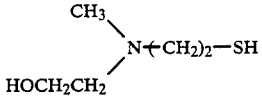

(a)-(7)

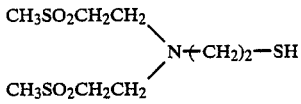

(a)-(8)

-continued
(a)-(9)
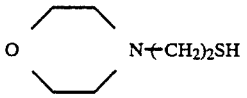
(b)-(1)
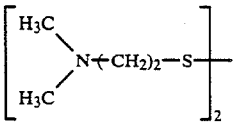
(b)-(2)
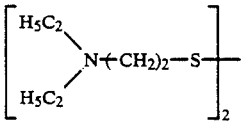
(b)-(3)
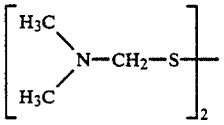
(b)-(4)
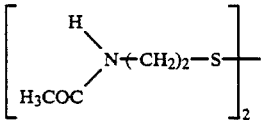
(b)-(5)
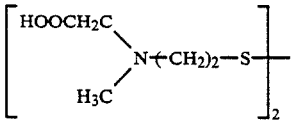
(b)-(6)
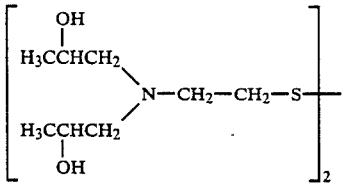
(b)-(7)
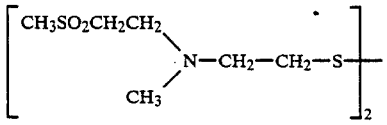
(b)-(8)
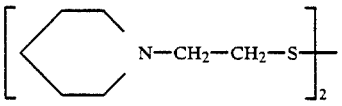
(b)-(9)
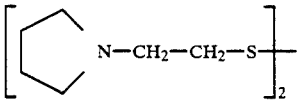
(b)-(10)
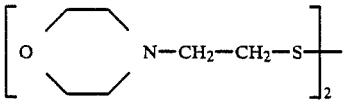
-continued
(c)-(1)
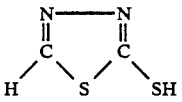
(c)-(2)
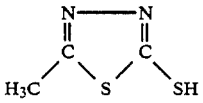
(c)-(3)
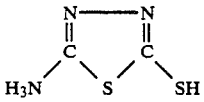
(c)-(4)
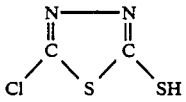
(d)-(1)
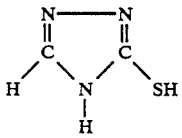
(d)-(2)
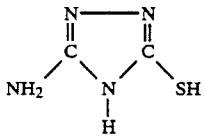
(d)-(3)
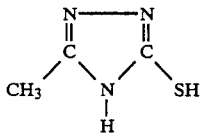
(e)-(1)
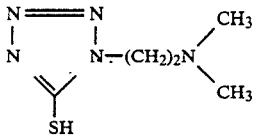
(e)-(2)
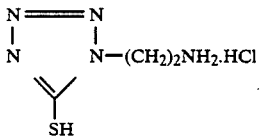
(f)-(1)
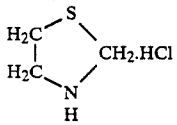
(f)-(2)
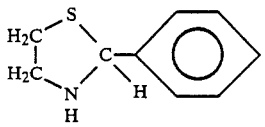
(f)-(3)
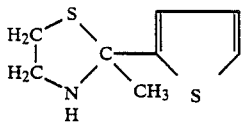

-continued (f)-(4)

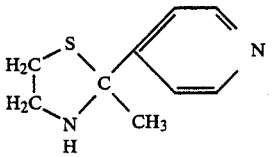

(f)-(5)

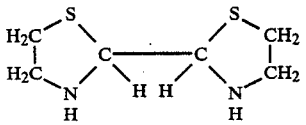

(f)-(6)

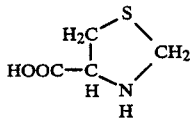

(g)-(1)

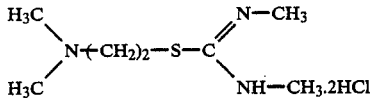

(g)-(2)

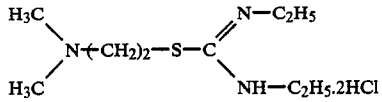

(g)-(3)

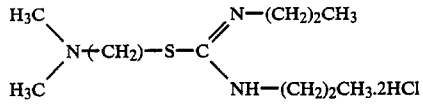

(g)-(4)

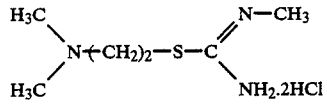

(g)-(5)

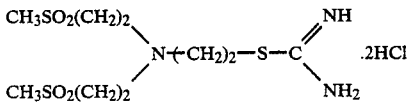

(g)-(6)

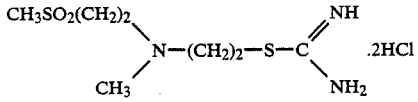

(g)-(7)

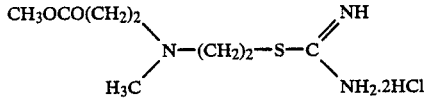

-continued (g)-(8)

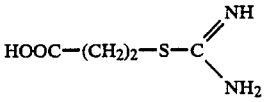

(g)-(9)

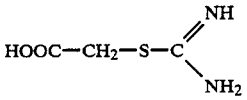

(g)-(10)

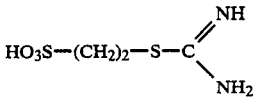

(g)-(11)

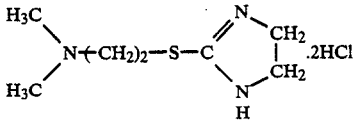

The synthesis of these compounds can be accomplished by any suitable known method. In particular, the synthesis of the compounds represented by the formula (a) can be accomplished by a method as described in U.S. Pat. No. 4,285,984, G. Schwarzenbach et al., Helv. Chim. Acta., 38, 1147 (1955), and R. O. Clinton et al., J. A., Chem. Soc., 70, 950 (1948). The synthesis of the compounds represented by the formula (b) can be accomplished by a method as described in Japanese Patent Application (OPI) No. 95,630/78. The synthesis of the compounds represented by the formulae (c) and (d) can be accomplished by a method as described in Japanese Patent Application (OPI) No. 52,534/79. The synthesis of the compounds represented by the formula (e) can be accomplished by a method as described in Japanese Patent Application (OPI) Nos. 68,568/76, 70,763/76, and 50,169/78. The synthesis of the compounds represented by the general formula (f) can be accomplished by a method as described in Japanese Patent Publication No. 9,854/78, and Japanese Patent Application No. 88,938/83 (U.S. Pat. No. 4,508,814). The synthesis of the compounds represented by the general formula (g) can be accomplished by a method as described in Japanese Patent Application (OPI) No. 94,927/78.

Specific examples of the present compound which releases a desilvering agent will be shown hereinafter, but the present invention should not be construed as being limited thereto.

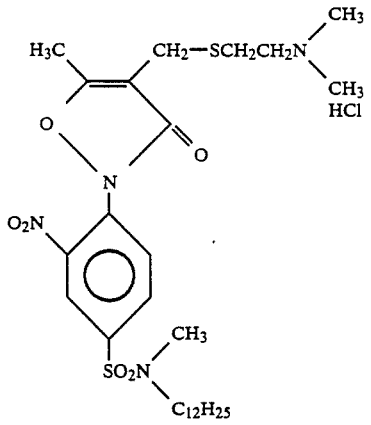
I-1
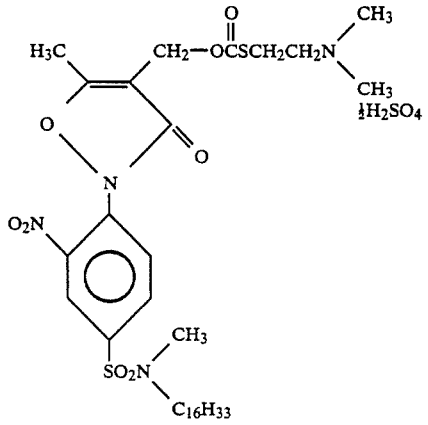
I-2
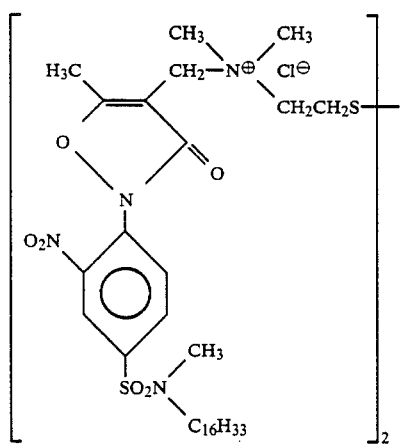
(I-3)

-continued
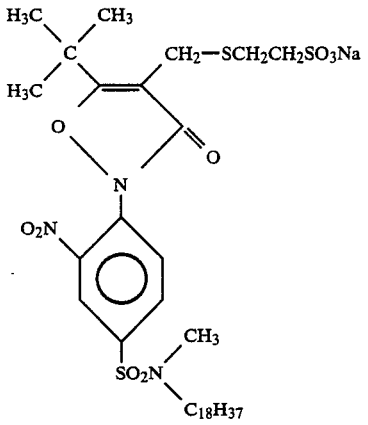
I-4
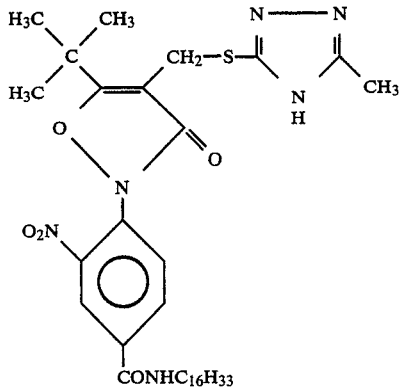
I-5
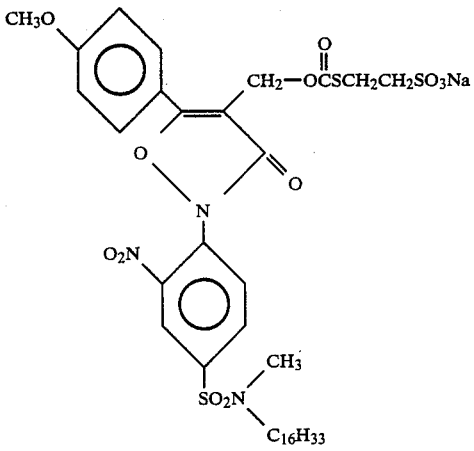
I-6

-continued
I-7
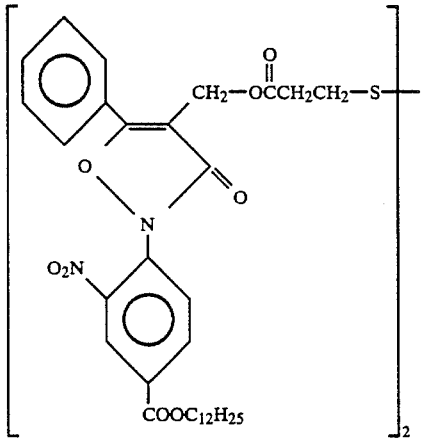
I-8
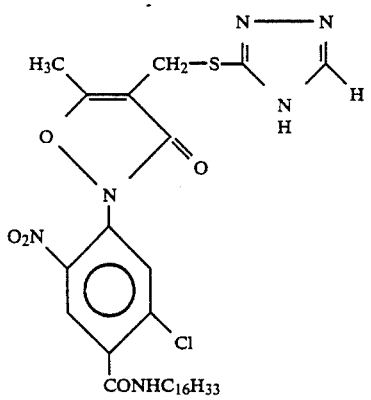
I-9
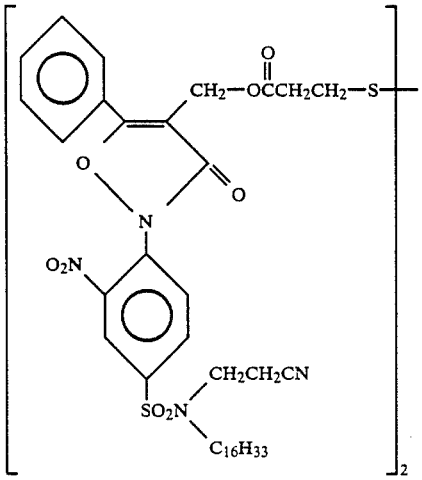
I-10
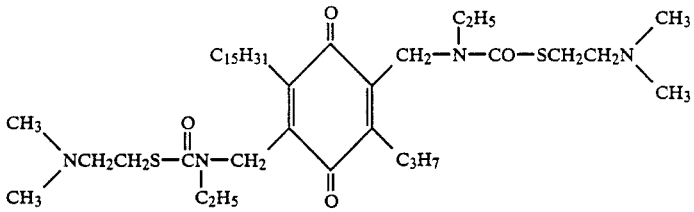

-continued
I-11
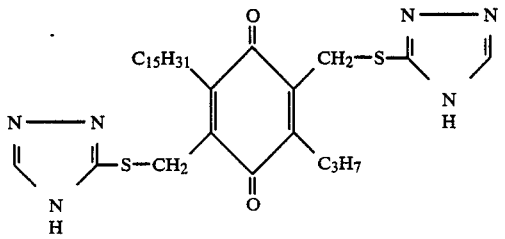
I-12
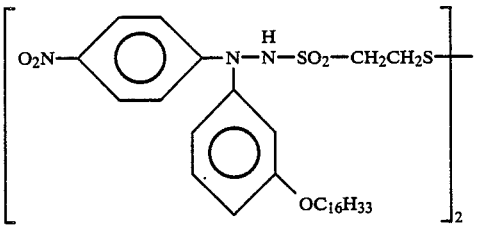
I-13
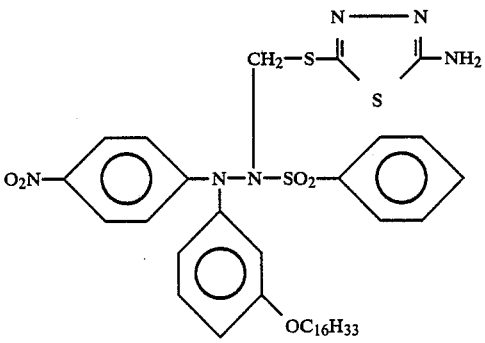
I-14
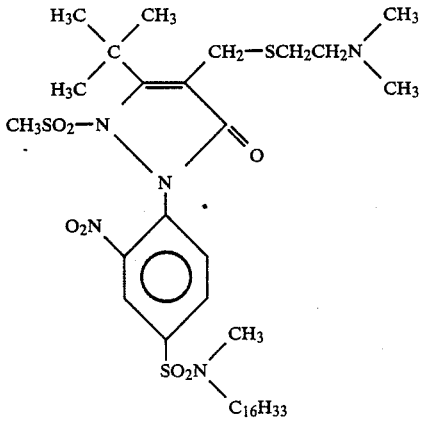
I-15
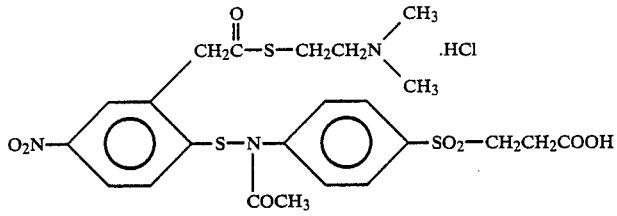

-continued
I-16
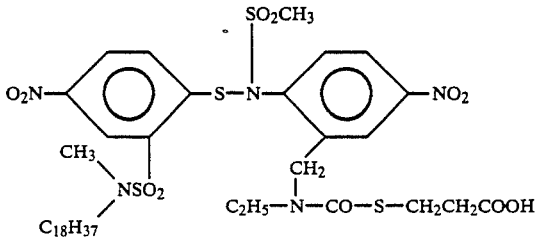
I-17
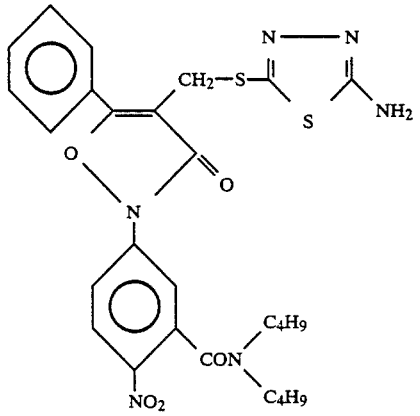
I-18
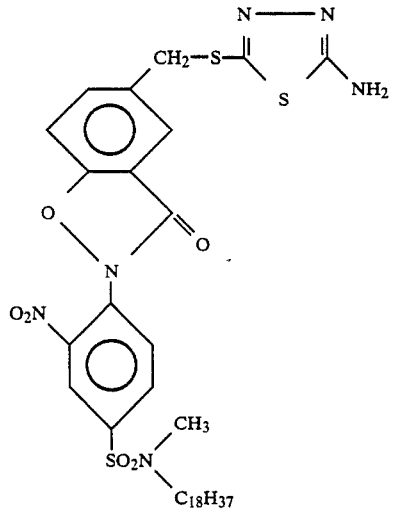
I-19
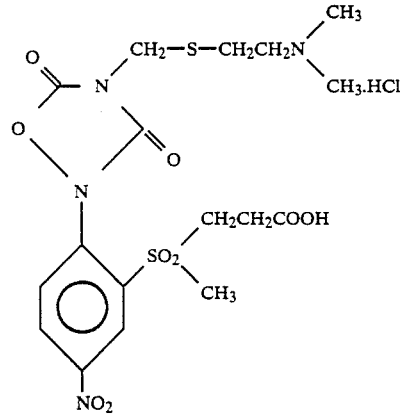

-continued
I-20
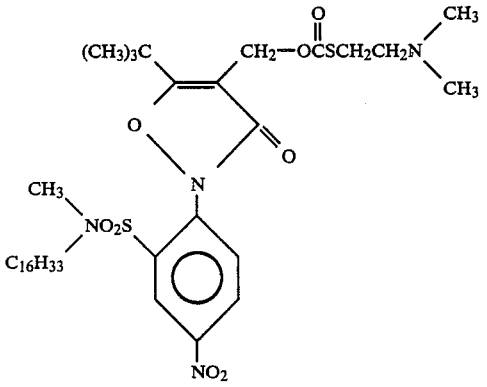
I-21
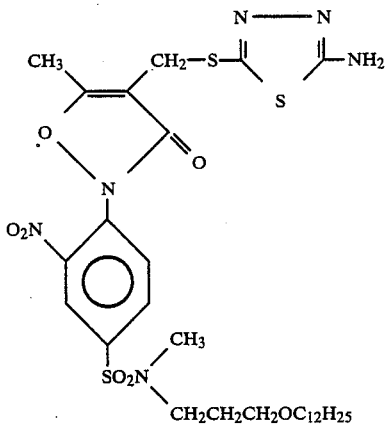
I-22
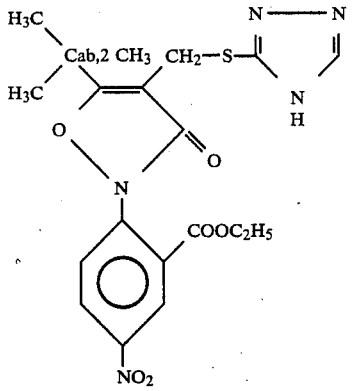
I-23
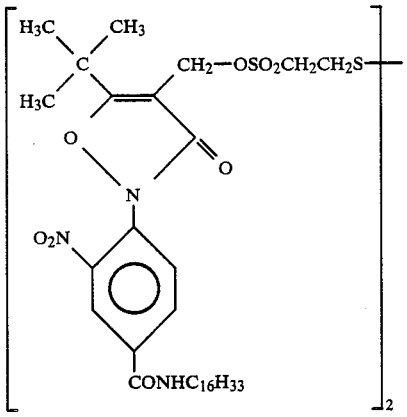

-continued
I-24
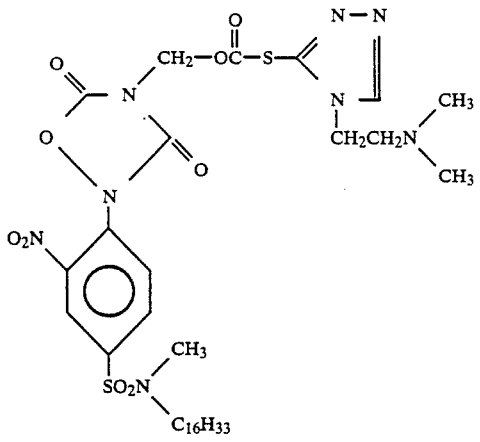
I-25
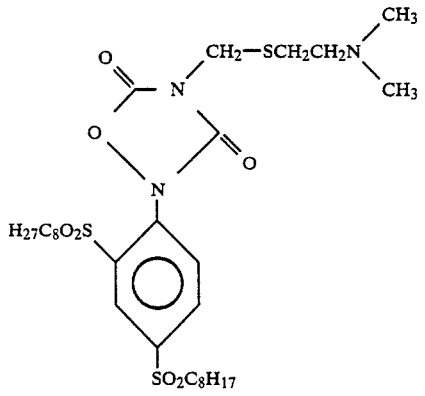
I-26
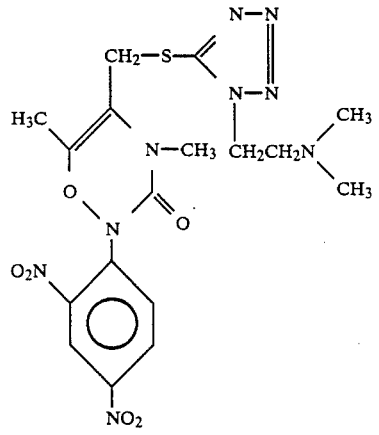

-continued
I-27
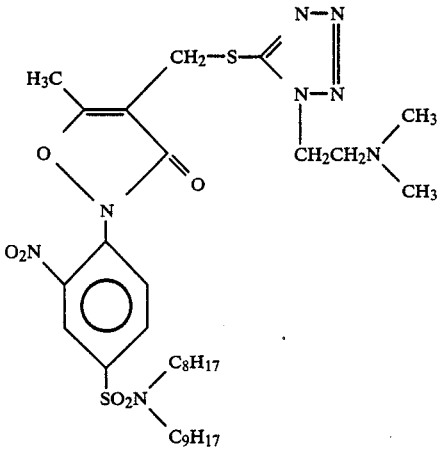
I-28
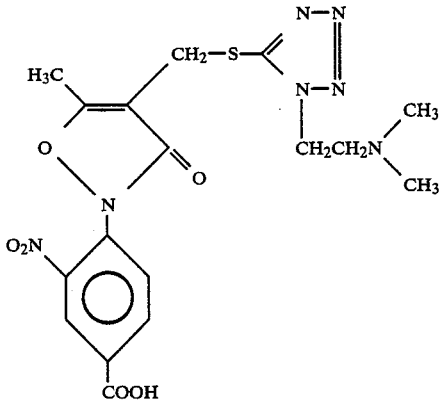
I-29
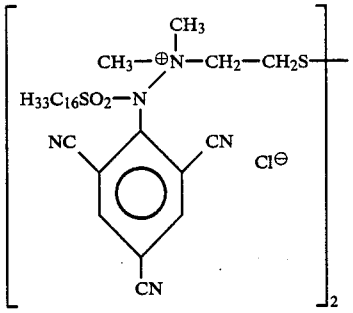
I-30
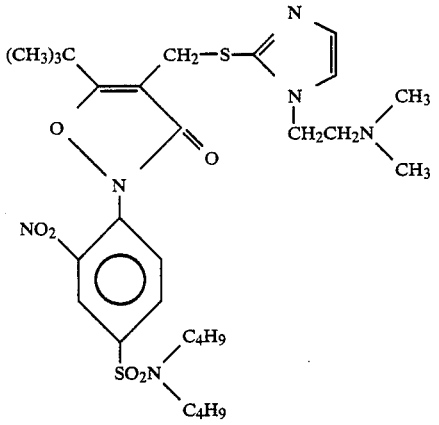

-continued
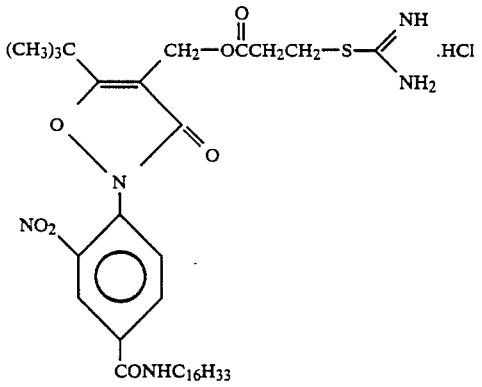
I-31
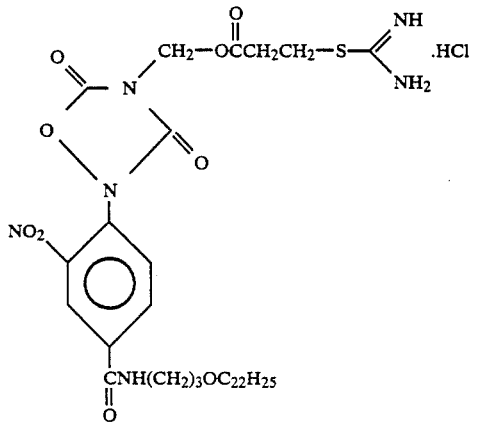
I-32
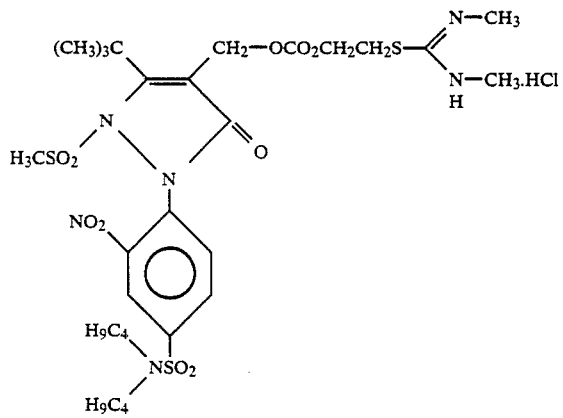
I-33

-continued
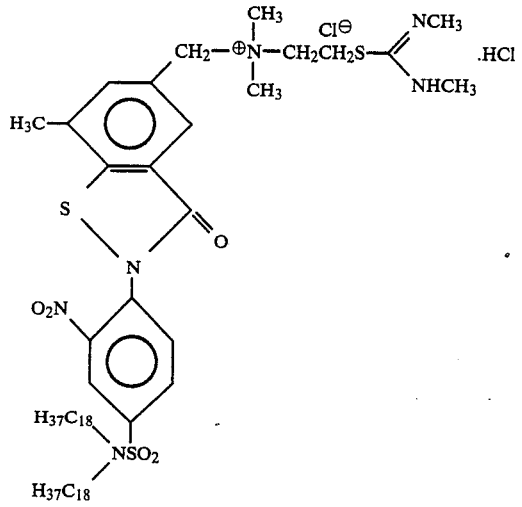
I-34
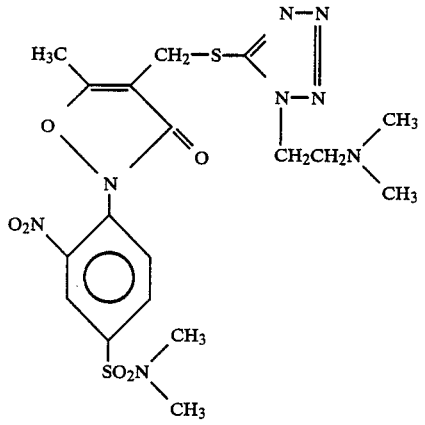
I-35
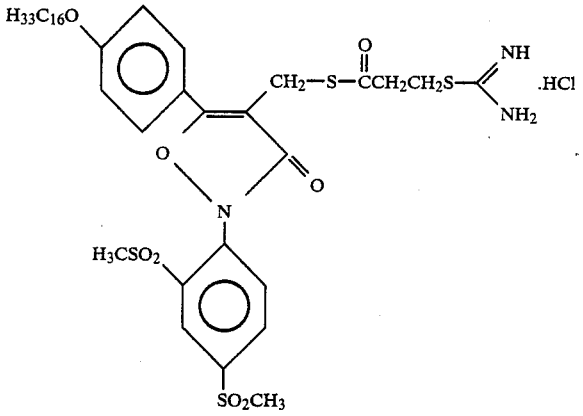
I-36

-continued
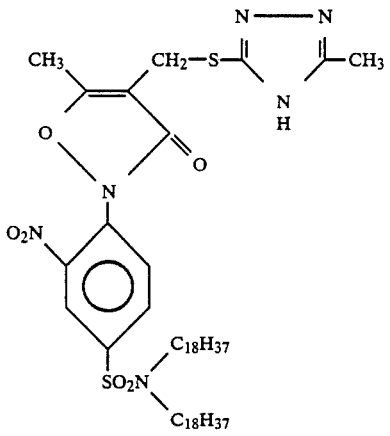
I-37
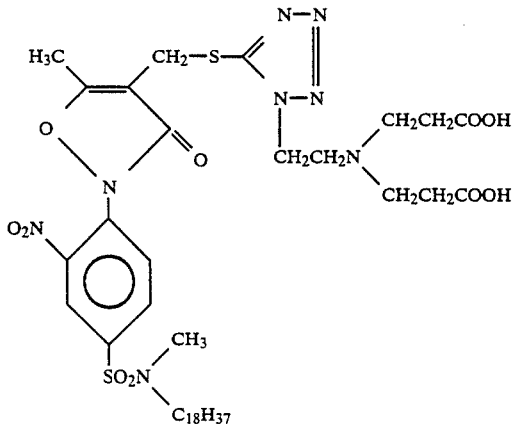
I-38
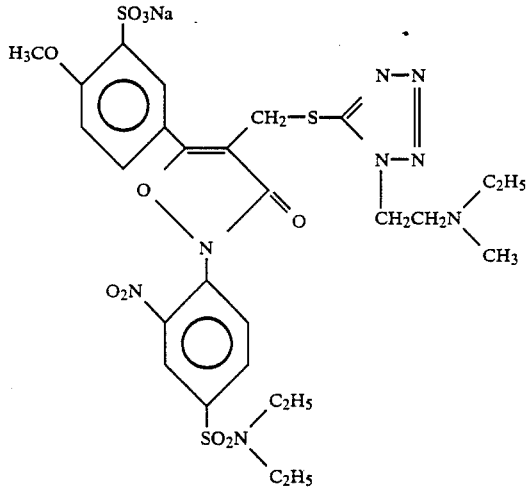
I-39

-continued
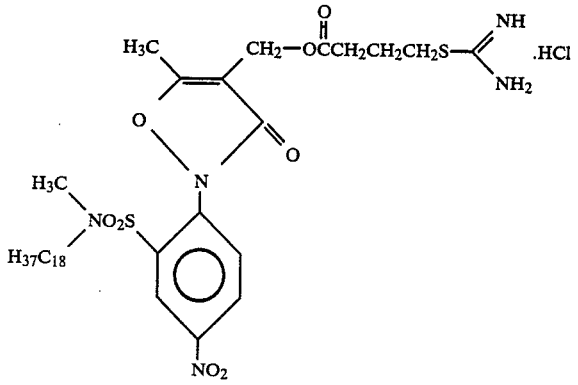
I-40
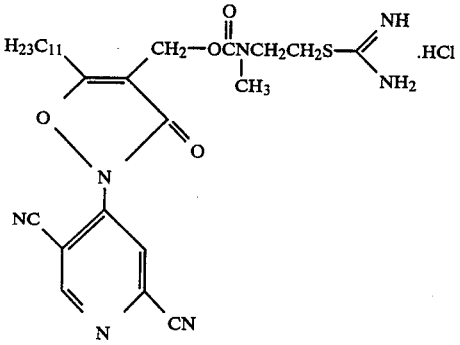
I-41
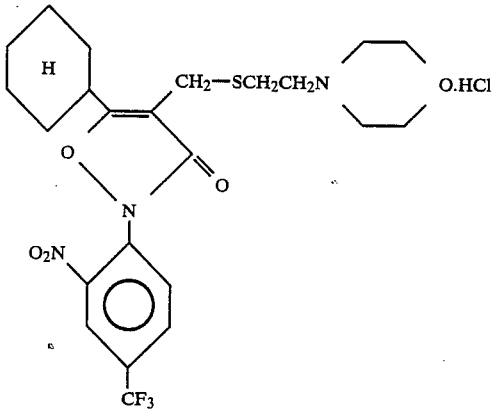
I-42
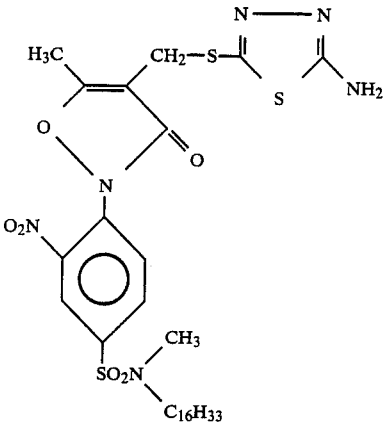
I-43

-continued

I-44

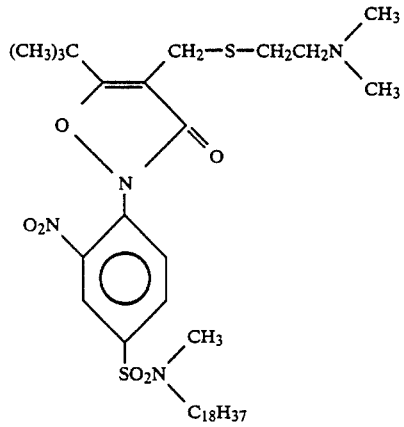

The process for the synthesis of the compounds used in the present invention will be further described hereinbelow.

The synthesis of the portion represented by PWR in the compound represented by the formula (I) can be accomplished by a method as described in the patents cited with reference to PWR (U.S. Pat. Nos. 4,139,389, 4,139,379, 4,564,577, 4,232,107, 4,343,893, 4,619,884, 4,450,223, and 4,609,610, Japanese Patent Application (OPI) Nos. 185,333/84, 84,453/82, 101,649/84, 88,257/86, and 142,530/81, and West German Patent Application (OLS) Patent No. 3,008,588), and Research Disclosure No. 24,025 (1984) IV. The process for the synthesis of the portion represented by PWR in the compound represented by the formula (II) will be described in detail later.

The connection of PWR to $\text{-(Time)-}_t$BA can be accomplished by a method as described in the above cited patents or described later.

The synthesis of BA used in the present invention can be accomplished by a method as described in the patents and literatures cited with reference to BA. The synthesis of Time can be accomplished by a method as described in Japanese Patent Application (OPI) Nos. 147,244/86, and 244,873/85, and patents cited therein.

Therefore, the synthesis of the compound represented by the formula (II) will, be further described herein. Examples of the synthesis of the compound will be described hereinafter by the kind of the X atom (oxygen, sulfur, and nitrogen) bonded to nitrogen atom. Furthermore, in order to give an easy understanding, specific examples of the synthesis of the compound will be described hereinafter.

Firstly, a general example of the synthesis of the compound represented by the formula (II) in which the X atom is an oxygen atom will be described hereinafter.

The most important key to the synthesis of the compound is the process for the connection of the nitrogen-oxygen group to an electron-accepting group. The process of connection can be roughly divided into two methods. In the first method, a nitro group is introduced into an electron-accepting portion. The nitro group is then reduced by a zinc-ammonium chloride system to produce a hydroxylamine in which $\text{-(Time)-}_t$BA is connected. In the other method, a group which can be easily substituted such as halogen atom is introduced into an electron-accepting portion, and then nucleophilically substituted by a hydroxylamine or its equivalent. The former synthesis process can be accomplished by a method as described in S. R. Sandler & W. Karo, "Organic Functional Group Preparation". The latter synthesis process can be accomplished by a reaction in ethanol, dimethylformamide, or dimethylsulfoxide under a neutral or basic condition.

A general example of the synthesis of the compound represented by the formula (II) wherein the X atom is a sulfur atom and the nitrogen-sulfur bond is not contained in the heterocyclic group will now be described. The synthesis process can be roughly divided into two routes.

In Route A, a sulfenamide is synthesized from sulfenyl chloride and an amine and then introduced into an N-acyl or N-sulfonylsulfenamide by the use of the residual nucleophilicity of the amine. In Route B, an N acylated or N-sulfonylated compound is synthesized first from amine. An anion is produced on the nitrogen atom of the compound to effect a nucleophilic substitution reaction with sulfenyl chloride.

The synthesis of sulfenyl chloride was accomplished by the reaction of corresponding disulfide or thiol with chlorine or sulfuryl chloride. The disulfide used was synthesized mainly by the substitution reaction of alkali disulfide with $R_1$—Cl or $R_1$—$^{\oplus}N_2^{\ominus}$X (wherein $R_1$ represents an organic residue corresponding to the disulfide, and X represents an halogen atom). The synthesis of the thiol used was conducted in accordance with a general synthesis method described in Saul Patai, "The Chemistry Of The Thiol Group"; Part I, Chapter 4, 1974, John Wiley & Sons.

On the other hand, the general synthesis of the compound wherein the nitrogen sulfur bond is contained in part of the heterocyclic group can be roughly divided into two methods. In the first method, a heterocycle containing a nitrogen-sulfur bond is synthesized, and the nitrogen atom is then bonded to an electron accepting portion. The synthesis of such a heterocycle can be accomplished by a method as described in A. Katritzky "Comprehensive Heterocyclic Chemistry", Pergamon Press, 1984. The reaction of the heterocycle with the electron-accepting portion can be effected in a solvent such as ethanol, dimethylformamide, and dimethylsulfoxide under a neutral or basic condition. The other synthesis method comprises closing the ring by using the nitrogen atom bonded to the electron-accepting portion.

The general synthesis of the compound represented by the formula (II) wherein the X atom is a nitrogen atom can be roughly divided into the following two methods:

Method A

An electron accepting group capable of aromatic nucleophilic substitution reaction such as 4-halo-3-nitrobenzenesulfonamide is allowed to react with hydrazide or sulfonylhydrazine in the presence of a base in a nonprotonic polar solvent such as dimethylsulfoxide or dimethylformamide. The reaction product is then halomethylated. BA is then bonded to the reaction product by substitution reaction. Alternatively, if BA is reactive with hydrazide or sulfonylhydrazine, BA may be allowed to react with these compounds to effect the desired synthesis.

Method B

An electron-accepting group capable of aromatic nucleophilic substitution reaction such as 4-halo-3-nitrobenzenesulfonamide is allowed to react with a heterocyclic compound containing N—N bond in which any one of the two nitrogen atoms as dissociable in a nonprotonic polar solvent as used in Method A to allow the electron-accepting group to be bonded to a nitrogen atom in the heterocycle. By selecting the above described heterocyclic compounds and applying this reaction compounds which is able to release BA as shown in some of specific examples of the compound of formula (I) can be obtained.

In order to further simplify the explanation of the general synthesis of the present compound, specific synthesis examples will be described hereinafter. However, the present invention should not be construed as being limited to those examples.

SYNTHESIS EXAMPLE 1 (Synthesis of Compound I-43)

Example 1-1 (Synthesis of 5-methyl 3-hydroxyisooxazole)

The synthesis of the desired compound can be accomplished by a method as described in Sankyo Kenkyusho's Annual Report Vol. 22, page 215 (1970), Japanese Patent Publication Nos. 9,675/77, and 48,953/74, Japanese Patent Application (OPI) Nos. 206,668/82, 206,667/82, 194,867/83, 70,878/82, 190,977/84, and 501,907/84, Bulletin de la societe chimique de France, page 1978, Tetrahedron, Vol. 20, page 2835, (1964), Journal of Organic Chemistry, Vol. 48, page 4,307 (1983), Chemical and Pharmaceutical Bulletin, Vols. 14 and 277, Heterocycles, Vol. 12, No. 10, page 1,297, and Canadian Journal of Chemistry, Vol. 62, page 1,940.

The method described in Japanese Patent Application (OPI) No. 501,907/84 was used to synthesize the desired compound.

m.p. 85°–86° C.

Example 1-2 (synthesis of N-hexadecyl-3-nitro-4-chlorobenzenesulfonamide)

800 g of 3-nitro 4-chlorobenzenesulfonylchloride and 1,000 ml of dichloromethane were mixed. A dichloromethane solution of 600 g of hexadecylamine and 251 ml of triethylamine was added dropwise to the mixture. After the reaction was finished, the reaction solvent was removed under reduced pressure. 3,000 ml of methanol was added to the system. The mixture was then heated so that dissolution was effected. The solution was then gradually cooled. As a result, crystals precipitated. The crystals were then filtered off, and dried.

Yield: 1,020 g (88%); m.p. 91°–93 ° C.

Example 1-3 (synthesis of N-methyl N-hexadecyl-3-nitro-4-chlorobenzenesulfonamide)

170 g of N-hexadecyl-3-nitro-4-chlorobenzenesulfonamide was dissolved in 640 ml of acetone. 79 g of potassium carbonate, 6 ml of polyethylene glycol, and 71 g of dimethyl sulfate were added to the solution. The admixture was heated under reflux for 5 hours. 240 ml of acetone was then added to the reaction system. 870 ml of water was added dropwise to the reaction system at a temperature of 40° C. The reaction system was allowed to cool to room temperature. As a result, crystals precipitated. The crystals were then filtered off, washed with water and methanol, and dried.

Yield: 169 g (97%); m.p. 74°–75° C.

Example 1-4 (synthesis of 5-methyl-2-(4-N-methyl-N-hexadecylsulfamoyl-2-nitrophenyl)-4-isooxazoline-3-one 16 g of N-methyl-N-hexadecyl-3-nitro-4-chlorobenzenesulfonamide, 4.8 g of 5-methyl-3-hydroxyisooxazole, 6.4 g of sodium hydrogencarbonate, and 50 ml of dimethylsulfoxide were mixed. The mixture was allowed to undergo reaction at a temperature of 75° C. for 6 hours. The reaction solution was poured into iced water acidified with hydrochloric acid. The resulting crystals were filtered off, washed with water, recrystallized from methanol, and then dried.

Yield: 17.9 g (99%); m.p. 63°–65° C.

Example 1-5 (synthesis of 5-methyl-4-chloromethyl-2-(4-N-methyl-N-hexadecylsulfamoyl-2-nitrophenyl)-4-isooxazoline-3-one)

16 g of 5-methyl-2-(4-N-methyl-N-hexadecylsulfamoyl-2-nitrophenyl)-4-isooxazoline-3-one, 5 g of zinc chloride, 7 g of paraformaldehyde, 50 ml of acetic acid, and 0.5 ml of concentrated sulfuric acid were mixed. The mixture was then stirred at a temperature of 75° C. with hydrogen chloride gas bubbled thereinto for 9 hours. After the reaction system was allowed to cool, it was poured into water. The resulting crystals were filtered off, and then recrystallized from methanol.

Yield: 16.3 g (94% ; m.p. 55°–56° C.

Example 1-6 (synthesis of Exemplary Compound I-43)

50 ml of ethyl acetate and 1.5 g of triethylamine were added to 5.9 g of 5-methyl-4-chloromethyl-2-(4-N-methyl-N-hexadecylsulfamoyl-2-nitrophenyl)-4-isooxazoline-3-one and 1.4 g of the undermentioned Compound (a). The reaction mixture was allowed to undergo reaction at room temperature of 4 hours. After the solvent was removed, the residue was recrystallized from methanol.

Yield: 5.2 g (76%).

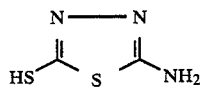

Compound (a)

SYNTHESIS EXAMPLE 2 (Synthesis of Compound I-44)

Example 2-1 (synthesis of 5-t-butyl-3-hydroxyisooxazole)

583.7 g of hydroxylamine hydrochloride was dissolved in 2 l 4N sodium hydroxide aqueous solution, and than 2 l of ethanol was added to the solution while being cooled with ice. A 1:1 (volume ratio) mixture of 4N sodium hydroxide and ethanol was added to the solution so that the pH value thereof was adjusted to 10.0. 1380 g of pivaloylacetic acid ethyl ester and a 1:1 (volume ratio) mixture of 4N aqueous solution of sodium hydroxide and ethanol was added dropwise to the reaction solution while the pH and temperature thereof were adjusted to 10.0±0.2 and 0° to 5° C., respectively.

After the dropwise addition was finished, the reaction solution was stirred at room temperature of 2 hours. The reaction solution was then poured into 6 kg of concentrated hydrochloric acid of 0° C. The admixture was allowed to stand for 12 hours. The resulting crystals were filtered off, thoroughly washed with water, and then dried.

Yield: 770 g (68.2%); m.p. 99°-101° C.

Example 2-2 (synthesis of N-methyl-N-octadecyl-5-nitro-2-chlorobenzenesulfonamide)

44 g of 5-nitro-2-chlorobenzenesulfonylchloride and 100 ml of dichloromethane were mixed. A dichloromethane solution of 48.4 g of methyloctadecylamine and 36.1 ml of triethylamine was added dropwise to the mixture. After the reaction was completed, the reaction solvent was removed under reduced pressure. 300 ml of methanol was added to the reaction system so that dissolution was effected. The solution was then gradually allowed to cool. As a result, crystals precipitated. The crystals were filtered, and then dried.

Yield: 64 g (74%).

Example 2-3 (synthesis of 5-t-butyl-2-(2-N-methyl-N-octadecylsulfamoyl-4-nitrophenyl)-4-isooxazoline-3-one.

62.0 g of N-methyl-N-octadecyl-5-nitro-2-chlorobenzenesulfonamide, 20.9 g of 5-t-butyl-3-hydroxyisooxazole, 20.7 g of potassium carbonate, and 300 ml of dimethylformamide were mixed. The reaction mixture was allowed to undergo reaction at a temperature of 80° C. for 6 hours. The reaction solution was then poured into iced water. The reaction solution was extracted with ethyl acetate. The organic layer thus extracted was dried under reduced pressure. The residue was purified through a silica gel column chromatography. The desired object was eluted with a 2:1 (volume ratio) mixture of n-hexane and ethyl acetate.

Yield: 29.0 g (37%).

Example 2-4 (synthesis of 5-t-butyl-4-chloromethyl-2-(2-N-methyl-N-octadecylsulfamoyl-4-nitorphenyl)-4-isooxazoline-3-one)

20 g of 5-t-butyl-2-(2-N-methyl-octadecysulfamoyl-4-nitrophenyl)-4-isooxazoline-3-one, 5.4 g of zinc chloride, 3 g of paraformaldehyde, and 100 ml of acetic acid were mixed. The reaction mixture was then heated under reflux with hydrogen chloride gas bubbled thereinto for 10 hours. After being cooled, the reaction solution was poured into ice water. The reaction solution was then extracted with ethyl acetate. The organic layer thus extracted was dried under reduced pressure. The residue was purified through a silica gel column chromatography. The desired object was eluted with a 2:1 (volume) mixture of n-hexane and ethyl acetate.

Yield: 12.0 g (58%).

Example 2-5 (synthesis of 4-acetoxymethyl 5-t-butyl-2-(2-N-methyl-N-octadecylsulfamoyl-4-nitrophenyl)-4-isooxazoline-3-one)

20.0 g of 5-t-butyl-4-chloromethyl-2-(2-N-methyl-N-octadecylsulfamoyl-4-nitrophenyl)-4-isooxazoline-3-one was dissolved in 200 ml of dimethylsulfoxide. 12 g of potassium acetate and 0.5 g of sodium iodide were added to the solution. The admixture was then stirred at room temperature for 5 hours. The reaction mixture was poured into water. The reaction solution was then extracted with ethyl acetate, washed with water, and concentrated. The residue was recrystallized from methanol to obtain colorless crystals.

Yield: 16.5 g (80%)

Example 2-6 (synthesis of 5-t-butyl-4-hydroxymethyl-2-(2-N-methyl-N-octadecylsulfamoyl-4-nitrophenyl)-4-isooxazoline-3-one 200 ml of ethanol was added to 15 g of 4-acetoxymethyl-5-t butyl-2-(2-N-methyl-N-octadecylsulfamoyl-4-nitrophenyl)-4-isooxazoline-3-one. The admixture was heated so that dissolution was completed. 40 ml of 9N hydrochloric acid aqueous solution was gradually added to the solution. The admixture was heated under reflux for 1 hour. The reaction solution was poured into water. The reaction solution was then extracted with ethyl acetate, washed with water, and concentrated. The residue was recrystallized from methanol.

Yield: 14 g (99%)

Example 2-7 (synthesis of Exemplary Compound I-44)

Phosgene gas was blown into a suspension of 6.4 g of 5-t butyl 4-hydroxymethyl-2-(2-N-methyl-N-octadecylsulfamoyl-4-nitrophenyl)-4-isooxazoline-3-one in 80 ml of benzene at room temperature. After the benzene solution became homogeneous, it was allowed to stand overnight. After benzene was removed under reduced pressure, the residue was dissolved in 300 ml of tetrahydrafuran. The solution was added dropwise to a tetrahydrofuran solution of 1.5 g of the undermentioned compound (b) and 3 g of triethylamine while being cooled with ice. After the dropwise addition was finished, the solution was stirred at room temperature for 1 hour. The reaction solution was then poured into diluted solution of sodium hydrogencarbonate, and extracted with ethyl acetate. The solution thus extracted was washed with water, and concentrated under reduced pressure. The residue was subjected to column chromatography with alumina as a support. The desired object was obtained from a chloroform fraction.

Yield: 3.5 g (49.5%).

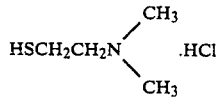

Compound (b)

The compound of the present invention can be used in a wide range of amounts. The compound may be preferably used in an amount of $1\times10^{-5}$ to $1\times10^{3}$ mol, particularly $1\times10^{-4}$ to $1\times10^{-1}$ mol per 1 mol of silver halide.

The compound represented by formula (I) may be incorporated in a light-sensitive silver halide layer, a non-light sensitive hydrophilic layer or both of these layers. The compound may be incorporated in two or more of these layers. Examples of the hydrophilic layer include a protective layer, an interlayer and an anti-halation layer.

The compound represented by formula (I) can be incorporated into photographic light-sensitive materials using various known dispersing methods. Typical examples thereof include a solid dispersing method and an alkali dispersing method, preferably a latex dispersing method, and more preferably an oil droplet-in-water type dispersing method. By means of the oil droplet-in-water type dispersing method, the compound is dissolved in either an organic solvent having a high boiling point of 175° C. or more, an auxiliary solvent having a low boiling point, or a mixture thereof and, then, the solution is finely dispersed in an aqueous medium such as water or an aqueous gelatin solution, etc. In the presence of a surface active agent. Specific examples of the organic solvents having a high boiling point are those as described in U.S. Pat. No. 2,322,027, etc. The dispersion may involve a phase inversion, and the auxiliary solvent may be removed or reduced, if desired, by distillation, noodle washing, or ultrafiltration before coating on a support.

The present compound is uniformly reduced by a reducing substance during development (uniformly regardless of development of silver halide through whole light sensitive material) to release a desilvering accelerator. The desilvering accelerator thus released is adsorbed by developed silver. The desilvering accelerator thus adsorbed can be believed to accelerate bleaching at the bleaching process.

Anyway, the present compound can exist stably in the light-sensitive material before processing and fulfills its function only upon development. Therefore, the present compound does not impair the photographic properties during storage.

The reducing substance which can be used in the present invention may be either an inorganic compound or an organic compound. The oxidation potential of the present compound is preferably lower than 0.80 V, which is the standard oxidation-reduction potential of silver ion/silver.

Examples of such an inorganic reducing substance include a metal having an oxidation potential of 0.8 V or lower such as Mn, Ti, Si, Zn, Cr, Fe, Co, Mo, Sn, Pb, W, Sb, Cu, Hg, and $H_2$. Other examples of an ion and complex ion having an oxidation potential of 0.8 V or lower, include $Cr^{2+}$, $V^{2+}$, $Cu^{+}$, $Fe^{2+}$, $MnO_4^{2-}$, $I^{-}$, $Co(CN)_6^{4-}$, $Fe(CN)_6^{4-}$, and $(Fe\text{-}EDTA)^{2-}$. Further examples of such an inorganic reducing substance include hydrogenated metal having an oxidation potential of 0.8 V or lower such as NaH, LiH, KH, $NaBH_4$, $LiBH_4$, $LiAl(OC_4H_9\text{—}t)_3H$, and $LiAl(OCH_3)_3H$. Further examples of such an inorganic reducing substance include sulfur or phosphorous compound having an oxidation potential of 0.8 V or lower such as $Na_2SO_3$, NaHS, $NaHSO_3$, $H_3P$, $H_2S$, $Na_2S$, and $Na_2S_2$.

Examples of the organic reducing substance include organic nitrogen compound such as an aliphatic amine and an aromatic amine, organic sulfur compounds such as an aliphatic thiol and an aromatic thiol, and organic phosphorous compounds such as an aliphatic phosphine and an aromatic phosphine. Preferred examples of such organic reducing substance include compounds according to the Kendal-Pelz equation as described in T. H. James, The Theory of the Photographic Process, 4th Edition, (MacMillan & Sons), page 299. Examples of these compounds are shown below.

$$a\text{—}(CH{=}CH)_n\text{—}a' \text{ and } a\text{—}(CH{=}N)_n\text{—}a'$$

wherein a and a' each represents —OH, $—NH_2$, —NHR or $NR_2$, n represents an integer, and R represents a group substitutable at H.

Examples of compounds which can be used as reducing substances in the present invention include inorganic reducing agents such as sodium sulfite, and sodium hydrogensulfite, benzenesulfinic acids, hydroxylamines, hydrazines, hydrazides, borane-amine complex, hydroquinones, aminophenols, catechols, p-phenylenediamines, 3-pyrazolidinones, hydroxytetronic acids, ascorbic acids, and 4-amino-5-pyrazolones. Other examples of compounds which can be used as reducing substances include reducing agents as described in T. H. James, The Theory of the Photographic Process, 4th Edition, pp. 291–334. Further examples of compounds which can be sued as reducing substances include reducing agent precursors as described in Japanese Patent Application (OPI) Nos. 138,736/81, and 40,245/82, and U.S. Pat. No. 4,330,617.

Examples of reducing agents which can be more preferably used in the present invention include 3-pyrazolidones and precursors thereof such as 1-phenyl 3-pyrazolidone, 1-phenyl 4,4-dimethyl 3-pyrazolidone, 4-hydroxy-methyl-4-methyl 1-phenyl-3-pyrazolidone, 1-m-tolyl-3-pyrazolidone, 1-p-tolyl-3-pyrazolidone, 1-phenyl 4-methyl-3-pyrazolidone, 1-phenyl-5-methyl-3-pyrazolidone, 1-phenyl-4,4-bis (hydroxymethyl)-3-pyrazolidone, 1,4-dimethyl-3-pyrazolidone, 4-methyl-3-pyrazolidone, 4,4-dimethyl-3-pyrazolidone, 1-(3-chlorophenyl)-4-methyl-3-pyrazolidone, 1-(4-chlorophenyl)-4-methyl-3-pyrazolidone, 1-(4-tolyl)-4 methyl-3-pyrazolidone, 1-(2-tolyl)-4-methyl-3-pyrazolidone, 1-(4-tolyl)-3-pyrazolidone, 1-(3-tolyl)-3-pyrazolidone, 1-(3-tolyl)-4,4-dimethyl-3-pyrazolidone, 1-(2-trifluoroethyl)-4,4-dimethyl-3-pyrazolidone, 5-methyl-3-pyrazolidone, 1,5-diphenyl-3-pyrazolidone, 1-phenyl-4-methyl 4-stearoyloxymethyl-3-pyrazolidone, 1-phenyl-4-methyl-4-lauroyloxymethyl-3-pyrazolidone, 1-phenyl-4,4-bis-(lauroyloxymethyl)-3-pyrazolidone, 1-phenyl-2-acetyl-3-pyrazolidone, and 1-phenyl-3-acetoxypyrazolidone; hydroquinones and precursors thereof such as hydroquinone, toluhydroquinone, 2,6-dimethylhydroquinone, t-butylhydroquinone, 2,5-di-t-butylhydroquinone, t-octylhydroquinone, 2,5-di-t-octylhydroquinone, pentadecylhydroquinone, sodium 5-pentadecylhydroquinone-2-sulfonate, p-benzoyloxyphenol, 2-methyl-4-benzoyloxyphenol, 2-t-butyl-4-(4-chlorobenzoyloxy)phenol, sodium hydroquinone-2-sulfonate, 2-{3,5-bis(2-hexyldecanamide)benzamide}hydroquinone, 2-(3-hexadecanamide)benzamidehydroquinone, and 2-(2-hexyldecanamide)hydroquinone; and paraphenylenediamine color developing agents such as 4-amino N,N-diethylaniline, methyl 4-amino-N,N-diethylaniline, 4-amino-N-ethyl-N-$\beta$hydroxyethylaniline, 3-methyl-4-amino-N-$\beta$-hydroxyethylaniline, 3-methyl-4-amino-N-ethyl-N-$\beta$-butoxyethylaniline, 3-methyl-4-amino N-ethyl-N-$\beta$-methanesulfonamideethylaniline, and 4-amino-3-methyl N-ethyl-N-$\beta$-methoxyethylaniline.

Examples of aminophenol reducing agents include 4-amino-2,6-dichlorophenol, 4-amino-2,6-dibromophenol, 4-amino-2-methylphenol sulfate, 4-amino-3-methylphenol sulfate, and 4-amino-2,6-dichlorophenol hydrochloride. Other useful examples reducing agents include 2,6-dichloro-4-substituted sulfonamidephenol, and 2,6-dibromo-4-substituted sulfonamidephenol as described in Research Disclosure No. 15,108, and U.S. Pat. No. 4,021,240, and p-(N,N-dialkylaminophenyl)sulfamine as described in Japanese Patent Application (OPI) No. 116,740/84. Besides the above described phenolic reducing agents, naphtholic reducing agents are useful. Examples of such naphtholic reducing agents include 4-amino-naphthol derivatives, and 4-substituted sulfonamidenaphthol derivatives. Further examples of general color developing agent which can be used in the present invention include aminohydroxypyrazole derivatives as described in U.S. Pat. No. 2,895,825, aminopyrazolidone derivatives as described in U.S. Pat. No. 2,892,714, and hydrazone derivatives as described in Research Disclosure Nos. 19,412, and 19,415, pp. 227–230, and pp. 236–240, June 1980. These color developing agents may be used singly or in combination.

Generally, these color developing agents are used for color developing solution.

The reducing agent which can be present in the color light-sensitive material preferably serves very little, or does not serve at all, as a reducing substance while contained in an unexposed light-sensitive material. Rather, the reducing agent serves as a reducing substance only when its reducing power is increased at the color development process after imagewise exposure to light. Furthermore, the reducing agent can be preferably present with the compound of the present invention in the same layer, preferably in the same dispersed particles.

Examples of such reducing agents will be shown hereinafter, but the present invention should not be construed as being limited thereto.

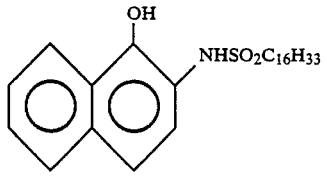

S-1

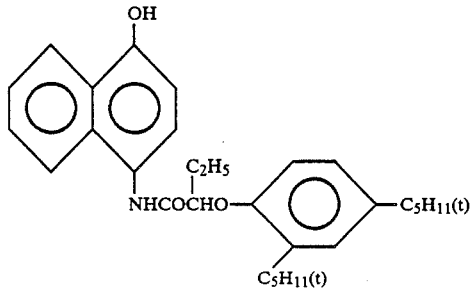

S-2

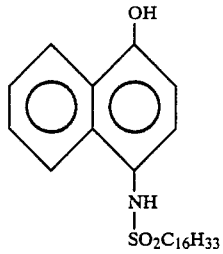

S-3

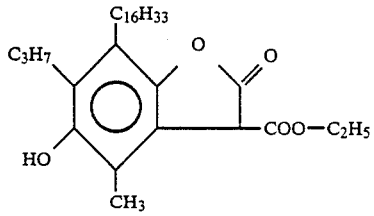

S-4

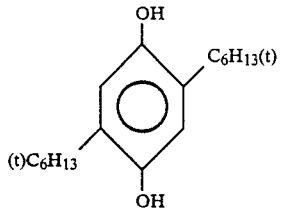

S-5

-continued
S-6
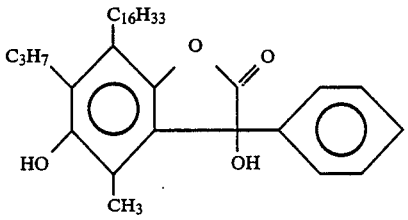
S-7
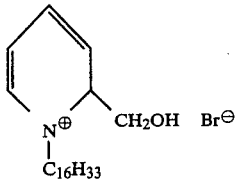
S-8
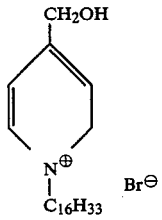
S-9
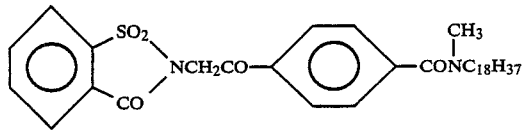
S-10
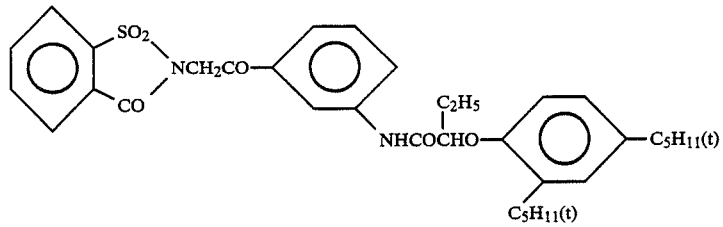
S-11
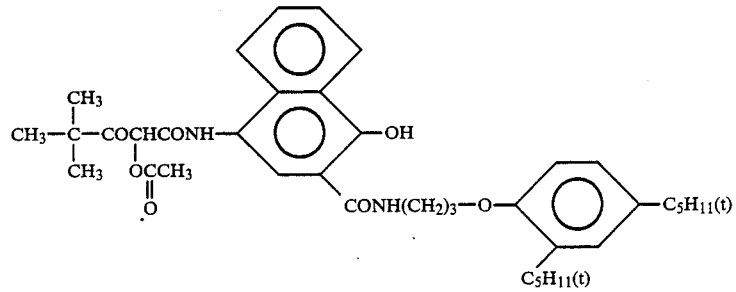
S-12
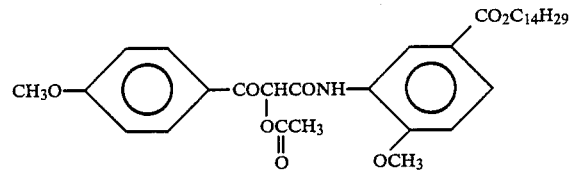

-continued
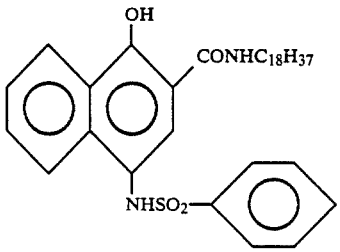
S-13
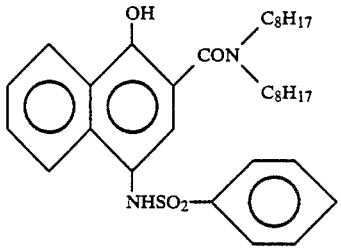
S-14
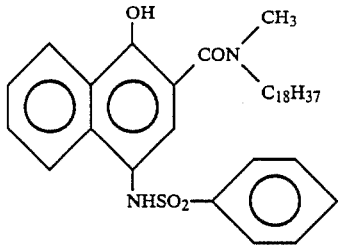
S-15
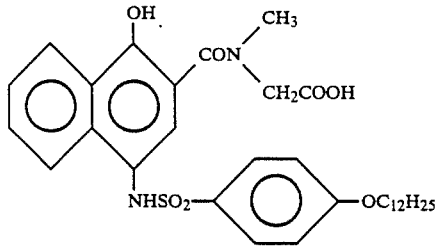
S-16
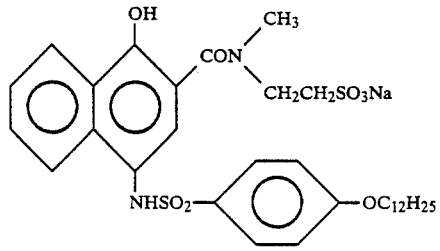
S-17
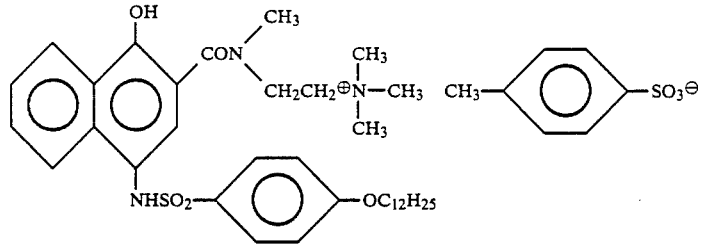
S-18

-continued
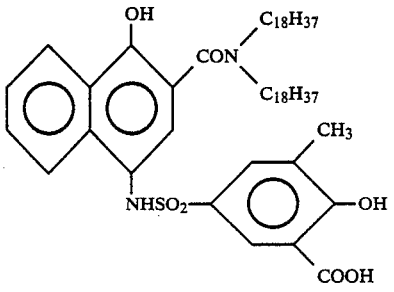
S-19
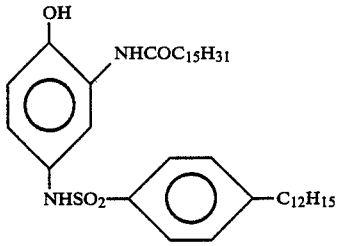
S-20
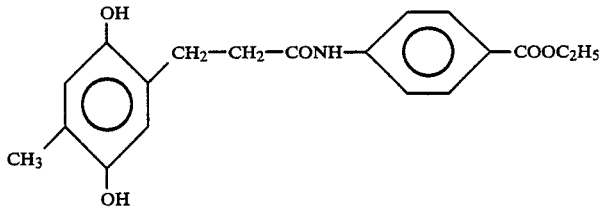
S-21
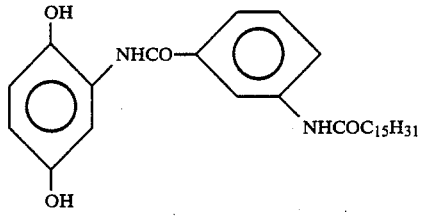
S-22
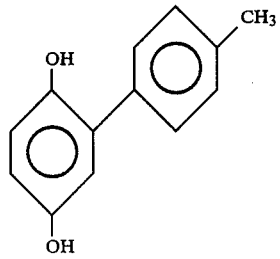
S-23
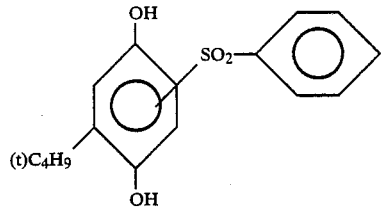
S-24

-continued
S-25
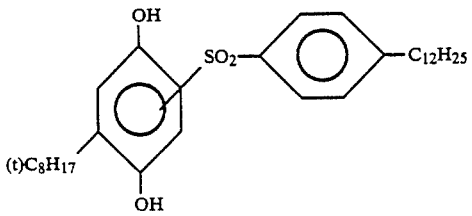
S-26
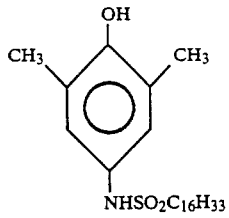
S-27
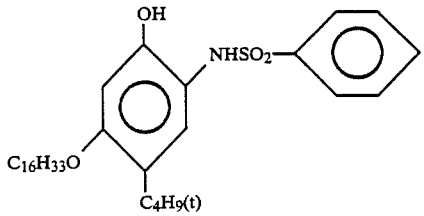
S-28
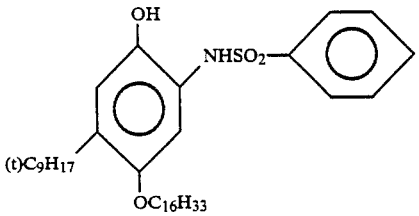
S-29
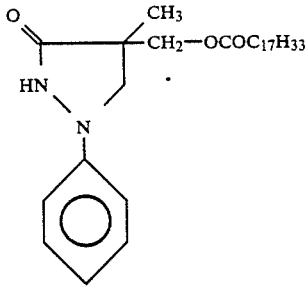
S-30
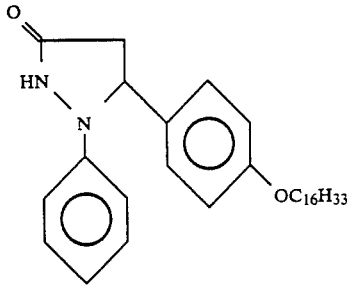
S-31
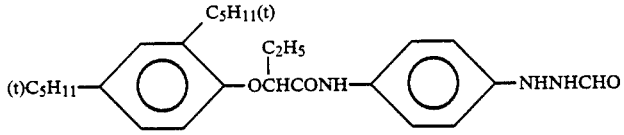

-continued
S-32
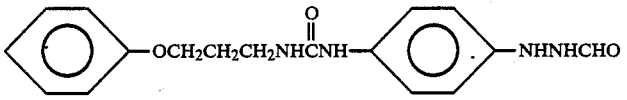
S-33
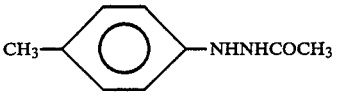
S-34
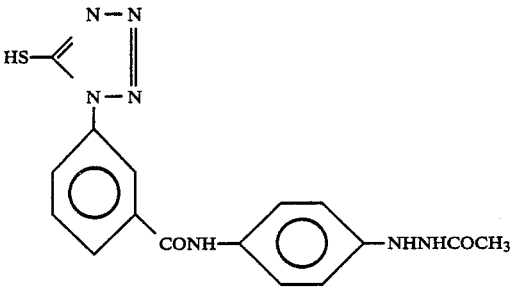
S-35
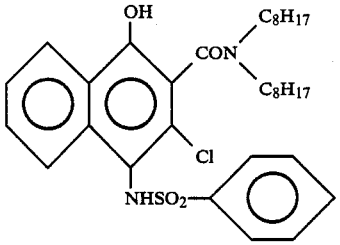
S-36
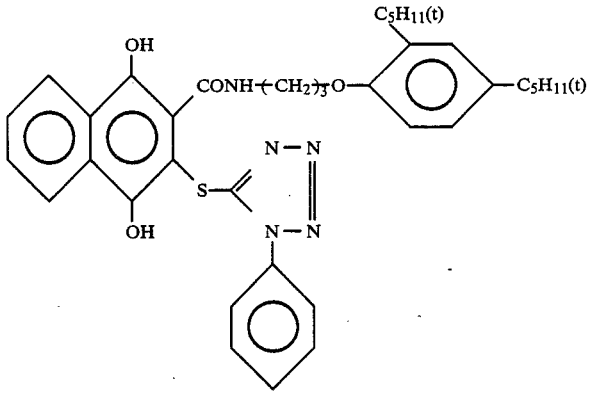
S-37
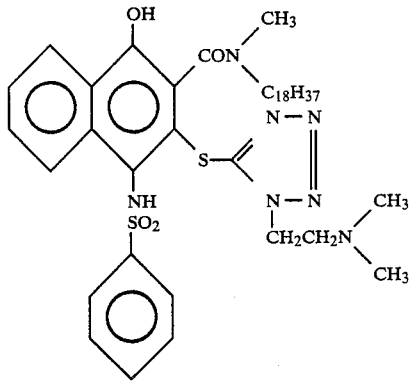

-continued
S-38
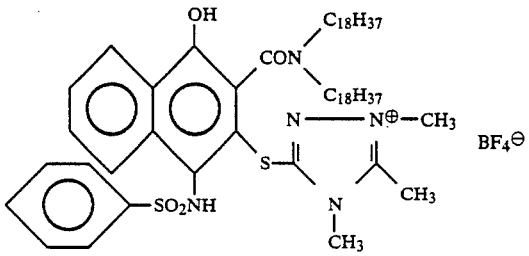
S-39
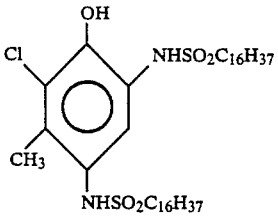
S-40
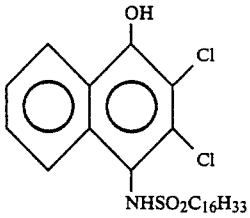
S-41
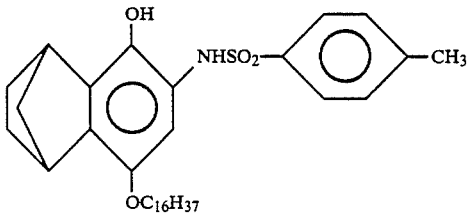
S-42
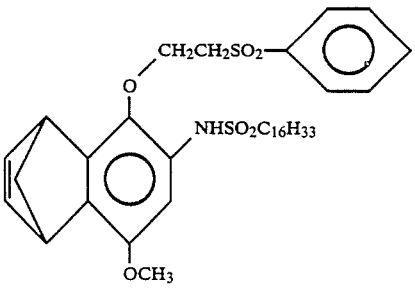
S-43
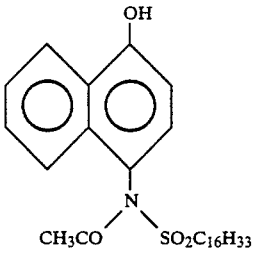

-continued
S-44
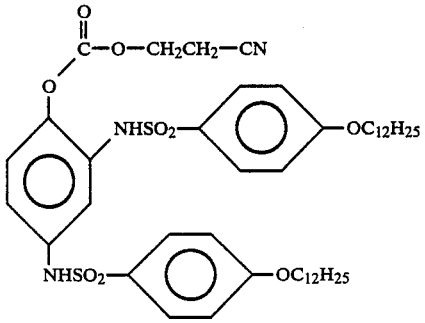
S-45
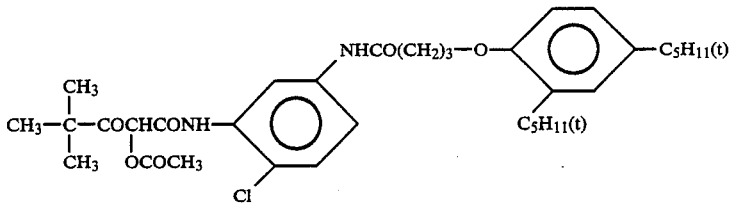
S-46
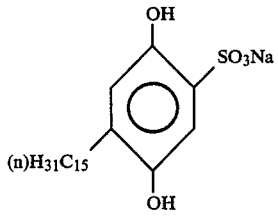
S-47
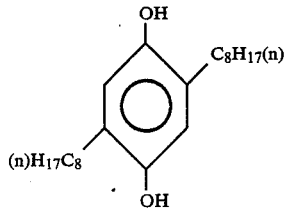
S-48
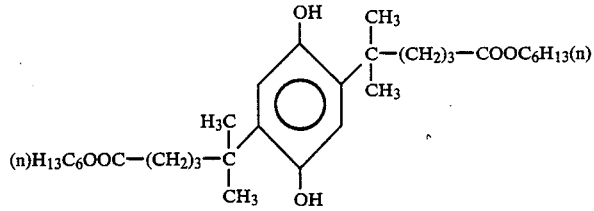
S-49
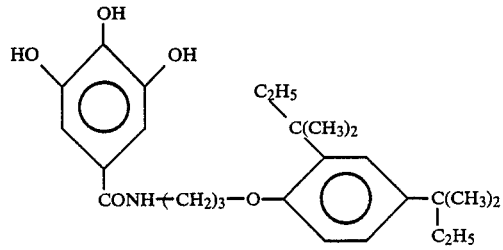
S-50
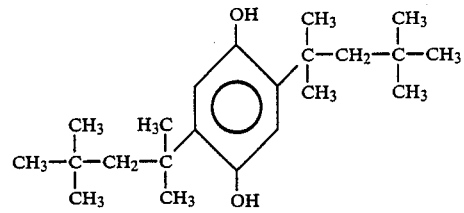

-continued

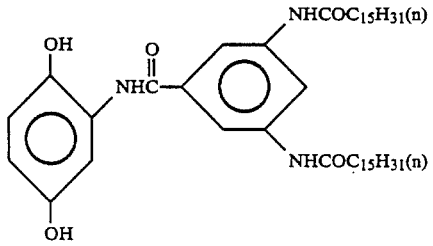

S-51

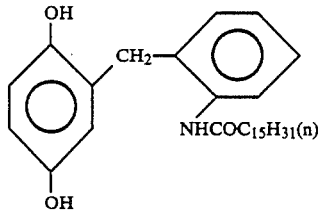

S-52

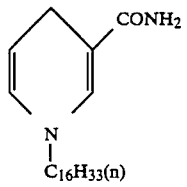

S-53

The present compound of the formula (I) can be used for silver halide color light-sensitive material such as color negative film, color paper, color reversal film, and color reversal paper.

The preparation of the silver halide emulsion to be used in the present invention can be normally accomplished by mixing a water-soluble silver salt (e.g. silver nitrate) solution and a water-soluble halide (e.g. potassium bromide) solution in the presence of a solution of a water-soluble high molecular compound such as gelatin. As such a silver halide there may be used mixed silver halide such as silver bromochloride, silver bromoiodide, and silver bromochloroiodide besides silver chloride, and silver bromide. The average particle size of such a silver halide (particle diameter for sphere or nearly sphere, mean length of side for cube determined in terms of the projected area) is preferably 2 μm or less, more preferably 0.4 μm or less. The distribution of particle size may be narrow or wide.

The above described particulate silver halide may have a cubic structure, octahedronic structure, composite thereof, or tabular structure as described in Japanese Patent Application (OPI) Nos. 127,921/83, and 113,926/83.

Alternatively, the preparation of the silver halide emulsion to be used in the present invention can be accomplished by mixing two or more silver halide photographic emulsions which have been separately prepared. The crystal structure of the particulate silver halide may be uniform, or stratum structure wherein the halide composition varies between the inner portion and the outer portion thereof, or of a so-called conversion type as described in British Patent No. 635,841, and U.S. Pat. No. 3,622,318. The above-described emulsion particles may be those of surface latent image type in which latent images are formed mainly in the surface portion thereof or those of internal latent image type in which latent images are formed mainly in the interior thereof. In the latter case, a nucleating agent or light fogging is used to provide a positive image.

In the process of formation or physical ripening of particulate silver halide, cadmium salt, zinc salt, lead salt, thallium salt, iridium salt, or a complex salt thereof, rhodium salt or a complex salt thereof, or iron salt or a complex salt thereof, may be present.

As the present silver halide emulsion there may be used a so-called unripened emulsion (primitive emulsion) which has not been subjected to chemical sensitization. However, the present silver halide emulsion is normally subjected to chemical sensitization. The chemical sensitization can be accomplished by (1) a sulfur sensitization process using active gelatin or a sulfur-containing compound capable of reaction with silver such as a thiosulfate, a thiourea, a mercapto compound, or a rhodanine, (2) a reduction sensitization process using a reducing substance such as a stannous salt, an amine, a hydrazine derivative, a formamidinesulfine, and a silane compound, or (3) a noble metal sensitization process using a noble metal compound such as gold compound, and complex salt of the group VIII metal such as platinum, iridium, and palladium, or combination thereof.

The photographic emulsion to be used in the present invention may be spectrally sensitized with a methine dye or the like. Examples of such a dye include cyanine dye, melocyanine dye, composite cyanine dye, composite melocyanine dye, holopolar cyanine dye, hemicyanine dye, styryl dye, and hemioxonol dye. Particularly useful dyes are cyanine dye, melocyanine dye, and composite melocyanine dye. As a basic heterocyclic nucleus for these dyes there may be used any nuclei commonly used for cyanine dyes. Examples of such nuclei include pyrroline nucleus, oxazoline nucleus, pyrrole nucleus, oxazole nucleus, thiazole nucleus, selenazole nucleus, imidazole nucleus, tetrazole nucleus, pyridine nucleus, nucleus comprising aliphatic hydrocarbon rings fused to these nuclei, and nuclei comprising aromatic hydrocarbon rings fused to these nuclei, such as indolenine nucleus, benzindolenine nucleus, indole nucleus, benzoxazole nucleus, naphthooxazole nucleus, benzothiazole nucleus, naphthothiazole nucleus, benzoselenazole nucleus, benzimidazole nucleus, and quinoline nucleus. These nuclei may substitute on a carbon atom.

Examples of nuclei containing a ketomethylene structure which can be applied to melocyanine dye or composite melocyanine dye include 5- or 6-membered heterocyclic nuclei such as pyrazoline-5-one nucleus, thiohydantoin nucleus, 2-thiooxazolidine-2,4-dione nucleus, thiazolidine-2,4-dione nucleus, rhodanine nucleus, and thiobarbituric acid nucleus. These sensitizing dyes can be used singly or in combination. Such a combination of sensitizing dyes is often used particularly for the purpose of supersensitization.

The present invention can be applied to a multilayer multicolor photographic light-sensitive material comprising at least two different spectral sensitivities on a support. A multilayer natural color photographic material normally comprises at least one red-sensitive emulsion layer, one green-sensitive emulsion layer, and one blue sensitive emulsion layer on a support. The order of arrangement of these emulsion layers can be optionally selected. Preferred arrangement orders are red-sensitive emulsion layer, green sensitive emulsion layer, and blue-sensitive emulsion layer; blue-sensitive emulsion layer, green-sensitive emulsion layer, and red-sensitive emulsion layer; and blue-sensitive emulsion layer, red-sensitive emulsion layer, and green-sensitive emulsion layer, as viewed from the support. Alternatively, in order to improve the desired sensitivity, two or more emulsion layers having different sensitivities may be used to form an emulsion layer having the same color-sensitivity. Three emulsion layers may be used to improve graininess. A light-insensitive layer may be provided interposed between two or more emulsion layers having the same color-sensitivity. An emulsion layer having a color-sensitivity may be provided interposed between emulsion layers having another color sensitivity. In order to improve sensitivity, a reflection layer such as finely divided silver halide may be provided beneath a high sensitivity layer, particularly a high sensitivity blue-sensitive layer.

In general, the red-sensitive emulsion layer comprises a cyan-forming coupler, the green-sensitive emulsion layer comprises a magenta-forming coupler, and the blue-sensitive emulsion layer comprises a yellow-forming coupler. Different combinations may be optionally used. For example, an infrared-sensitive layer may be used in combination with these layers to enable application for false color photography or semi-conductor laser exposure.

The photographic light-sensitive material of the present invention may comprise a dye forming coupler, i.e. a compound which can undergo oxidation-coupling with an aromatic primary amine developing agent such as a phenylenediamine derivative and an aminophenol derivative to form a color. Such a coupler is preferably a non-diffusive compound containing a hydrophobic group called a ballast group in its molecule or a polymerized compound. Such a coupler may be either two-equivalent or four-equivalent to silver ion. The present photographic light-sensitive material may contain a colored coupler having a color correction effect or coupler which releases a development inhibitor upon development (so called DIR coupler). Alternatively, the present photographic light-sensitive material may comprise a colorless DIR coupling compound which undergoes a coupling reaction to produce a colorless product and release a development inhibitor.

Examples of such a magenta coupler include 5-pyrazolone coupler, pyrazolobenzimidazole coupler, cyanoacetylcumarone coupler, open-chain acylacetonitrile coupler, and pyrazolotriazole coupler. Examples of a yellow coupler include acylacetamide coupler such as benzoylacetanilide, and pivaloylacetanilide. Examples of a cyan coupler include naphthol coupler and phenol coupler.

In order to satisfy the properties required for the light-sensitive material, two or more couplers may be used in combination in the same layer. Alternatively, one coupler may be incorporated in two or more layers.

The incorporation of such a coupler in the silver halide emulsion layer can be accomplished by any suitable method as described in U.S. Pat. No. 2,22,027. Particularly, such a coupler is first dissolved in a phthalic alkylester such as dibutyl phthalate, and dioctyl phthalate, a phosphoric ester such as diphenyl phosphate, triphenyl phosphate, tricresyl phosphate, and dioctylbutyl phosphate, a cirric ester such as tributyl acetyl citrate, a benzoic ester such as benzoic octyl, an alkylamide such as diethyllaurylamide, an aliphatic ester such as dibutoxyethyl succinate, and diethyl azelate, a trimesic ester such as tributyl trimesicate, or an organic solvent having a boiling point of about 30° to 150° C., such as a lower alkyl acetate (e.g. ethyl acetate, and butyl acetate), ethyl propionate, secondary butyl alcohol, methylisobutyl ketone, $\beta$-ethoxyethyl acetate, and methylcellosolve acetate. The solution is then dispersed in a hydrophilic colloid. The above described high boiling organic solvent; and low boiling organic solvent may be used in admixture.

Alternatively, a dispersion process using a polymer as described in Japanese Patent Publication Nos. 30,494/73, and 39,853/76, Japanese Patent Application (OPI) Nos. 102,334/75, 25,133/76, and 59,943/76, Japanese Patent Application Nos. 162,813/86 (WO 8800723), and 187,996/86, Japanese Patent Application (OPI) No. 44658/88 (European Patent 256531), West German Patent No. 2,830,917, and U.S. Pat. No. 3,619,195 may be used.

If the coupler contains an acid group such as carboxylic acid, and sulfonic acid, it is incorporated in the hydrophilic colloid in the form of an alkaline aqueous solution. This method is described in Japanese Patent Publication No. 7,561/68.

The present photographic light sensitive material may comprise a known discoloration inhibitor such as a hydroquinone derivative, a gallic acid derivative, a p-alkoxyphenol, a p-oxyphenol derivative, and a bisphenol.

The light-sensitive material of the present invention may comprise the above described additives. Besides these additives, various additives may be used depending on the purpose of application.

These additives are described in Research Disclosure Item/7,643 (December 1978) and Item/8,716 (November 1979). The places where such a description is found are summerized in the table shown below.

| Additives | RD 17643 | RD18716 |
|---|---|---|
| 1. Chemical sensitizer | Page 23 | Right column on page 648 |

-continued

| Additives | RD 17643 | RD18716 |
|---|---|---|
| 2. Sensitivity enhancing agent | | Right column on page 648 |
| 3. Spectral sensitizer, supersensitizer | pp. 23–24 | Right column on page 648 - right column on page 649 |
| 4. Brightening agent | Page 24 | |
| 5. Fog inhibitor, stabilizer | pp. 24–25 | Right column on page 649 |
| 6. Light absorber, filter dye, ultraviolet absorber | pp. 25–26 | Right column on page 649 - left column on page 650 |
| 7. Stain inhibitor | Right column on page 25 | Left column to right column on page 650 |
| 8. Dye image stabilizer | Page 25 | |
| 9. Hardening agent | Page 26 | Left column on page 651 |
| 10. Binder | Page 26 | Left column on page 651 |
| 11. Plasticizer, lubricant | Page 27 | Right column on page 650 |
| 12. Coating aid, surface active agent | pp. 26–27 | Right column on page 650 |
| 13. Antistatic agent | Page 27 | Right column on page 650 |

The photographic processing of the present light-sensitive material can be accomplished by any suitable known method with any suitable known processing solution. The processing temperature is normally selected from the range of 18° C. to 50° C. but may be lower than 18° C. or higher than 50° C. Depending on the purpose of application, a color photographic processing process consisting of development for formation of negative or autopositive images or development for formation of reversal images may be used. In general, the present compound can undergo a uniform cleavage in a processing solution having a pH of 9 to 13 (preferably 10 to 13) to release BA.

As a black-and-white developing solution for use in color reversal processing, there can be used a known developing agent such as a dihydroxybenzene (e.g. hydroquinone), a 3-pyrazolidone (e.g. 1-phenyl-3-pyrazolidone), and an aminophenol (e.g. N-methyl-p-aminophenol). These known developing agents can be used singly or in combination.

A color developing solution normally comprises an alkaline aqueous solution containing a color developing agent. As such a color developing agent there can be used a known primary aromatic amine developing agent such as a phenylenediamine (e.g. 4-amino-N,N-diethylaniline-3-methyl-4-amino-N,N-diethylaniline, 4-amino-N-ethyl-N-β-hydroxyethylaniline, 3-methyl-4-amino-N-ethyl-N-β-hydroxyethylaniline, 3-methyl-4-amino-N-ethyl-N-β-methanesulfoamidoethylaniline, and 4-amino-3-methyl-N-ethyl-N-β-methoxyethylaniline.

Besides the above described developing agents, those as described in L. F. A. Mason, "Photographic Processing Chemistry" (1966, Focal Press , pp. 226–229, U.S. Pat. Nos. 2,193,015, and 2,592,364, and Japanese Patent Application (OPI) No. 64,933/73 may be used.

The developing solution may further contain a pH buffering agent such as sulfite, carbonate, borate, and phosphate of alkaline metal, and development inhibitor or fog inhibitor such as bromide, iodide, and organic fog inhibitor. The developing solution may optionally comprise a water softner, preservative such as hydroxylamine, organic solvent such as benzyl alcohol, and diethylene glycol, development accelerator such as polyethylene glycol, quaternary ammonium salt, and amine salt, dye-forming coupler, competitive coupler, fogging agent such as sodium boron hydride, auxiliary developing agent such as 1-phenyl-3-pyrazolidone, viscosity increaser, polycarboxylic chelating agent as described in U.S. Pat. No. 4,083,723, and oxidation inhibitor as described in West Germany Patent Application (OLS) No. 2,622,950.

A photographic light-sensitive material which has been subjected to color photographic processing is normally bleached. The bleaching process may be effected simultaneously with or separately of the fixing process. As suitable bleaching agent there can be used compounds of polyvalent metals such as ferric iron (III), cobalt (III), chromium (VI), and copper (II), a peroxide, a quinone, a nitroso compound, or the like. Examples of such bleaching agents include a ferricyanide, a dichromate, an organic complex salt of ferric iron (III) or cobalt (III) with an aminopolycarboxylic acid such as ethylenediaminetetraacetic acid, nitrilotriacetic acid, and 1,3-diamino-2-propanoltetraacetic acid, or a complex salt of an organic acid such as citric acid, tartaric acid, and malic acid, a persulfate, a permanganate, and nitrosophenol. Particularly useful among these bleaching agents are potassium ferricycanide, $NH_4$[Fe(III)-(EDTA)] (EDTA; ethylenediamine tetraacetic acid), and Na[Fe(III)(EDTA)]. Ferric ethylenediaminetetraacetate complex salts can be advantageously used not only in a bleaching solution but also in a combined blix solution.

The bleaching solution or blix solution may contain various additives besides a bleach accelerator as described in U.S. Pat. Nos. 3,042,520, and 3,241,966, and Japanese Patent Publication Nos. 8,506/70, and 8,836/70, and a thiol compound as described in Japanese Patent Application (OPI) No. 65,732/78.

The washing process may be effected in a one-tank system. However, the washing process is normally effected in a multistage countercurrent system using two or more tanks. The amount of water to be used in the washing process can be optionally determined depending on the type of the color light-sensitive material, and the purpose of application. Particularly, a method as described in S. R. Goldwasser, "Water Flow Rates in Immersion-Washing of Motion Picture Film" *Journal of Motion Picture and Television Engineering*, Vol. 64, pp. 248–253 (May 1955) can be used to determine the amount of water to be used in the washing process.

If the amount of water is saved, a problem of propagation of bacteria or mold arises. In order to cope with such a problem, washing water containing low content of calcium and magnesium as described in Japanese Patent Application No. 131,632/86 can be used. Alternatively, a sterilizer or antifungal agent as described in Journal of Antibacterial and Antifungal Agents, Vol. 11, No. 5, pp. 207–223 (1983), and Hiroshi Horiguchi, "Antibacterial and Antifungal Chemistry" can be added to the washing water. As a water softner to be added to the washing water there can be used a chelating agent such as ethylenediaminetetraacetic acid, and diethylenetriaminepentaacetic acid.

If the amount of water is saved, it is normally in the range of 100 to 2,000 ml per 1 $m^2$ color light-sensitive material. Particularly, the range of 200 to 1,000 ml may be preferably used both for the effects of stabilizing color images and saving washing water.

The pH of the washing water normally ranges from 5 to 9.

The present invention will be further described in the following examples, but the present invention should not be construed as being limited thereto.

EXAMPLE 1

A multilayer color light sensitive material specimen 101 was prepared by coating various layers of the undermentioned compositions on an undercoated cellulose triacetate film support.

| | |
|---|---|
| 1st layer (antihalation layer) | |
| A gelatin layer (dried film thickness: 2 μm) containing: | |
| Black colloidal silver | 0.25 g/m$^2$ |
| Ultraviolet absorber U-1 | 0.04 g/m$^2$ |
| Ultraviolet absorber U-2 | 0.1 g/m$^2$ |
| Ultraviolet absorber U-3 | 0.1 g/m$^2$ |
| High boiling point organic solvent O-1 | 0.1 ml/m$^2$ |
| Compound A-1 | 1 g/m$^2$ |
| 2nd layer (intermediate layer) | |
| A gelatin layer (dried film thickness: 1 μm) containing: | |
| Compound H-1 | 0.05 g/m$^2$ |
| High boiling point organic solvent O-2 | 0.05 ml/m$^2$ |
| 3rd layer (1st red-sensitive emulsion layer) | |
| A gelatin layer (dried film thickness: 1 μm) containing: | |
| Monodisperse emulsion of silver bromoiodide spectrally sensitized with sensitizing dyes SD-1 and SD-2 (iodine content: 4 mol %; tetradecahedron particle; average particle size: 0.3 μm; $S/\bar{r}$ = 0.15, $\bar{r}$: mean grain diameter, S: standard deviation, $S/\bar{r}$: coefficient of variation) | 0.5 g/m$^2$ (in terms of silver amount) |
| Emulsion A | 0.1 g/m$^2$ (in terms of silver amount) |
| Coupler C-1 | 0.2 g/m$^2$ |
| Coupler C-2 | 0.05 g/m$^2$ |
| Compound A-1 | 1 mg/m$^2$ |
| High boiling point organic solvent O-2 | 0.12 ml/m$^2$ |
| 4th | |
| containing: | (2nd red-sensitive emulsion layer) |
| A gelatin layer (dried film thickness: 2.5 μm) containing: | |
| Silver bromoiodide emulsion spectrally sensitized with sensitizing dyes SD-1 and SD-2 (iodine content: 2.5 mol %; spherical particle; average particle size: 0.55 μm) | 0.8 g/m$^2$ (in terms of silver amount) |
| Coupler C-1 | 0.55 g/m$^2$ |
| Coupler C-2 | 0.14 g/m$^2$ |
| High boiling point organic solvent O-2 | 0.33 ml/m$^2$ |
| 5th layer (intermediate layer) | |
| A gelatin layer (dried film thickness: 1 μm) containing: | |
| Compound H-1 | 0.1 g/m$^2$ |
| High boiling organic solvent O-2 | 0.1 cc/m$^2$ |
| 6th layer (1st green-sensitive emulsion layer) | |
| A gelatin layer (dried film thickness: 1 μm) containing: | |
| Monodisperse emulsion of silver bromoiodide spectrally sensitized with sensitizing dyes SD-3 and SD-4 (SD-3/SD-4 molar ratio: 2/1)(iodine content: 3 mol %; tetradecahedron particle; average particle size: 0.3 μm; $S/\bar{r}$ = 0.15) | 0.7 g/m$^2$ (in terms of silver amount) |

-continued

| | |
|---|---|
| Emulsion A | 0.1 g/m$^2$ (in terms of silver amount) |
| Coupler C-4 | 0.35 g/m$^2$ |
| High boiling point organic solvent O-2 | 0.26 ml/m$^2$ |
| 7th layer (2nd green-sensitive emulsion layer) | |
| A gelatin layer (dried film thickness: 2.5 μm) containing: | |
| Silver bromoiodide emulsion spectrally sensitized with sensitizing dyes SD-3 and SD-4 (SD-3/SD-4 molar ratio: 2/1)(iodine content: 2.5 mol %; spherical particle; average particle size: 0.8 μm) | 0.7 g/m$^2$ (in terms of silver amount) |
| Coupler C-3 | 0.25 g/m$^2$ |
| High boiling point organic solvent O-2 | 0.05 ml/m$^2$ |
| 8th layer (intermediate layer) | |
| A gelatin layer (dried film thickness: 1 μm) containing: | |
| Compound H-1 | 0.05 g/m$^2$ |
| High boiling point organic solvent O-2 | 0.1 ml/m$^2$ |
| 9th layer (yellow filter layer) | |
| A gelatin layer (dried film thickness: 1 μm) containing: | |
| Yellow colloidal silver | 0.1 g/m$^2$ |
| Compound H-1 | 0.02 g/m$^2$ |
| Compound H-2 | 0.03 g/m$^2$ |
| High boiling point organic solvent O-2 | 0.04 ml/m$^2$ |
| 10th layer (1st blue-sensitive emulsion layer) | |
| A gelatin layer (dried film thickness: 1.5 μm) containing: | |
| Silver bromoiodide emulsion spectrally sensitized with sensitizing dyes SD-5 (iodine content: 2.5 mol %; spherical particle; average particle size: 0.7 μm) | 0.6 g/m$^2$ (in terms of silver amount) |
| Coupler C-5 | 0.5 g/m$^2$ |
| High boiling point organic solvent O-2 | 0.1 ml/m$^2$ |
| 11th layer (2nd blue-sensitive emulsion layer) | |
| A gelatin layer (dried film thickness: 3 μm) containing: | |
| Emulsion of tabular particulate silver bromoiodide spectrally sensitized with sensitizing dyes SD-5 (iodine content: 2.5 mol %; particles having a diameter/thickness ratio of 7 or more account for 50% of the total particles in projected area; average particle thickness: 0.13 μm) | 1.1 g/m$^2$ (in terms of silver amount) |
| Coupler C-5 | 1.2 g/m$^2$ |
| High boiling point organic solvent O-2 | 0.23 ml/m$^2$ |
| 12th layer (1st protective layer) | |
| A gelatin layer (dried film thickness: 2 μm) containing: | |
| Ultraviolet absorber U-1 | 0.02 g/m$^2$ |
| Ultraviolet absorber U-2 | 0.03 g/m$^2$ |
| Ultraviolet absorber U-3 | 0.03 g/m$^2$ |
| Ultraviolet absorber U-4 | 0.29 g/m$^2$ |
| High boiling point organic solvent O-2 | 0.28 ml/m$^2$ |
| 13th layer (2nd protective layer) | |
| A gelatin layer (dried film thickness: 0.8 μm) containing: | |
| Yellow colloidal silver | 0.5 mg/m$^2$ (in terms of silver amount) |
| Emulsion of surface-fogged finely divided silver bromoiodide (iodine content: 1 mol %; average particle size: 0.06 μm) | 0.1 g/m$^2$ (in terms of silver amount) |
| Particulate polymethylmethacrylate (average | |

-continued
| | |
|---|---|
| particle Size: 1.5 μm) | 0.15 g/m$^2$ |
Beside the above described compositions, a gelatin hardener H-3 and a surface active agent were added to each layer.
The compounds used will be shown below.
C-1
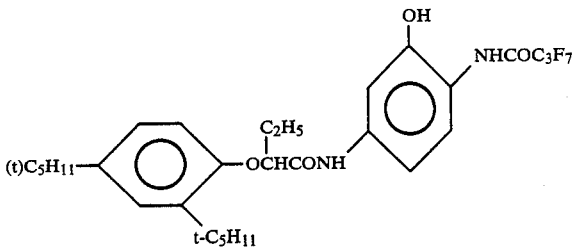
C-2
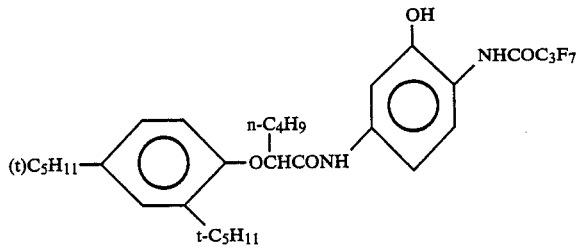
C-3
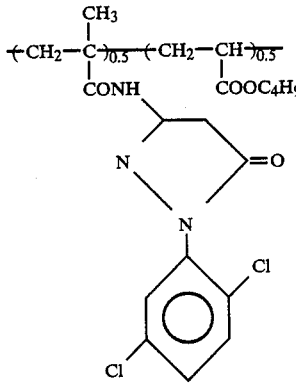
(monomer amounts are shown in molar ratio)
C-4
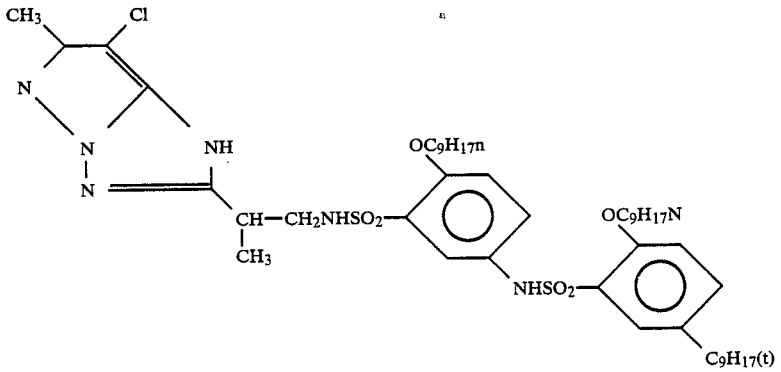

-continued
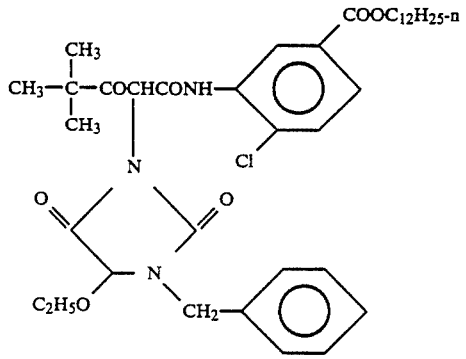
C-5
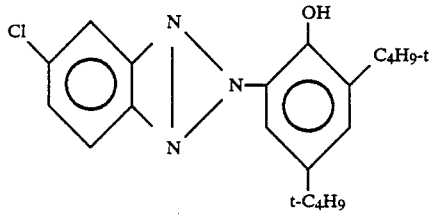
U-1
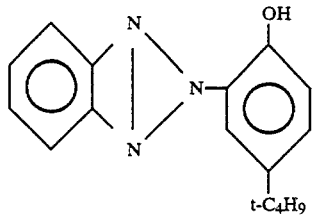
U-2
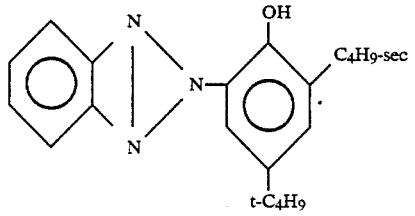
U-3
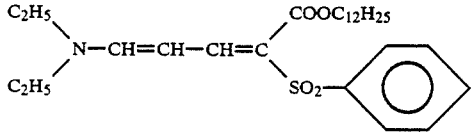
U-4
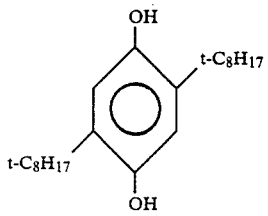
H-1
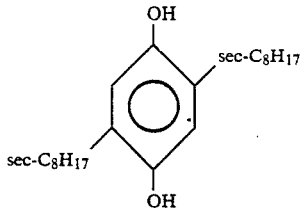
H-2

-continued
H-3
$CH_2{=}CHSO_2CH_2CONHCH_2$
$CH_2{=}CHSO_2CH_2CONHCH_2$
O-1
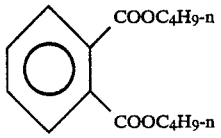
O-2
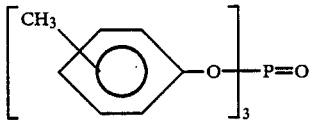
SD-3
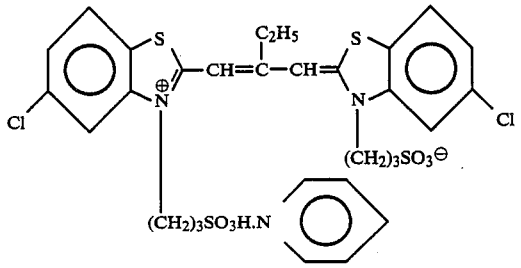
SD-2
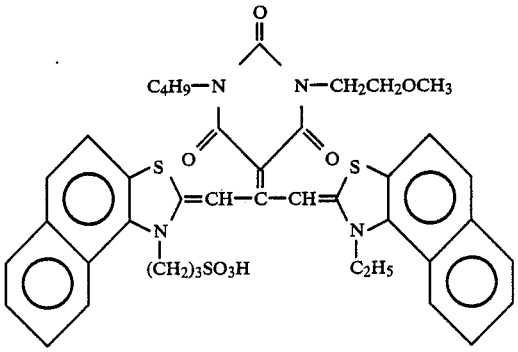
SD-3
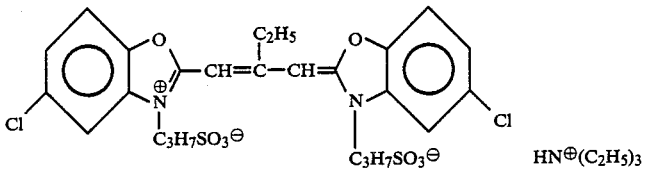
SD-4
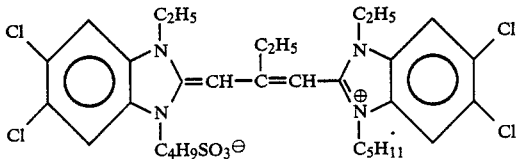
SD-5
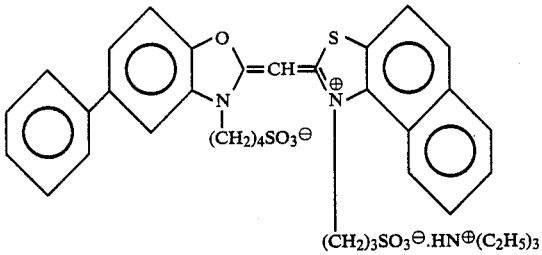

-continued

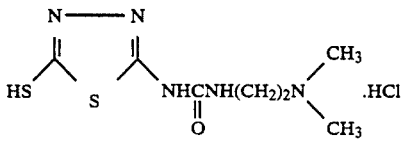

A-1

Emulsion A

An emulsion of cubic particulate silver bromide having an average particle size of 0.15 μm was prepared by a controlled double jet process. The emulsion was then fogged with hydrazine and a gold complex salt under a low pAg. Silver bromide was shelled over the surface of the emulsion thus prepared to a thickness of 250 Å to obtain Emulsion A.

Preparation of Specimens 102 to 110

Specimens 102 to 110 were prepared in the same manner as in Specimen 101 except in that the compounds shown in Table 1 were added to the 1st, 3rd, 5th, and 8th layers of Specimen 101, respectively, in coated amounts of $5\times10^{-6}$ mol/m$^2$. However, if a reducing agent was used, its molar amount was 1.2 times that of the present compound.

These specimens were exposed to light through a sensitometry wedge. These specimens were then measured for blix speed at development processes with different blix times. The blix speed is represented by the time required for the completion of the blix reaction.

Each one of these specimens was stored at a temperature of 20° C. and a relative humidity of 50% for 7 days. Another one of these specimens was stored at a temperature of 45° C. and a relative humidity of 70% for 7 days. After being thus aged, these specimens were subjected to the undermentioned development, and then measured for maximum density. The results are shown in Table 1.

| Processing step | Time | Temperature |
|---|---|---|
| 1st development | 6 min. | 38° C. |
| 1st washing | 45 sec. | 38° C. |
| Reversal | 45 sec. | 38° C. |
| Color development | 6 min. | 38° C. |
| Bleaching | 1 min. | 38° C. |
| Blix | 4 min. | 38° C. |
| 2nd washing (1) | 1 min. | 38° C. |
| 2nd washing (2) | 1 min. | 38° C. |
| Stabilization | 1 min. | 25° C. |

The composition of the processing solutions used were as follows:

| | |
|---|---|
| 1st developing solution | |
| Pentasodium nitrilo-N,N,N-trimethylenephosphonate | 2.0 g |
| Sodium silfite | 30.0 g |
| Potassium hydroquinone monosulfonate | 20.0 g |
| Potassium carbonate | 33.0 g |
| 1-Phenyl-4-methyl-4-hydroxymethyl-3-pyrazolidone | 2.0 g |
| Potassium bromide | 2.5 g |
| Potassium thiocyanate | 1.2 g |
| Potassium iodide | 2.0 mg |
| Water to make | 1,000 ml |
| pH adjusted with hydrochloric acid or sodium hydroxide to | 9.60 |
| 1st washing solution | |
| Ethylenediaminetetramethylenephosphonic acid | 2.0 g |

-continued

| | |
|---|---|
| Disodium phosphate | 5.0 g |
| Water to make | 1,000 ml |
| pH adjusted with hydrochloric acid or sodium hydroxide to | 7.00 |
| Reversing solution | |
| Pentasodium nitrilo-N,N,N-trimethylenephosphate | 3.0 g |
| Stannous chloride (dihydrate) | 1.0 g |
| p-Aminophenol | 0.1 g |
| Sodium hydroxide | 8.0 g |
| Glacial acetic acid | 15 ml |
| Water to make | 1,000 ml |
| pH adjusted with hydrochloric acid or aodium hydroxide to | 6.00 |
| Color developing solution | |
| Pentasodium nitrilo-N,N,N-trimethylenephosphate | 2.0 g |
| Sodium sulfite | 7.0 g |
| Trisodium phosphate (dodecahydrate) | 36.0 g |
| Potassium bromide | 1.0 g |
| Potassium iodide | 90.0 mg |
| Sodium hydroxide | 3.0 g |
| Citrazinic acid | 1.5 g |
| N-ethyl-N-(β-methanesulfonamidoethyl)-3-methyl-4-aminoaniline sulfate | 11.0 g |
| 3,6-Dithiaoctane-1,8-diol | 1.0 g |
| Water to make | 1,000 ml |
| pH adjusted with hydrochloric acid or potassium hydroxide to | 11.80 |
| Bleaching solution | |
| EDTA · 2Na (dihydrate) | 10.0 g |
| $NH_4$[Fe(III)(EDTA)] (dihydrate) | 120.0 g |
| Ammonium bromide | 100.0 g |
| Ammonium nitrate | 10.0 g |
| Bleach accelerator | 0.005 mol |

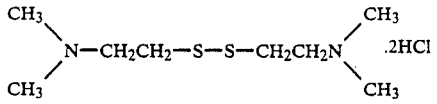

| | |
|---|---|
| Water to make | 1,000 ml |
| pH adjusted with hydrochloric acid or ammonia water to make | 6.30 |
| Blix solution | |
| $NH_4$[Fe(III)(EDTA)] (dihydrate) | 50.0 g |
| EDTA · 2Na (dihydrate) | 5.0 g |
| Ammonium thiosulfate | 80.0 g |
| Sodium sulfite | 12.0 g |
| Water to make | 1,000 ml |
| pH adjusted with hydrochloric acid or ammonia water to | 6.60 |

2nd washing solutions (1) and (2)

Tap water was passed through a mixed bed column filled with a strongly acidic H type cation exchange resin (Rohm & Haas Inc.'s Amberlite IR-120B) and an OH type anion exchange resin (Rohm & Haas Inc.'s Amberlite IR-400) so that the concentration of calcium and magnesium ion was reduced to 3 mg/l or less. 20 mg/l of sodium dichlorinated isocyanurate and 1.5 g/l of sodium sulfate were added to the water. The pH of the water ranged from 6.5 to 7.5.

| Stabilizing solution | |
|---|---|
| Formalin (37%) | 5.0 ml |

-continued

| Stabilizing solution | |
|---|---|
| Polyoxyethylene-p-monononylphenylether (average polymerization degree: 10) | 0.5 ml |
| Water to make | 1,000 ml |
| pH not adjusted | |

-continued

| | |
|---|---|
| | $10^{-4}$ of silver |
| Sensitizing dye SD-8 | 3.0 × $10^{-4}$ mol/1 mol of silver |
| Coupler C-14 | 0.093 g/m$^2$ |
| Coupler C-15 | 0.31 g/m$^2$ |
| Coupler C-16 | 0.01 g/m$^2$ |
| 4th layer (2nd red sensitive emulsion | |

TABLE 1

| Specimen No. | Additive for 1st, 3rd, 5th, 8th layers | Blix Speed | After stored at 20° C., 50% RH for 7 days: Max. cyan density | Max. magenta density | Max. yellow density | After stored at 45° C., 70% RH for 7 days: Max. cyan density | Max. magenta density | Max. yellow density |
|---|---|---|---|---|---|---|---|---|
| 101 (com parative) | — | 4 min. 10 sec. | 3.20 | 3.25 | 3.25 | 3.15 | 3.20 | 3.23 |
| 102 (comparative) | Compound A-8 | 3 min. 20 sec. | 3.10 | 3.15 | 3.10 | 2.80 | 3.01 | 2.85 |
| 103 (comparative) | Compound A-4 | 3 min. 10 sec. | 3.07 | 3.10 | 3.09 | 2.75 | 2.95 | 2.81 |
| 104 (present) | I-20 | 3 min. | 3.18 | 3.25 | 3.24 | 3.14 | 3.21 | 3.25 |
| 105 (present) | I-21 | 3 min. | 3.20 | 3.26 | 3.24 | 3.15 | 3.20 | 3.22 |
| 106 (present) | I-14 | 3 min. 10 sec. | 3.19 | 3.24 | 3.25 | 3.14 | 3.19 | 3.25 |
| 107 (present) | I-20, S-52 | 2 min. 50 sec. | 3.19 | 3.25 | 3.26 | 3.13 | 3.20 | 3.20 |
| 108 (present) | I-21, S-52 | 2 min. 50 sec. | 3.20 | 3.26 | 3:25 | 3.16 | 3.20 | 3.21 |
| 109 (present) | I-20, S-16 | 3 min. | 3.21 | 3.24 | 3.24 | 3.15 | 3.18 | 3.22 |
| 110 (present) | I-21, S-16 | 2 min. 50 sec. | 3.20 | 3.25 | 3.25 | 3.14 | 3.20 | 3.23 |

Compound A-8

Compound A-4

The present invention enables an improvement in blix speed without deteriorating the photographic properties upon storage under a high temperature and humidity condition. By using the compound of the present invention similar results as described above were obtained even when the bleaching accelerator was not used in the bleaching solution.

EXAMPLE 2

A multilayer color light-sensitive material specimen 201 was prepared by coating various layers of the undermentioned compositions on a triacetate film base.

| | |
|---|---|
| 1st layer (antihalation layer) | |
| A gelatin layer containing: | |
| Black colloidal silver | 0.18 g/m$^2$ |
| 2nd layer (intermediate layer) | |
| A gelatin layer containing: | |
| 2,5-Di-t-pentadecylhydroquinone | 0.18 g/m$^2$ |
| Coupler C-13 | 0.11 g/m$^2$ |
| 3rd layer (1st red-sensitive emulsion layer) | |
| A gelatin layer containing: | |
| Silver bromoiodide emulsion (silver iodide content: 10 mol %; average particle size: 0.5 μm; monodisperse tetradecahedron particle) | 0.72 g/m$^2$ (in term of silver amount) |
| Sensitizing dye SD-6 | 1.8 × $10^{-4}$ mol/1 mol of silver |
| Sensitizing dye SD-7 | 1.2 × mol/1 mol |

| | |
|---|---|
| layer) | |
| A gelatin layer containing: | |
| Silver bromoiodide emulsion (silver bromide content: 10 mol %; average particle size: 1.0 μm; monodisperse tetradecahedron particle) | 1.2 g/m$^2$ (in terms of silver amount) |
| Sensitizing dye SD-6 | 1.2 × $10^{-4}$ mol/1 mol of silver |
| Sensitizing dye SD-7 | 8.0 × $10^{-5}$ mol/1 mol of silver |
| Sensitizing dye SD-8 | 2.0 × $10^{-4}$ mol/1 mol of silver |
| Coupler C-14 | 0.1 g/m$^2$ |
| Coupler C-15 | 0.061 g/m$^2$ |
| Coupler C-17 | 0.046 g/m$^2$ |
| 5th layer (3rd red-sensitive emulsion layer) | |
| A gelatin layer containing: | |
| Silver bromoiodide emulsion (silver iodide content: 10 mol %; average particle size: 1.5 μm; monodisperse tetradecahedron particle) | 1.5 g/m$^2$ (in terms of silver amount) |
| Sensitizing dye SD-6 | 6.0 × $10^{-5}$ mol/1 mol of silver |
| Sensitizing dye SD-7 | 4.0 × $10^{-5}$ mol/1 mol of silver |
| Sensitizing dye SD-8 | 1.0 × $10^{-4}$ mol/1 mol of silver |
| Coupler C-17 | 0.32 g/m$^2$ |
| Coupler C-27 | 0.001 g/m$^2$ |
| 6th layer (intermediate layer) | |
| A gelatin layer | |
| 7th layer (1st green sensitive emulsion | |

-continued

| | | |
|---|---|---|
| layer) | | |
| A gelatin layer containing: | | |
| Silver bromoiodide emulsion (silver iodide content: 5 mol %; average particle size: 0.5 μm; monodisperse tetradecahedron particle) | 0.5 | $g/m^2$ (in terms of silver amount) |
| Sensitizing dye E | $3.8 \times 10^{-4}$ | mol/1 mol of silver |
| Sensitizing dye G | $1.5 \times 10^{-4}$ | mol/1 mol of silver |
| Coupler C-18 | 0.29 | $g/m^2$ |
| Coupler C-13 | 0.04 | $g/m^2$ |
| Coupler C-20 | 0.055 | $g/m^2$ |
| Coupler C-21 | 0.058 | $g/m^2$ |
| 8th layer (2nd green-sensitive emulsion layer) | | |
| A gelatin layer containing: | | |
| Silver bromoiodide emulsion (silver iodide content: 6 mol %; average particle size: 1.2 μm; spherical particle) | 0.9 | $g/m^2$ (in terms of silver amount) |
| Sensitizing dye E | $2.7 \times 10^{-4}$ | mol/1 mol of silver |
| Sensitizing dye G | $1.1 \times 10^{-4}$ | mol/1 mol of silver |
| Coupler C-18 | 0.25 | $g/m^2$ |
| Coupler C-13 | 0.013 | $g/m^2$ |
| Coupler C-20 | 0.009 | $g/m^2$ |
| Coupler C-21 | 0.011 | $g/m^2$ |
| 9th layer (3rd green-sensitive emulsion layer) | | |
| A gelatin layer containing: | | |
| Silver bromoiodide emulsion (silver iodide content: 8 mol %; average particle size 1.8 μm; spherical particle) | 1.8 | $g/m^2$ (in terms of silver amount) |
| Sensitizing dye E | $3.0 \times 10^{-4}$ | mol/1 mol of silver |
| Sensitizing dye G | $1.2 \times 10^{-4}$ | mol/1 mol of silver |
| Coupler C-13 | 0.008 | $g/m^2$ |
| Coupler C-22 | 0.05 | $g/m^2$ |
| Coupler C-28 | 0.001 | $g/m^2$ |
| 10th layer (yellow filter layer) | | |
| A gelatin layer containing: | | |
| Yellow colloidal silver | 0.04 | $g/m^2$ |
| 2,5-Di-t-pentadecylhydroquinone | 0.031 | $g/m^2$. |
| 11th layer (1st blue-sensitive emulsion layer) | | |
| A gelatin layer containing: | | |

-continued

| | | |
|---|---|---|
| Silver bromoiodide emulsion (silver iodide content: 5 mol %; average particle size: 0.4 μm; spherical particle) | 0.32 | $g/m^2$ |
| Sensitizing dye F | $2.5 \times 10^{-4}$ | mol/1 mol of silver |
| Coupler C-23 | 0.68 | $g/m^2$ |
| Coupler C-24 | 0.03 | $g/m^2$ |
| Coupler C-29 | 0.015 | $g/m^2$ |
| 12th layer (2nd blue-sensitive emulsion layer) | | |
| A gelatin layer containing: | | |
| Silver bromoiodide emulsion (silver iodide content: 10 mol %; particles having a diameter/thickness ratio of 7 or more account for 50% of the total particles in projected area; average particle thickness: 0.15 μm) | 0.29 | $g/m^2$ (in terms of silver amount) |
| Sensitizing dye F | $2.2 \times 10^{-4}$ | mol/1 mol of silver |
| Coupler C-23 | 0.22 | $g/m^2$ |
| 13th layer (3rd blue-sensitive emulsion layer) | | |
| A gelatin layer containing: | | |
| Silver bromoiodide emulsion (silver iodide content: 14 mol %; particles having a diameter/thickness ratic of 7 or more account for 50% of the total particles in projected area; average particle thickness: 0.20 μm) | 0.79 | $g/m^2$ (in terms of silver amount) |
| Sensitizing dye F | $2.3 \times 10^{-4}$ | mol/1 mol of silver |
| Coupler C-23 | 0.19 | $g/m^2$ |
| Coupler C-25 | 0.001 | $g/m^2$ |
| 14th layer (1st protective layer) | | |
| A gelatin layer containing: | | |
| Ultraviolet absorber C-11 | 0.14 | $g/m^2$ |
| Ultraviolet absorber C-12 | 0.22 | $g/m^2$ |
| 15th layer (2nd protective layer) | | |
| A gelatin layer | | |
| 16th layer (3rd protective layer) | | |
| A gelatin layer containing: | | |
| Particulate polymethylmethacrylate (diameter: 1.5 μm) | 0.05 | $g/m^2$ |

Besides the above described compositions, a gelatin hardener C-26 and a surface active agent were added to each layer. Thus, Specimen 201 was prepared.

The compounds used will be shown below.

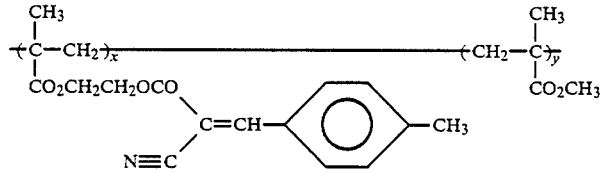

C-11 x:y = 7:3 (molar ratio)

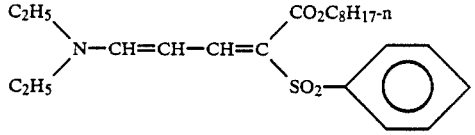

C-12

-continued
C-13
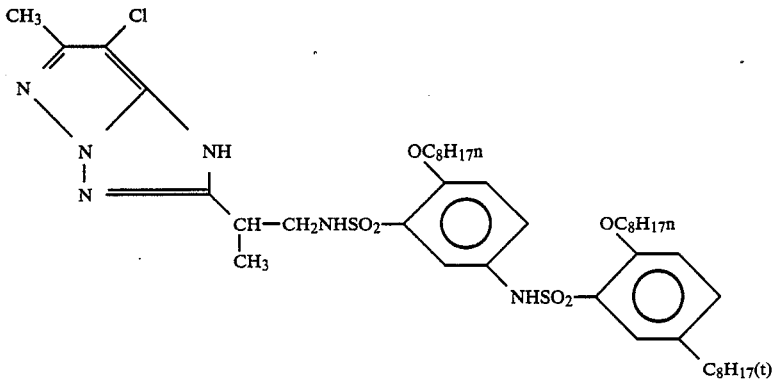
C-14
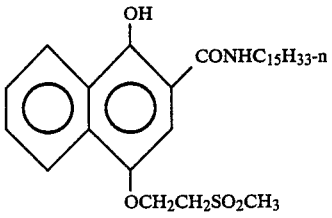
C-15
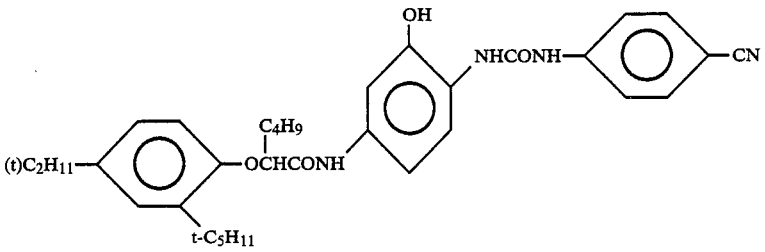
C-16
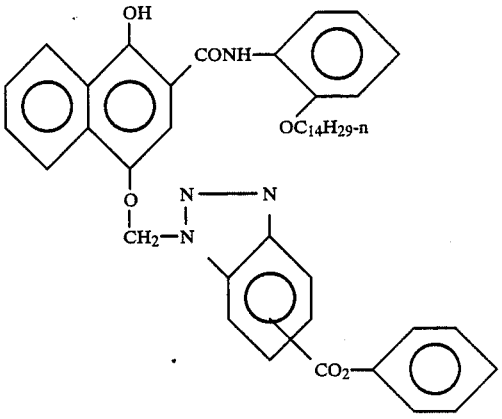
C-17
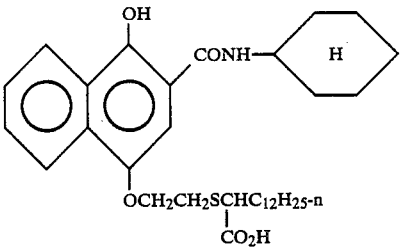

-continued
C-18
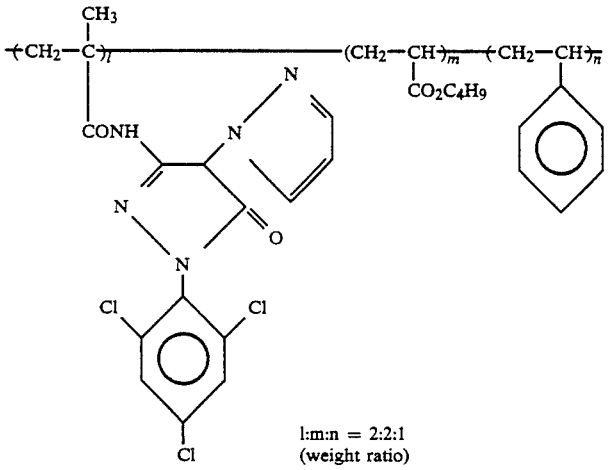
l:m:n = 2:2:1
(weight ratio)
C-20
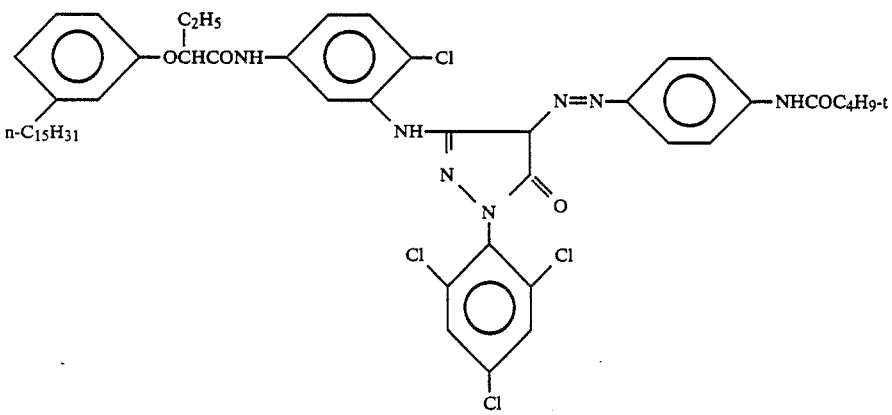
C-21
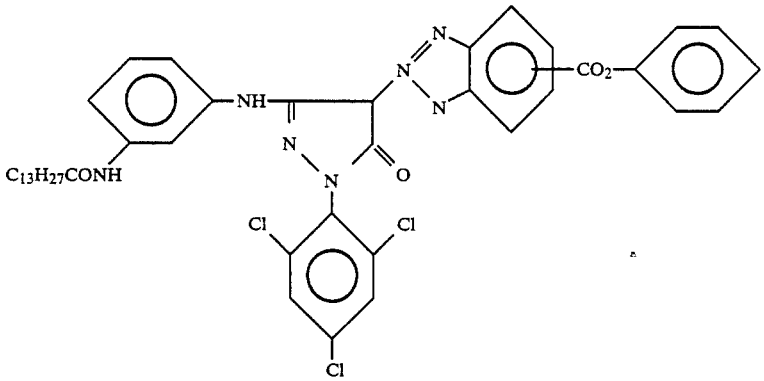
C-22
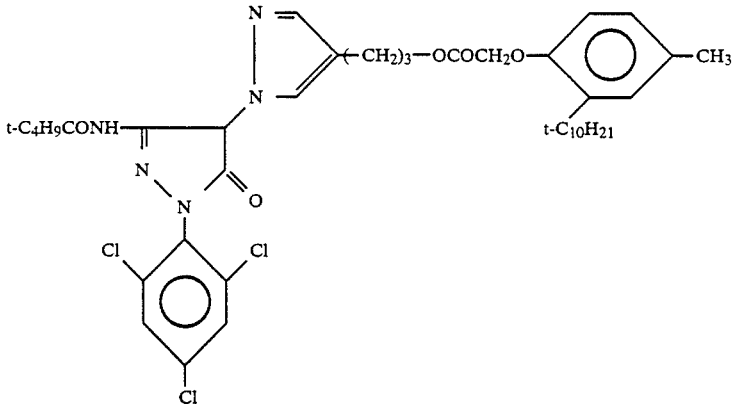

-continued
C-23
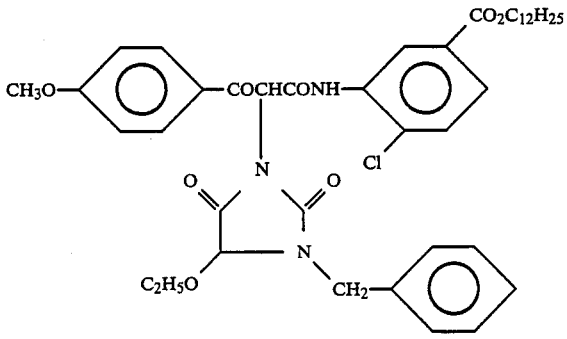
C-24
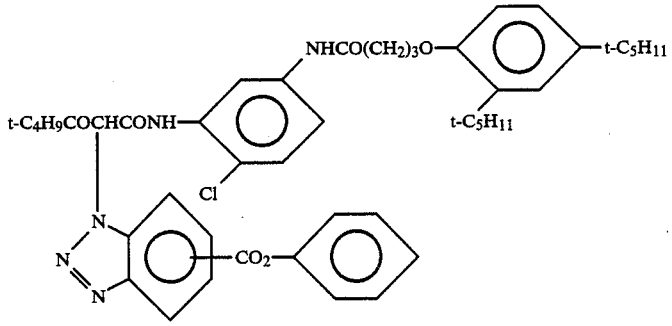
C-25
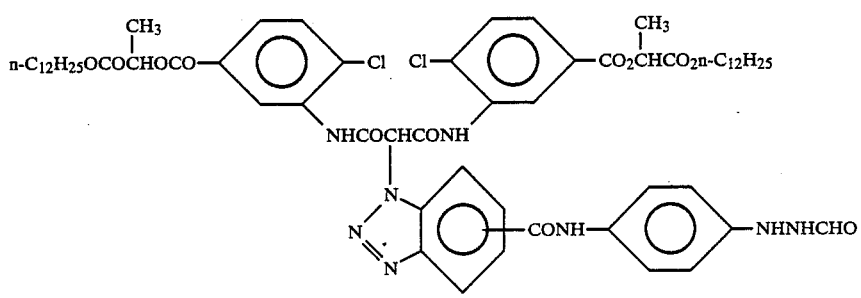
C-26
$(CH_2{=}CHSO_2CH_2CONHCH_2)_2$
C-27
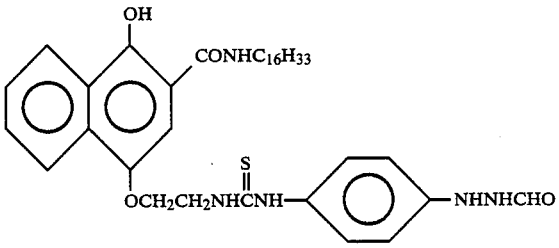
C-28
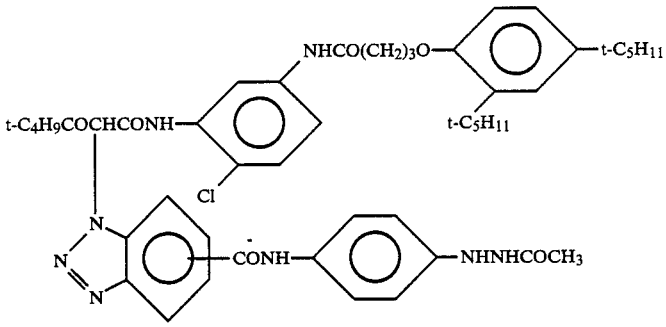

-continued
C-29
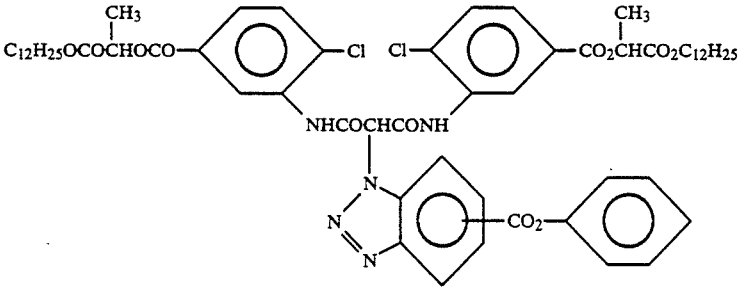
SD-6
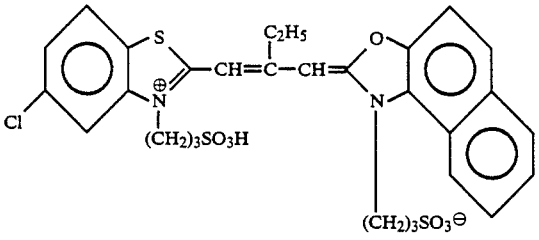
SD-7
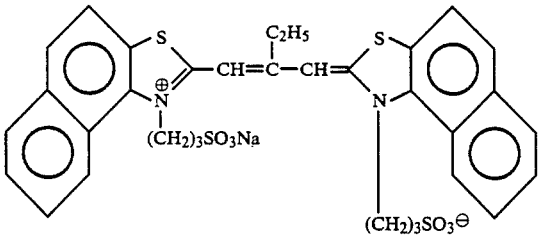
SD-8
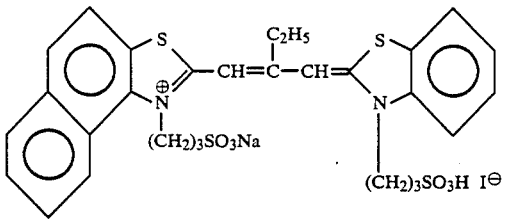
Sensitizing dye E
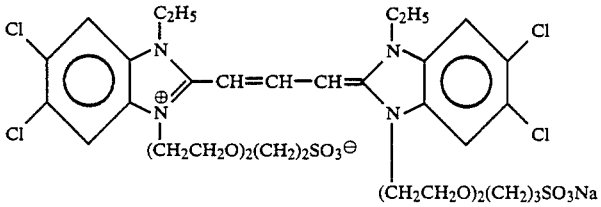
Sensitizing dye F
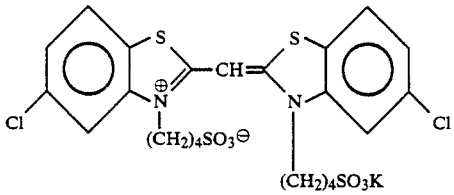
Sensitizing dye G -continued

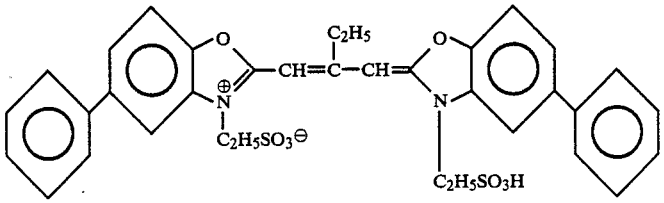

Preparation of Specimens 202 to 210

Specimens 202 to 210 were prepared in the same manner as in Specimen 201 except in that the compounds shown in Table 2 were incorporated in the 1st, 5th, 9th, and 10th layers of Specimen 201, respectively, in amounts of $5\times10^{-5}$ mol/m$^2$. However, if a reducing agent is used, its molar amount was 1.2 times that of the compound of the present invention.

These specimens were exposed to light through a sensitometry wedge. These specimens were measured for blix speed with different blix times.

Each one of these specimens was stored at a temperature of 20° C. and a relative humidity of 50% for 7 days. Another one of these specimens was stored at a temperature of 45° C. and a relative humidity of 70% for 7 days. These specimens were then subjected to the undermentioned development, and measured for minimum magenta and cyan densities. The result are shown in Table 2.

| Step | Processing time | Processing temperature | Supply amount | Tank volume |
|---|---|---|---|---|
| Color development | 3 min. 15 sec. | 38° C. | 45 ml | 10 l |
| Bleach | 30 sec. | 38 ° C. | 20 ml | 4 l |
| Blix | 3 min. 15 sec. | 38 ° C. | 30 ml | 8 l |
| Washing (1) | 40 sec. | 35 ° C. | Counter-current from tank (2) to tank (1) | 4 l |
| Washing (2) | 1 min. 00 sec. | 35 ° C. | 30 ml | 4 l |
| Stabilization | 40 sec. | 38 ° C. | 20 ml | 4 l |
| Drying | 1 min. 15 sec. | 55 ° C. | | |

The supply amount is represented in terms of the amount supplied per 1 m length of 35-mm wide specimen.

The composition of the processing solutions used were as follows:

| Color developing solution | Mother liquor(g) | Supply liquid(g) |
|---|---|---|
| Diethylenetriamine-pentaacetic acid | 1.0 | 1.1 |
| 1-hydroxyethylidene-1,1-diphosphonic acid | 3.0 | 3.2 |
| Sodium sulfite | 4.0 | 4.4 |
| Potassium carbonate | 30.0 | 37.0 |
| Potassium bromide | 1.4 | 0.7 |
| Potassium iodide | 1.5 mg | — |
| Hydroxylamine sulfate | 2.4 | 2.8 |
| 4-[N-ethyl-N-(β-hydroxyethyl)amino]-2-methyl-anilinesulfate | 4.5 | 5.5 |
| Water to make | 1.0 l | 1.0 l |
| pH | 10.05 | 10.10 |

-continued

| Bleaching solution (Mother liquor was used also as supply liquid) (g) | |
|---|---|
| $NH_4[Fe(III)(EDTA)]$ (dihydrate) | 120.0 |
| EDTA · 2Na | 10.0 |
| Ammonum bromide | 100.0 |
| Ammonium nitrate | 10.0 |
| Bleach accelerator | 0.005 mol |

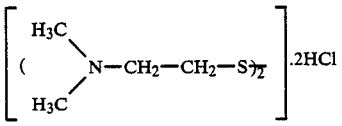

| | |
|---|---|
| Ammonia water (27%) | 15.0 ml |
| Water to make | 1.0 l |
| pH | 6.3 |
| **Blix solution (Mother liquor was used also as supply liquid( (g)** | |
| $NH_4[Fe(III)(EDTA)]$ (dihydrate) | 50.0 |
| EDTA · 2Na | 5.0 |
| Sodium silfite | 12.0 |
| Aqueous solution of ammonium thiosulfate (70%) | 240.0 ml |
| Ammonia water (27%) | 6.0 ml |
| Water to make | 1.0 l |
| pH | 7.2 |

Washing solution (mother liquor was used also as supply liquid)

Tap water was passed through a mixed bed column filled with a strongly acidic H type cation exchange resin (Rohm & Haas Inc.'s Amberlite IR-120B) and an OH type anion exchange resin (Amberlite IR-400) so that the concentration of calcium and magnesium ions were reduced to 3 mg/l or less. 30 mg/l of sodium dichlorinated isocyanauraqte and 1.5 g/l of sodium sulfate were added to the water.

The washing solution thus prepared has a pH ranging from 6.5 to 7.5

| Stabilizing solution (Mother liquor was used also as supply liquid) (g) | |
|---|---|
| Formalin (37%) | 2.0 ml |
| Polyoxyethylene-p-monononyl-phenylether (average polymerization degree: 10) | 0.3 |
| EDTA.2Na | 0.05 |
| Water to make | 1.0 l |
| pH | 5.0 to 8.0 |

TABLE 2

| Specimen No. | Additive for 1st, 5th, 9th, and 10th layers | Blix Speed | After stored at 20° C., 50% RH for 7 days | | After stored at 45° C., 70% RH for 7 days | |
|---|---|---|---|---|---|---|
| | | | Min. cyan density | Min. magenta density | Min. cyan density | Min. magenta density |
| 201 (comparative) | — | 3 min. 30 sec. | 0.25 | 0.55 | 0.27 | 0.58 |
| 202 (comparative) | Compound A-4 | 2 min. 15 sec. | 0.28 | 0.60 | 0.41 | 0.78 |
| 203 (comparative) | Compound A-5 | 2 min. 30 sec. | 0.30 | 0.62 | 0.45 | 0.80 |
| 204 (present) | I-21 | 2 min. | 0.25 | 0.54 | 0.27 | 0.57 |
| 205 (present) | I-4 | 2 min. 15 sec. | 0.24 | 0.55 | 0.27 | 0.58 |
| 206 (present) | I-2 | 2 min. 15 sec. | 0.25 | 0.55 | 0.28 | 0.58 |
| 207 (present) | I-21, S-1 | 1 min. 45 sec. | 0.25 | 0.56 | 0.27 | 0.58 |
| 208 (present) | I-4, S-1 | 2 min. | 0.26 | 0.55 | 0.27 | 0.59 |
| 209 (present) | I-21, S-49 | 1 min. 30 sec. | 0.25 | 0.54 | 0.28 | 0.58 |
| 210 (present) | I-4, S-49 | 1 min. 45 sec. | 0.25 | 0.55 | 0.28 | 0.58 |

Compound A-4

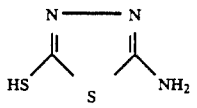

Compound A-5

$HSCH_2CH_2SO_3Na$

The present invention enables an improvement in blix speed without increasing the minimum density upon storage at a high temperature and humidity condition, making it possible to provide a high quality color image in a short processing time.

EXAMPLE 3

A multilayer color photographic paper specimen 301 was prepared by coating the layers shown in Table 3 on a paper support comprising polyethylene laminated on both sides thereof. The coating solutions used had been prepared as follows:

Preparation of coating solution for 1st layer 19.1 g of a yellow coupler (a) and 4.4 g of a dye image stabilizer (b) were dissolved in 27.2 ml of ethyl acetate and 7.7 ml of a solvent (c). The solution thus prepared was emulsion-dispersed in 185 ml of a 10% aqueous solution of gelatin containing 8 ml of 10% sodium dodecylbenzenesulfonate. On the other hand, a blue-sensitive sensitizing dye shown below was added to a silver bromochloride emulsion (silver bromide content: 90.0 mol %; Ag content: 70 g/kg) in an amount of $5.0\times10^{-4}$ mol per 1 mol of silver. The emulsion-dispersion and the emulsion thus prepared were mixed in such a proportion that the composition shown in Table 3 was obtained. Thus, the coating solution for the 1st layer was prepared. The coating solutions for the 2nd layer to the 7th layer were prepared in the same manner as for the 1st layer. As gelatin hardener for each layer, there was used sodium 1-oxy-3,5-dichloro-S-triazine.

As spectral sensitizing dyes for the various layers there were used the following compounds:

Blue-sensitive emulsion layer

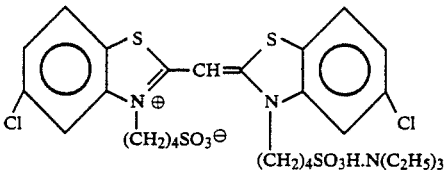

-continued ($5.0\times10^{-4}$ mol per 1 mol of silver halide)

Green-sensitive emulsion layer

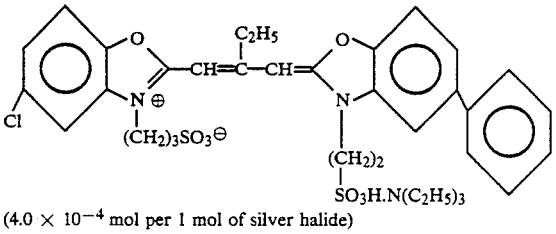

($4.0\times10^{-4}$ mol per 1 mol of silver halide)

and

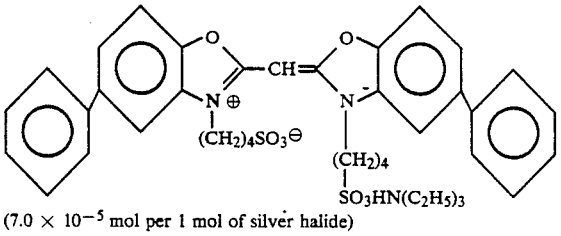

($7.0\times10^{-5}$ mol per 1 mol of silver halide)

Red-sensitive emulsion layer

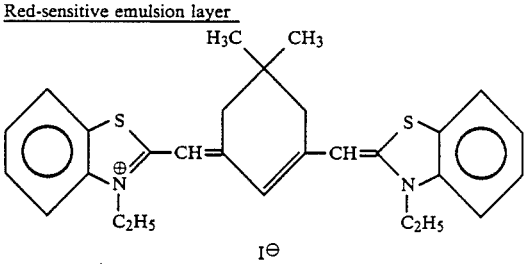

($0.9\times10^{-4}$ mol per 1 mol of silver halide)

The undermentioned compound was incorporated in the red-sensitive emulsion layer in an amount of $2.6\times10^{-3}$ mol per 1 mol of silver halide.

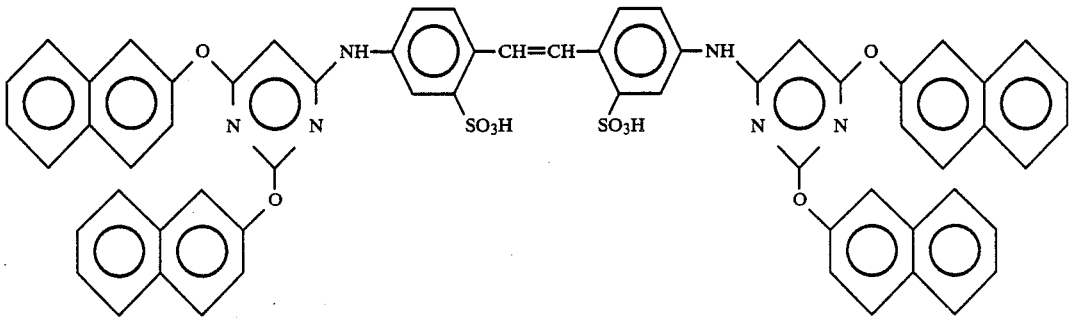

1 (5-Methylureidephenyl) 5-mercaptotetrazole was incorporated in the blue-sensitive emulsion layer, the green-sensitive emulsion layer, and the red-sensitive emulsion layer in amount of $8.5\times10^{-5}$ mol, $7.7\times10^{-4}$ mol, $2.5\times10^{-4}$ mol per 1 mol of silver halide, respectively.

Furthermore, 4-hydroxy-6-methyl-1,3,3a,7-tetrazaindene was incorporated in the blue-sensitive emulsion layer and the green-sensitive emulsion layer in amounts of $1.2\times10^{-2}$ mol and $1.1\times10^{-2}$ mol per 1 mol of silver halide, respectively.

In order to inhibit irradiation, the undermentioned dyes were incorporated in the emulsion layers.

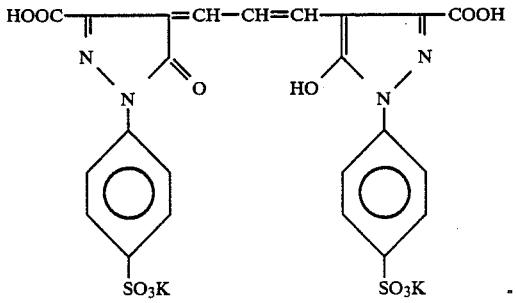

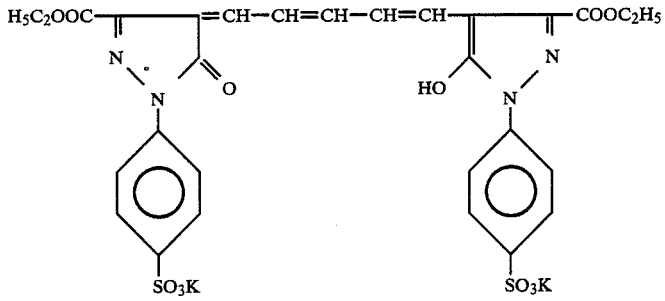

TABLE 3

| Layer | Main component | Used amount |
|---|---|---|
| 7th layer (protective layer) | Gelatin | 1.33 g/m$^2$ |
| | Acryl-modified copolymer of polyvinyl alcohol (modification degree: 17%) | 0.17 g/m$^2$ |
| | Liquid paraffin | 0.03 g/m$^2$ |
| 6th layer (ultraviolet absorbing layer) | Gelatin | 0.53 g/m$^2$ |
| | Ultraviolet absorbing agent (i) | 0.21 g/m$^2$ |
| | Solvent (k) | 0.08 g/m$^2$ |
| 5th layer (red-sensitive layer | Silver halide emulsion | 0.23 g/m$^2$ (in terms of silver amount) |
| | Gelatin | 1.79 g/m$^2$ |
| | Magenta coupler (e) | 0.32 g/m$^2$ |
| | Dye image stabilizer (f) | 0.20 g/m$^2$ |
| | Dye image stabilizer (g) | 0.01 g/m$^2$ |
| | Solvent (h) | 0.65 g/m$^2$ |
| 2nd layer (color stain inhibiting layer) | Gelatin | 0.99 g/m$^2$ |
| | Color stain inhibitor (d) | 0.08 g/m$^2$ |
| 1st layer (blue-sensitive layer) | Silver halide emulsion | 0.26 g/m$^2$ (in terms of silver amount) |
| | Gelatin | 1.83 g/m$^2$ |
| | Yellow coupler (a) | 0.83 g/m$^2$ |
| | Dye image stabilizer (b) | 0.19 g/m$^2$ |
| | Solvent (c) | 0.35 g/m$^2$ |

TABLE 3-continued

| Layer | Main component | Used amount |
|---|---|---|
| | Gelatin | 1.34 g/m$^2$ |
| | Cyan coupler (l) | 0.34 g/m$^2$ |
| | Dye stabilizer (m) | 0.17 g/m$^2$ |
| | Polymer (n) | 0.40 g/m$^2$ |
| | Solvent (o) | 0.23 g/m$^2$ |
| 4th layer (ultraviolet absorbing layer) | Gelatin | 1.58 g/m$^2$ |
| | Ultraviolet absorber (i) | 0.62 g/m$^2$ |
| | Color stain inhibitor (j) | 0.05 g/m$^2$ |
| | Solvent (k) | 0.24 g/m$^2$ |
| 3rd layer (green-sensitive layer) | Silver halide emulsion | 0.16 g/m$^2$ (in terms of silver amount) |

TABLE 3-continued
| Layer | Main component | Used amount |
|---|---|---|
| Support | Polyethylene-laminated paper (containing a white pigment ($TiO_2$) and a blue dye (ultra-marine) in polyethylene on the 1st layer side) | |
(a) Yellow coupler
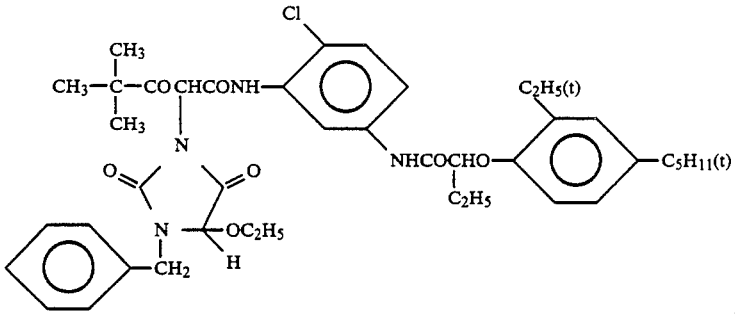
(b) Dye image stabilizer
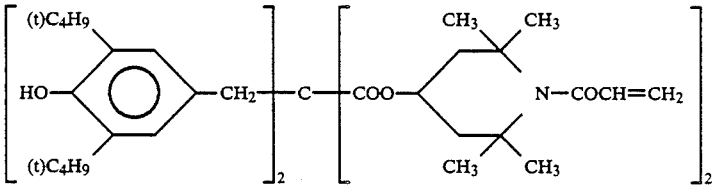
(c) Solvent
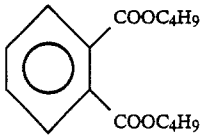
(d) Color stain inhibitor
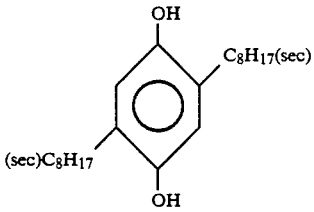
(e) Magenta coupler
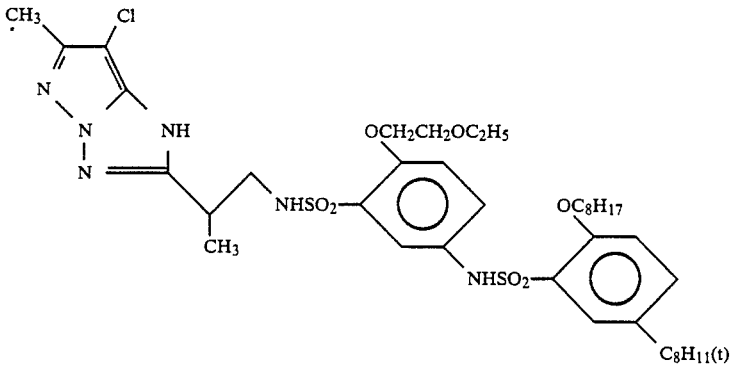
(f) Dye image stabilizer -continued
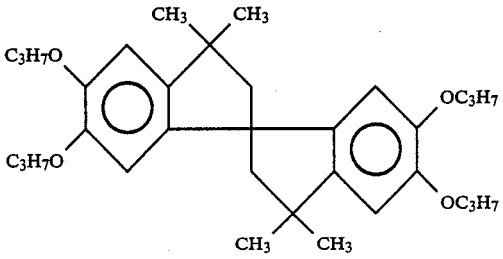
(g) Dye image stabilizer
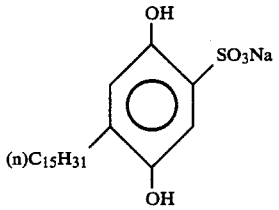
(h) Solvent
A 2:1 (by volume) mixture of
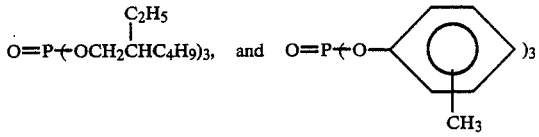
(i) Ultraviolet absorber
A 2:9:8 (by weight) mixture of
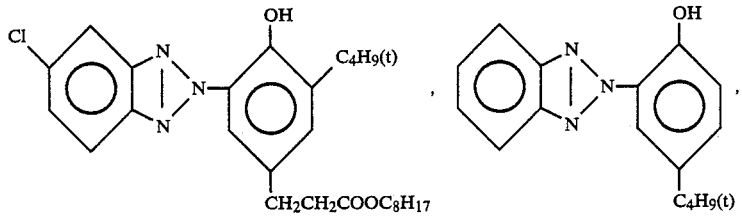
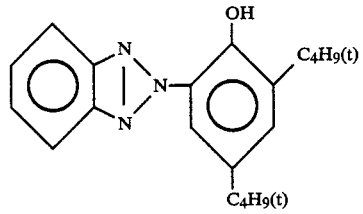
(j) Color stain inhibitor
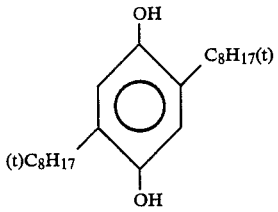
(k) Solvent
$O{=}P{\leftarrow}O{-}C_9H_{19}(iso))_3$
(l) Cyan coupler -continued

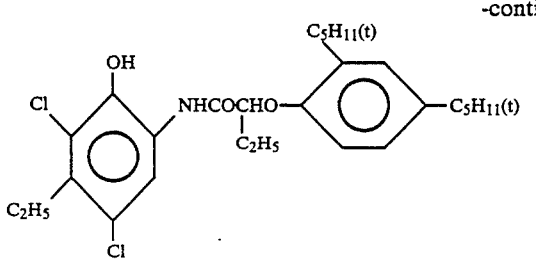

(m) Dye image stabilizer

A 5:8:9 (by weight) mixture of

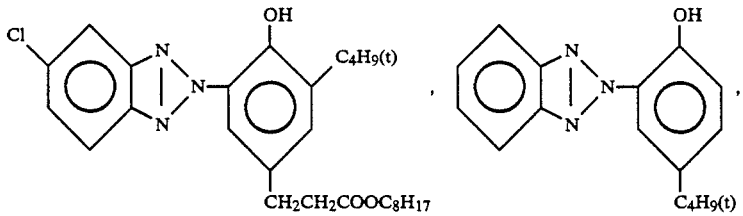

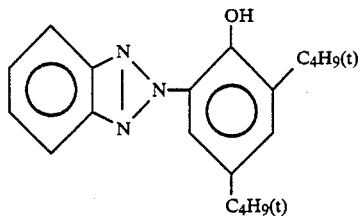

(n) Polymer

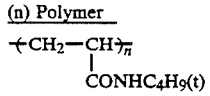

Average molecular weight: 35,000

(o) Solvent

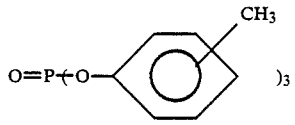

Preparation of Specimens 302 to 310

Specimens 302 to 310 were prepared in the same manner as in Specimen 301 except in that the compounds shown in Table 4 were incorporated in the 1st,. 3rd, and 5th layers of Specimen 301 in coated amounts of $1\times10^{31\ 5}$ mol/m$^2$, respectively. However, if a reducing agent was used, its molar amount was 1.2 times that of the compound of the present invention.

These specimens were exposed to light through a sensitometry wedge. These specimens were then measured for blix speed with different blix times upon the undermentioned development.

Furthermore, each one of these specimens was stored at a temperature of 20° C. and a relatively humidity of 50% for 7 days. Another one of these specimens was stored at a temperature of 45°a C. and a relatively humidity of 70% of 7 days. After being thus aged, these specimens were subjected to the undermentioned development, and then measured for minimum cyan, magenta, and yellow densitites. The results are shown in Table 4.

| Processing step | Temperature | Time |
|---|---|---|
| Color development | 38° C. | 1 min. 40 sec. |
| Blix | 30–34° C. | 1 min. 00 sec. |
| Rinse 1 | 30–34° C. | 20 sec. |
| Rinse 2 | 30–34° C. | 20 sec. |
| Rinse 3 | 30–34° C. | 20 sec. |
| Drying | 70–80° C. | 50 sec. |

(Three-tank countercurrent system in which water flows from the rine tank 3 to the rinse tank 1 was used.)

The composition of the processing solutions used were as follows:

| Color developing solution | |
|---|---|
| Water | 800 ml |
| Diethylenetriaminepentaacetic acid | 1.0 g |
| 1-Hydroxyethylidene-1,1-diphosphonic acid (60%) | 2.0 g |
| Nitrilotriacetic acid | 2.0 g |
| Triethylenediamine[1,4-diazabicyclo(2,2,2) octane] | 5.0 g |
| Potassium bromide | 0.5 g |
| Potassium carbonate | 30.0 g |
| N-ethyl-N-(β-methanesulfonamidoethyl)-3-methyl-4- | 5.5 g |

-continued

| Color developing solution | |
|---|---|
| aminoaniline sulfate | |
| Diethylhydroxylamine | 4.0 g |
| Fluorescent brightening agent (UVITEX-CK; manufactued by Ciba-Geigy) | 1.5 g |
| Water to make | 1,000 ml |
| pH (25° C.) | 10.25 |
| Blix solution | |
| Water | 400 ml |
| Ammonium thiosulfate (70%) | 200 ml |
| Sodium sulfite | 20.0 g |
| NH4[Fe(III)(EDTA)] | 60.0 g |
| EDTA.2Na | 10.0 g |
| Water to make | 1,000 ml |
| pH (25° C.) | 7.00 |
| Rinse solution | |
| Ion exchanged water (calcium and magnesium ion concentrations each was 3 ppm or less) | |

-continued

| Step | Time | Temperature | Tank Volume | Supply amount |
|---|---|---|---|---|
| Reversal | 45 sec. | " | 2 l | 1,100 ml/m$^2$ |
| Color development | 6 min. | " | 12 l | 2,200 ml/m$^2$ |
| Bleach | 2 min. | " | 4 l | 860 ml/m$^2$ |
| Blix | 4 min. | " | 8 l | 1,100 ml/m$^2$ |
| 2nd rinse (1) | 1 min. | " | 2 l | — |
| 2nd rinse (2) | 1 min. | " | 2 l | 1,100 ml/m$^2$ |
| Stabilization | 1 min. | 25° C. | 2 l | 1,100 ml/m$^2$ |
| Drying | 1 min. | 65° C. | | |

The supply to the 2nd rinse tank was effected by a so-called countercurrent process. That is, the supply liquid was first introduced into the 2nd rinse tank (2), and the overflow from the 2nd rinse tank (2) was then introduced into the 2nd rinse tank (1).

TABLE 4

| Specimen No. | Additive for 1st, 3rd, 5th, layers | Blix Speed | After stored at 20° C., 50% RH for 7 days | | | After stored at 45° C., 70% RH for 7 days | | |
|---|---|---|---|---|---|---|---|---|
| | | | Min. cyan density | Min. magenta density | Min. yellow density | Min. cyan density | Min magenta density | Min. yellow density |
| 301 (comparative) | — | 1 min. 30 sec. | 0.16 | 0.16 | 0.16 | 0.17 | 0.17 | 0.17 |
| 302 (comparative) | Compound A-6 | 1 min. | 0.17 | 0.18 | 0.17 | 0.32 | 0.35 | 0.33 |
| 303 (comparative) | Compound A-7 | 1 min. | 0.17 | 0.17 | 0.17 | 0.31 | 0.34 | 0.31 |
| 304 (present) | I-14 | 50 sec. | 0.16 | 0.16 | 0.16 | 0.17 | 0.17 | 0.17 |
| 305 (present) | I-27 | 50 sec. | 0.16 | 0.16 | 0.16 | 0.17 | 0.16 | 0.17 |
| 306 (present) | I-20 | 50 sec. | 0.16 | 0.16 | 0.16 | 0.16 | 0.17 | 0.17 |
| 307 (present) | I-14, S-46 | 40 sec. | 0.16 | 0.16 | 0.16 | 0.17 | 0.17 | 0.17 |
| 308 (present) | I-27, S-46 | 40 sec. | 0.16 | 0.16 | 0.16 | 0.17 | 0.17 | 0.17 |
| 309 (present) | I-14, S-16 | 40 sec. | 0.16 | 0.16 | 0.16 | 0.16 | 0.16 | 0.17 |
| 310 (present) | I-27, S-16 | 40 sec. | 0.16 | 0.16 | 0.16 | 0.17 | 0.17 | 0.17 |

Compound A-6

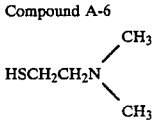

Compound A-7

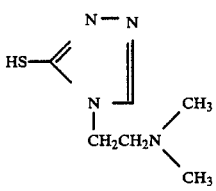

As shown in Table 4, the present invention enables an improvement in blix speed without increasing minimum density upon storage at a high temperature and humidity condition.

EXAMPLE 4

The silver halide color photographic material specimens 101, 102, 105, and 108 prepared in Example 1 were each exposed to light, and then processed by means of an automatic developing machine in the undermentioned manner until the accumulated supply amount of the color developing solution reached three times the volume of the color developing tank.

| Step | Time | Temperature | Tank Volume | Supply amount |
|---|---|---|---|---|
| 1st development | 6 min. | 38° C. | 12 l | 2,200 ml/m$^2$ |
| 1st rinse | 45 sec. | " | 2 l | 2,200 ml/m$^2$ |

The composition of the processing solutions used were as follows:

| | Mother Liquor | Supply Liquid |
|---|---|---|
| 1st Developing Solution | | |
| Pentasodium nitrilo-N,N,N-trimethylenephqsphate | 2.0 g | 2.0 g |
| Sodium sulfite | 30.0 g | 30.0 g |
| Potassium hydroquinone monosulfonate | 20.0 g | 20.0 g |
| Potassium carbonate | 33.0 g | 33.0 g |
| 1-Phenyl-4-methyl-4-hydroxylmethyl-3-pyrazolidone | 2.0 g | 2.0 g |
| Potassium bromide | 2.5 g | 1.4 g |
| Potassium thiocyanate | 1.2 g | 1.2 g |
| Potassium iodide | 2.0 mg | |
| Water to make | 1,000 ml | 1,000 ml |
| pH adjusted with hydrochloric acid or potassium hydroxide to | 9.60 | 9.60 |
| Ethylenediaminetetramethylene phosphonic acid | 2.0 g | (Mother liquor was used also as supply liquid) |

-continued

| | Mother Liquor | Supply Liquid |
|---|---|---|
| Disodium phosphate | 5.0 g | |
| Water to make | 1,000 ml | |
| pH adjusted with hydrochloric acid or sodium hydroxide to | 7.00 | |
| Reversing Solution | | |
| Pentasodium nitrilo-N,N,N-trimethylenephosphate | 3.0 g | (Mother liquor was used also as supply liquid) |
| Stannous chloride (dihydrate) | 1.0 g | |
| p-Aminophenol | 0.1 g | |
| Sodium hydroxide | 8.0 g | |
| Glacial acetic acid | 15 ml | |
| Water to make | 1,000 ml | |
| pH adjusted with hydrochloric acid or sodium hydroxide to | 6.00 | |
| Color Developing Solution | | |
| Pentasodium nitrilo-N,N,N-trimethylenephosphate | 2.0 g | 2.0 g |
| Sodium sulfite | 7.0 g | 7.0 g |
| Trisodium phosphate (dodecahydrate) | 36.0 g | 36.0 g |
| Potassium bromide | 1.0 g | — — |
| Potassium iodide | 90.0 mg | — |
| Sodium hydroxide | 3.0 g | 3.0 g |
| Citrazinic acid | 1.5 g | 1.5 g |
| N-ethyl-N-(β-methanesulfonamidoethyl)-3-methyl-4-aminoanilline sulfate | 11.0 g | 11.0 g |
| 3,6-Dithiaoctane-1,8-diol | 1.0 g | 1.0 g |
| Water to make | 1,000 ml | 1,000 ml |
| pH adjusted with hydrochloric acid or potassium hydroxide to | 11.80 | 12.00 |
| Bleaching Solution | | |
| EDTA.2Na (ditydrate) | 10.0 g | (Mother liquor was used also as supply liquid) |
| $NH_4$ [Fe(III)(EDTA)] (dithdrate) | 120.0 g | |
| Ammonium bromide | 100.0 g | |
| Ammonium nitrate | 10.0 g | |
| Bleach accelerator | 0.005 mol | |

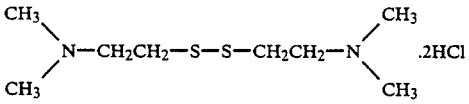

| | | |
|---|---|---|
| Water to make | 1,000 ml | |
| pH adjusted with hydrochloric acid or ammonia water to | 6.30 | |
| Blix Solution | | |
| $NH_4$ [Fe(III)(EDTA)] (dithdrate) | 50.0 g | (Mother liquor was used also as supply liquid) |
| EDTA.2Na (dihydrate) | 5.0 g | |
| Ammonium thiosulfate | 80.0 g | |
| Sodium sulfite | 12.0 g | |
| Water to make | 1,000 ml | |
| pH adjusted with hydrochloric acid or ammonia water to | 6.60 | |

2nd Rinse Solution (Mother liquor was used also as supply liquid)

Tap water was passed through a mixed bed column filled with a strongly acidic H type cation exchange resin (Rohm & Haas Inc.'s Amberlite IR-120B) and an OH type anion exchange resin (Rohm & Haase Inc's Amberlite IR-400) so that the concentration of calcium and magnesium ions were reduced to 3 mg/l or less. Sodium dichlorinated isocyanurate and sodium sulfate were then added to the water in amounts of 20 mg/l and 1.5 g/l, respectively. The rinse solution thus prepared had a pH value ranging from 6.5 to 7.5.

| Stabilizing Solution | Mother Liquor | Supply Liquid |
|---|---|---|
| Formalin (37%) | 5.0 ml | (Mother liquor was used also as supply liquid) |
| Polyoxyethylene-p-monononyl phenylether (average polymerization degree: 10) | 0.5 ml | |
| Water to make | 1,000 ml | |
| pH not adjusted | | |

After being subjected to the continuous processing, these specimens were measured for blix speed in the same manner as in Example 1. Furthermore, these specimens were stored at a temperature of 20° C. and a relative humidity of 50% for 7 days and at a temperature of 45° C. and a relative humidity of 70% for 7 days. These specimens thus aged were measured for maximum density. Similar to the results of Example 1, the present specimens show an improvement in blix speed without deteriorating the photographic properties upon storage under a high temperature and humidity condition.

While the invention has been described in detail and with reference to specific embodiments thereof, it will be apparent to one skilled in the art that various changes and modifications can be made therein without departing from the spirit and scope thereof.

What is claimed is:

1. A silver halide color photographic material comprising at least one light-sensitive silver halide emulsion layer on a support, wherein at least one of said emulsion layer and a non-light sensitive hydrophilic layer(s) contains at least one compound represented by the formula (I)

$$PWR\text{-}(Time)_t BA \quad (I)$$

wherein PWR represents a group which undergoes reduction to release $(Time)_t BA$; BA represents a group which becomes a desilvering accelerator after being released; Time represents a group which releases BA through a reaction after being released from PWR as $(Time)_t BA$; and t represents an integer of 0 or 1.

2. A silver halide color photographic material as claimed in claim 1, wherein the compound represented by the formula (I) is a compound represented by the formula (II):

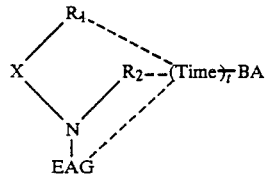

(II)

wherein EAG represents an electron-accepting group; N represents a nitrogen atom; X represents an oxygen atom (—O—), sulfur atom (—S—), or atomic group containing a nitrogen atom (—N($R_3$)—); $R_1$, $R_2$ and $R_3$ each represents a chemical bond or a group other than hydrogen atom; BA represents a group which becomes a desilvering accelerator after being released; Time represents a group which releases BA through a reaction triggered by N—X bond cleavage; t represents an integer of 0 or 1; the solid line indicates a chemical bond; and the dotted lines indicate that at least one thereof is bonded; with the proviso that $R_1$, $R_2$, $R_3$, and EAG may be connected to each other to form a ring, and that when t is 0, Time represents a chemical bond.

3. A silver halide color photographic material as claimed in claim 2, wherein $R_1$, $R_2$ and $R_3$ each represents a substituted or unsubstituted alkyl group, a substituted or unsubstituted aralkyl group, a substituted or unsubstituted cycloalkyl group, a substituted or unsubstituted cycloalkenyl group, a substituted or unsubstituted alkynyl group, a substituted or unsubstituted aryl group, a substituted or unsubstituted heterocyclic group, a substituted or unsubstituted acyl group, a substituted or unsubstituted alkylsulfonyl group, a substituted or unsubstituted arylsulfonyl group, a substituted or unsubstituted carbamoyl group, and a substituted or unsubstituted sulfamoyl group.

4. A silver halide color photographic material as claimed in claim 2, wherein $R_1$, $R_2$ and $R_3$ each contains 1 to 40 carbon atoms.

5. A silver halide color photographic material as claimed in claim 2, wherein the compound represented by the formula (II) is a compound represented by the formula (III):

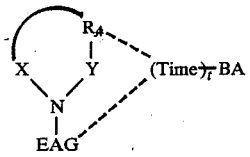

(II)

wherein Y represents a divalent connecting group; $R_4$ represents an atomic group which is connected to X and Y to form a 5- to 8- membered heterocyclic group with a nitrogen atom; EAG represents an electron-accepting group; N represents a nitrogen atom; X represents an oxygen atom (—O—), sulfur atom (—S—), or atomic group containing a nitrogen atom (—N($R_3$)—); $R_3$ represents a chemical bond or a group other than hydrogen atom; BA represents a group which becomes a desilvering accelerator after being released; Time represents a group which releases BA through a reaction triggered by N—X bond cleavage; t represents an integer of 0 or 1; the solid line indicates a chemical bond; and (Time—$_t$BA is connected to at least one of $R_4$ and EAG.

6. A silver halide color photographic material as claimed in claim 5, wherein Y represents

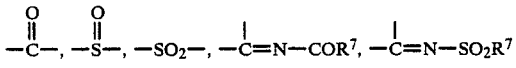

(wherein $R^7$ represents a hydrogen atom, an alkyl group, an aryl group or a heterocyclic gtroup).

7. A silver halide color photographic material as claimed in claim 5, wherein EAG represents an aromatic group represented by formula (A):

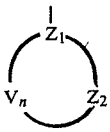

(A)

wherein $Z_1$ represents

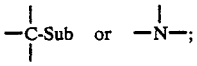

$V_n$ represents an atomic group which form a 3- to 8-membered aromatic group with $Z_1$ and $Z_2$; n represents an integer of 3 to 8; $V_3$, $V_4$, $V_5$, $V_6$, $V_7$, and $V_8$ represents —$Z_3$—, —$Z_3$—$Z_4$—, —$Z_3$—$Z_4$—$Z_5$—, —$Z_3$—$Z_4$—$Z_5$—$Z_6$—, —$Z_3$—$Z_4$—$Z_5$—$Z_6$—$Z_7$—, and $Z_3$—$Z_4$—$Z_5$—$Z_6$—$Z_7$—$Z_8$—, respectively, wherein $Z_2$ to $Z_8$ each represents

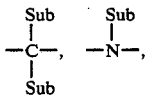

—O—, —S—, or —$SO_2$— in which Sub represents a chemical bond (n bond), hydrogen atom, or substituent, or Sub groups are connected to each other to form a 3- to 8-membered saturated or unsaturated carbon ring or heterocyclic ring.

8. A silver halide color photographic material as claimed in claim 7, wherein Sub(s) is selected so that the sum of sigma para of Hammett's constants of the substitutent is at least ±0.50.

9. A silver halide color photographic material as claimed in claim 1, wherein said desilvering accelerator is a compound selected from the group consisting of compounds represented by formulae (a) to (i):

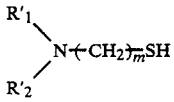

(a)

wherein $R'_1$ and $R'_2$ each represents a hydrogen atom, a substituted or unsubstituted lower alkyl group, or an acyl group, or $R'_1$ and $R'_2$ are connected to each other to form a ring, and m represents an integer of 1 to 3;

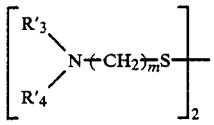

(b)

wherein $R'_3$ and $R'_4$ each represents a hydrogen atom, a substituted or unsubstituted lower alkyl group, or an acyl group, or $R'_3$ and $R'_4$ are connected to each other to form a ring, and m represents an integer of 1 to 3;

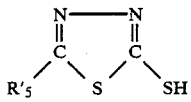

(c)

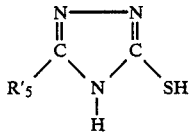

(d)

-continued

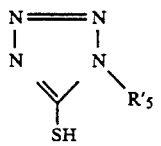

(e)

wherein $R'_5$ represents a hydrogen atom, a halogen atom, an amino group, a substituted or unsubstituted lower alkyl group, or an amino group containing mono- or di-alkyl group;

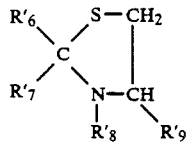

(f)

wherein $R'_6$ and $R'_7$ each represents a hydrogen atom, a substituted or unsubstituted alkyl group, a substituted or unsubstituted phenyl group, a substituted or unsubstituted heterocyclic group, $R'_8$ represents a hydrogen atom or a substituted or unsubstituted lower alkyl group, $R'_9$ represents a hydrogen atom or a carboxyl group;

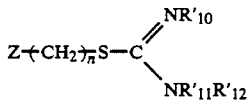

(g)

wherein $R'_{10}$, $R'_{11}$, and $R'_{12}$ each represents a hydrogen atom or a lower alkyl group, or $R'_{10}$ and $R'_{11}$ or $R'_{12}$ are connected to each other to form a ring, Z represents a substituted or unsubstituted amino group, a sulfonic acid group, or carboxyl group, n represents an integer of 1 to 3;

$$HS—R'—COOM \quad (h)$$

$$HS—R'—SO_3M \quad (i)$$

wherein R' represents an alkylene group, and M represents a hydrogen atom, an alkali metal atom or $NH_4$.

10. A silver halide color photographic material as claimed in claim 1, wherein the amount of the compound of formula (I) is $1\times10^{-5}$ to $1\times10^{3}$ mol per 1 mol of silver halide.

11. A silver halide color photographic material as claimed in claim 1, wherein the compound of formula (I) is incorporate at least one of said emulsion layer.

12. A silver halide color photographic material as claimed in claim 1, wherein the compound of formula (I) is incorporated into at least one non-light sensitive hydrophilic layer.

13. A silver halide color photographic material as claimed in claim 1, wherein said non-light sensitive hydrophilic layer is a protective layer, an interlayer or an antihalation layer.

* * * * *